US012424031B2

(12) United States Patent
Yamamoto

(10) Patent No.: US 12,424,031 B2
(45) Date of Patent: Sep. 23, 2025

(54) MONITORING DEVICE, MONITORING SYSTEM, MONITORING METHOD, AND COMPUTER PROGRAM

(71) Applicant: KONICA MINOLTA, INC., Tokyo (JP)

(72) Inventor: Kenzo Yamamoto, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 344 days.

(21) Appl. No.: 17/737,493

(22) Filed: May 5, 2022

(65) Prior Publication Data

US 2022/0392268 A1 Dec. 8, 2022

(30) Foreign Application Priority Data

Jun. 7, 2021 (JP) ................................. 2021-095246

(51) Int. Cl.
*G06V 40/50* (2022.01)
*G06V 10/12* (2022.01)
(Continued)

(52) U.S. Cl.
CPC .............. *G06V 40/55* (2022.01); *G06V 10/12* (2022.01); *G06V 30/412* (2022.01); *G06V 40/166* (2022.01); *G06V 40/172* (2022.01)

(58) Field of Classification Search
CPC ...... G06V 20/52; G06V 40/55; G06V 40/172; G06V 10/12; G06V 40/166; G06F 21/6245; G06F 21/62
See application file for complete search history.

(56) References Cited

U.S. PATENT DOCUMENTS 10,348,931 B2 7/2019 Seto
2010/0205667 A1* 8/2010 Anderson ............... G06F 3/013
726/19
(Continued)

FOREIGN PATENT DOCUMENTS

JP 2000322358 A 11/2000
JP 2010231304 A 10/2010
(Continued)

OTHER PUBLICATIONS

Japanese Office Action (and an English language translation thereof) dated Jan. 28, 2025, issued in counterpart Japanese Application No. 2021-095246.

*Primary Examiner* — Margaret G Webb
(74) *Attorney, Agent, or Firm* — Holtz, Holtz & Volek PC

(57) ABSTRACT

There is provided a monitoring device that monitors another person's peeping into a document to be read, a medium on which drawing output is performed, or content displayed by an image processing apparatus, and the monitoring device includes a first hardware processor that: acquires person information indicating a person present within a predetermined range from the image processing apparatus; performs determination including whether or not a person other than the operator among persons identified by the person information acquired is a person having a predetermined relationship with the operator; and performs control to cause warning information to be output in a case where it is determined that there is at least one person not having the predetermined relationship among the persons identified, and performs control to cause output of the warning information to be prevented in a case where it is determined that all the persons have the predetermined relationship.

24 Claims, 44 Drawing Sheets

(51) Int. Cl.
*G06V 30/412* (2022.01)
*G06V 40/16* (2022.01)

(56) References Cited

U.S. PATENT DOCUMENTS

2017/0294089 A1* 10/2017 Miwa .................. G08B 25/005
2020/0053238 A1* 2/2020 Morioka ................ G06F 3/165
2021/0049291 A1* 2/2021 Sima ...................... G06N 20/00
2022/0171875 A1* 6/2022 Jasleen .............. G06F 21/6245
2022/0201137 A1* 6/2022 Tsurumi ............. H04N 1/00411

FOREIGN PATENT DOCUMENTS

| JP | 2012008802 A | 1/2012 |
| JP | 2016159685 A | 9/2016 |
| JP | 2019010794 A | 1/2019 |

* cited by examiner

IMAGE FORMING APPARATUS

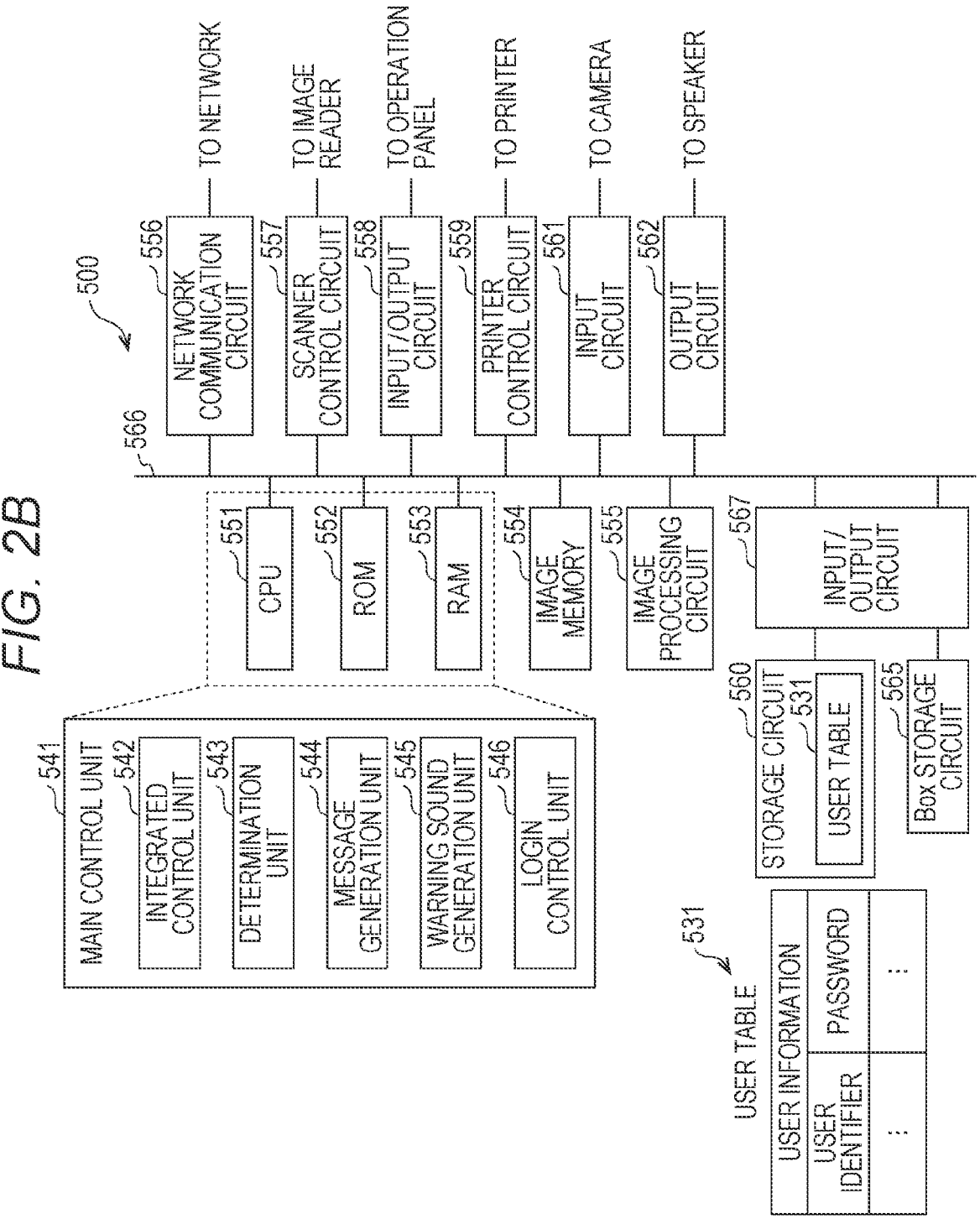

USER TABLE 410

| USER IDENTIFIER | COMPANY NAME | AFFILIATION DEPARTMENT NAME |
|---|---|---|
| ID001 | ABC CORPORATION | FIRST SALES DEPARTMENT |
| ID002 | ABC CORPORATION | FIRST SALES DEPARTMENT |
| ID003 | ABC CORPORATION | SECOND SALES DEPARTMENT |
| ID004 | XYZ CORPORATION | SECOND SALES DEPARTMENT |
| ⋮ | ⋮ | ⋮ |

(USER INFORMATION 411, 412 USER IDENTIFIER, 413, 414)

FACE IMAGE DATA

OB0001, 610b, 128

FIG. 8
PART DATA PT0001 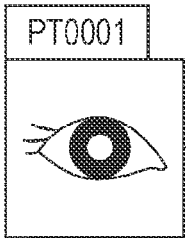 ~137a
PART DATA PT0002 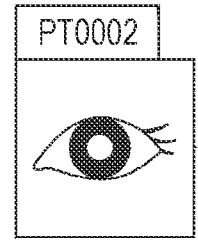 ~137b
PART DATA PT0003 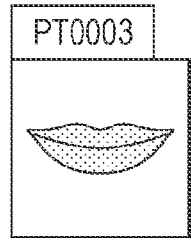 ~137c
PART DATA PT0004 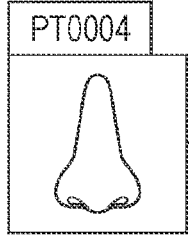 ~137d
PART DATA PT0005 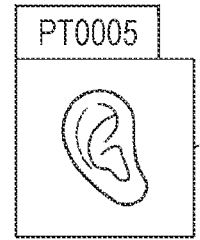 ~137e
PART DATA PT0006 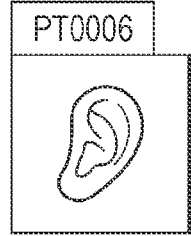 ~137f

USER TABLE

| USER IDENTIFIER | USER INFORMATION | | |
|---|---|---|---|
| | COMPANY NAME | AFFILIATION DEPARTMENT NAME | RELATED PERSON NUMBER |
| ID001 | ABC CORPORATION | FIRST SALES DEPARTMENT | 010 |
| ID002 | ABC CORPORATION | FIRST SALES DEPARTMENT | 005 |
| ID003 | ABC CORPORATION | SECOND SALES DEPARTMENT | 010 |
| ID004 | XYZ CORPORATION | SECOND SALES DEPARTMENT | 010 |
| ... | ... | ... | ... |

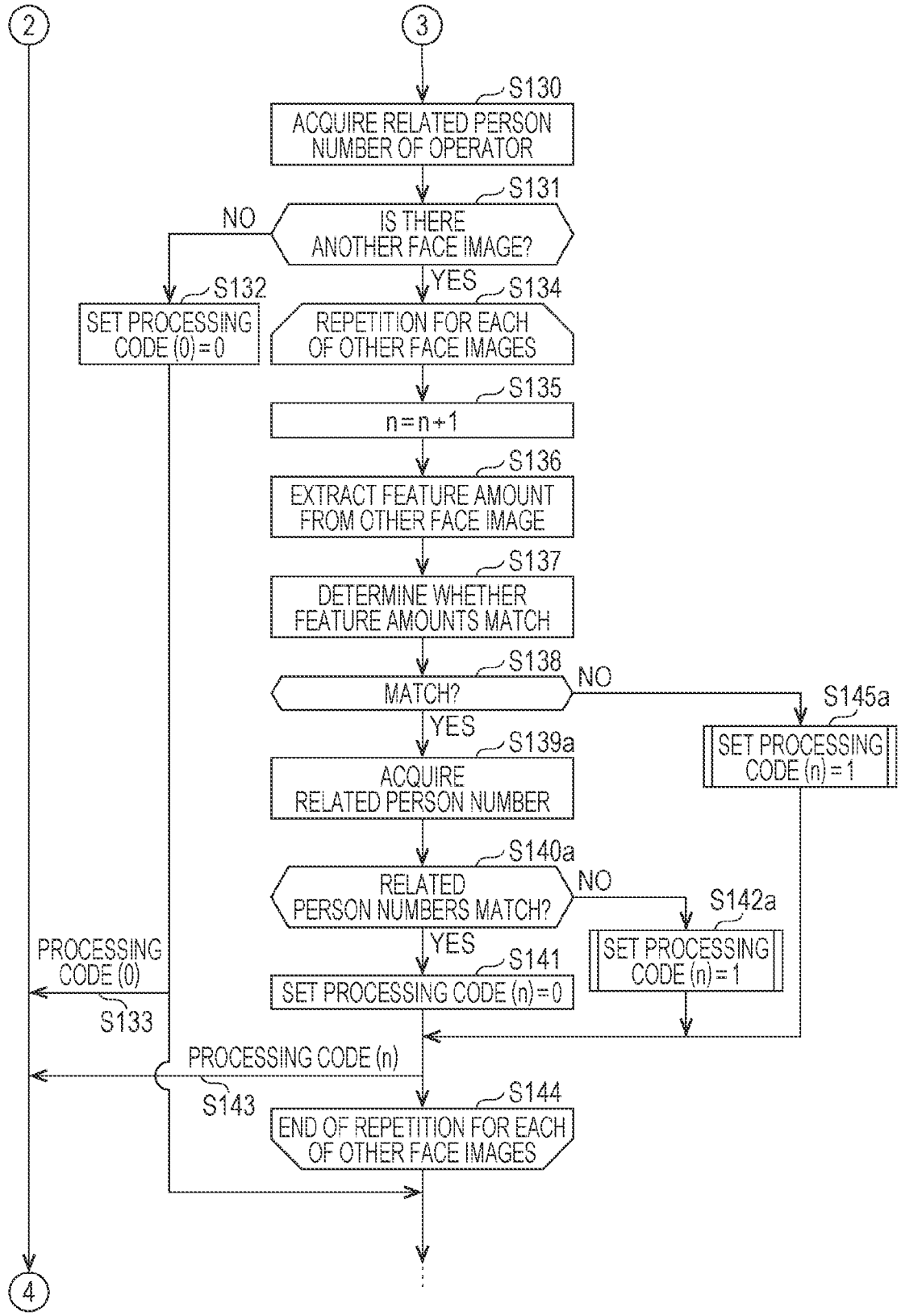

USER TABLE

| USER IDENTIFIER | COMPANY NAME | USER INFORMATION AFFILIATION DEPARTMENT NAME | RELATED PERSON NUMBER | NUMBER OF TIMES |
|---|---|---|---|---|
| ID001 | ABC CORPORATION | FIRST SALES DEPARTMENT | 020 | 012 |
| ID002 | ABC CORPORATION | FIRST SALES DEPARTMENT | — | — |
| ID003 | ABC CORPORATION | SECOND SALES DEPARTMENT | 020 | 012 |
| ID004 | XYZ CORPORATION | SECOND SALES DEPARTMENT | — | — |
| ... | ... | ... | ... | ... |

MONITORING DEVICE, MONITORING SYSTEM, MONITORING METHOD, AND COMPUTER PROGRAM

The entire disclosure of Japanese patent Application No. 2021-095246, filed on Jun. 7, 2021, is incorporated herein by reference in its entirety.

BACKGROUND

Technological Field

The present disclosure relates to a technology for monitoring another person's peeping into a document to be read, a medium on which drawing output is performed, or content displayed by an image processing apparatus due to operation by an operator.

Description of the Related Art

In recent years, a shared office in which a plurality of users commonly use one office, a free address system in which a seat for performing work can be freely selected in one office, and the like have increased. In particular, with the spread of infectious diseases caused by the novel coronavirus (COVID-19), it is considered that the movement to minimize the company's office space is accelerated and, as a result, the use of the office form as described above is increased.

In such an office form, a plurality of users of a plurality of different companies or a plurality of users of a plurality of departments in one company often uses one multifunction peripheral in common.

When a plurality of users of a plurality of different companies or a plurality of users of a plurality of different departments in one company shares and uses one multifunction peripheral, there is a security problem such that a document or printed matter of a user (Hereinafter, referred to as an operator.) who is operating the multifunction peripheral is seen by a person of another company or a person of another department, or a preview image of a document, a file name, a company name of a business partner, or the like displayed on an operation panel of the multifunction peripheral being operated is seen by a person of another company or a person of another department.

According to JP 2010-231304 A, to detect another person's peeping into a screen of a mobile phone, a face image is detected from an image acquired by imaging, a feature amount is calculated from the detected face image, and whether or not the face is a face of another person is determined from the calculated feature amount. In the case of the face of another person, a feature amount of the face of another person is calculated, and it is determined whether or not peeping into the display screen of the mobile phone is being performed, from the calculated feature amount. In a case where peeping into the display screen is being performed, a warning mark is displayed on the display screen. As described above, the mobile phone displays the warning mark, whereby the user can know the peeping and deal with the peeping.

In an environment in which a multifunction peripheral is installed in a shared office as described above, there are many cases where another user stands near the multifunction peripheral and wait in order to operate the multifunction peripheral, or another person passes in front of the multifunction peripheral, separately from the operator of the multifunction peripheral, and there is a possibility that peeping by the other person may occur. In such an environment, when the technology described in JP 2010-231304 A is applied, a warning is uniformly issued even in a case where a person around the multifunction peripheral is a related person of the operator, who does not cause a problem in terms of security. For this reason, there is a problem that the displayed warning is troublesome for the operator.

SUMMARY

To solve the above problem, an object of one aspect of the present disclosure is to provide a monitoring device, a monitoring system, a monitoring method, and a computer program that can reduce botheration caused by a warning for an operator of an image processing apparatus.

To achieve the abovementioned object, according to an aspect of the present invention, there is provided a monitoring device that monitors another person's peeping into a document to be read, a medium on which drawing output is performed, or content displayed by an image processing apparatus due to operation by an operator, and the monitoring device reflecting one aspect of the present invention comprises a first hardware processor that: acquires person information indicating a person present within a predetermined range from the image processing apparatus; performs determination including whether or not a person other than the operator among persons identified by the person information acquired is a person having a predetermined relationship with the operator; and performs control to cause warning information to be output in a case where it is determined that there is at least one person not having the predetermined relationship among the persons identified, and performs control to cause output of the warning information to be prevented in a case where it is determined that all the persons have the predetermined relationship.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2B is a block diagram illustrating a configuration of control circuit;

FIG. 8 illustrates, as an example, part data extracted from a face image;

FIG. 24 illustrates an example of a data structure of a user table in the third example;

FIG. 27 is the sequence diagram illustrating the operation in the third example (continuing from FIG. 10);

FIG. 30 illustrates an example of a data structure of a user table in the fourth example;

DETAILED DESCRIPTION OF EMBODIMENTS

Hereinafter, one or more embodiments of the present invention will be described with reference to the drawings. However, the scope of the invention is not limited to the disclosed embodiments.

Embodiment

1 First Example

A security system 1 as a first example of an embodiment will be described.

1.1 Security System 1

Figure 1:
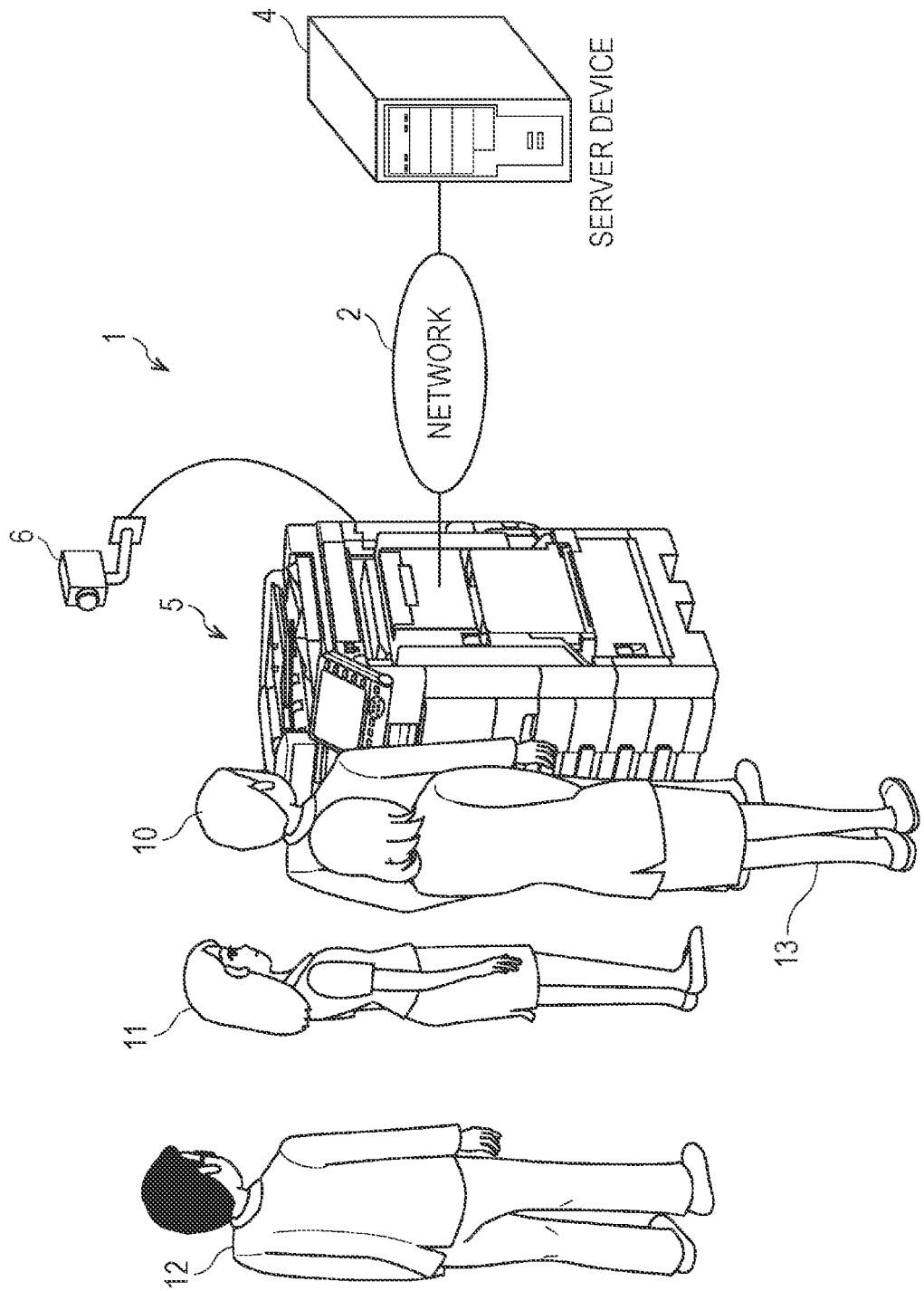
FIG. 1 illustrates a configuration of a security system as a first example of an embodiment.

As illustrated in FIG. 1, the security system 1 includes an image forming apparatus 5, a camera 6, and a server device 4 (monitoring device).

The camera 6 (imaging device) is connected to the image forming apparatus 5 via a signal line. In addition, the image forming apparatus 5 and the server device 4 are connected to each other via a network 2.

The image forming apparatus 5 is installed in a shared office shared by a plurality of users of a plurality of different companies and a plurality of users of a plurality of departments in one company.

The image forming apparatus 5 reads a document by operation by an operator, and produce printed matter that is a copy of the document. In addition, the image forming apparatus 5 receives a print job from an information processing device (Not illustrated. As an example, it is a personal computer.) connected to the network 2, and produces printed matter in accordance with the received print job. In addition, the image forming apparatus 5 reads a document by the operation by the operator to generate document image data, and transmits the generated document image data to another information processing device via the network 2.

The camera 6 is installed on the back above the image forming apparatus 5 with the optical axis of the lens fixed in a direction of the image forming apparatus 5. The camera 6 images an operator 10 who operates the image forming apparatus 5 and persons 11 to 13 standing around the operator 10 to generate image data. Since the camera 6 is installed with the optical axis of the lens fixed in the direction of the image forming apparatus 5, the inside of a certain range (predetermined range) from the image forming apparatus 5 is reflected in the image data. For this reason, the image forming apparatus 5 can capture only a person present within the certain range from the image forming apparatus 5. The camera 6 transmits the generated image data to the server device 4 via the image forming apparatus 5 and the network 2.

The server device 4 monitors another person's peeping into a document to be read, a medium on which drawing output is performed, or content displayed by the image forming apparatus 5 due to the operation by the operator.

The server device 4 receives the image data generated by the camera 6, and uses the received image data to determine whether or not a person standing around the operator reflected in the image represented by the image data is peeping into a document, printed matter, an operation panel 519 (described later) included in the image forming apparatus 5, or the like.

In a case where it is determined that a person who is not allowed to perform peeping is performing peeping among persons standing around the operator as viewed from the operator, the image forming apparatus 5 outputs a warning to the operator by display, voice, or the like, and further outputs a warning to the surrounding persons by voice or the like. On the other hand, in a case where it is determined that a person who is allowed to perform peeping is performing peeping among the persons standing around the operator as viewed from the operator, the image forming apparatus 5 does not output a warning.

As described above, among the persons standing around the operator, a related person of the operator is allowed to perform peeping, and a person not related to the operator is not allowed to perform peeping.

For example, a person belonging to the same department as a department to which the operator belongs is a person (related person) having a predetermined relationship with the operator, and is allowed to perform peeping.

On the other hand, for example, a person belonging to a department different from the department to which the operator belongs is not the related person of the operator, and is not allowed to perform peeping. In addition, for example, a person belonging to a company different from a company to which the operator belongs is not the related person of the operator, and is not allowed to perform peeping.

1.2 Image Forming Apparatus 5

Figure 2A:
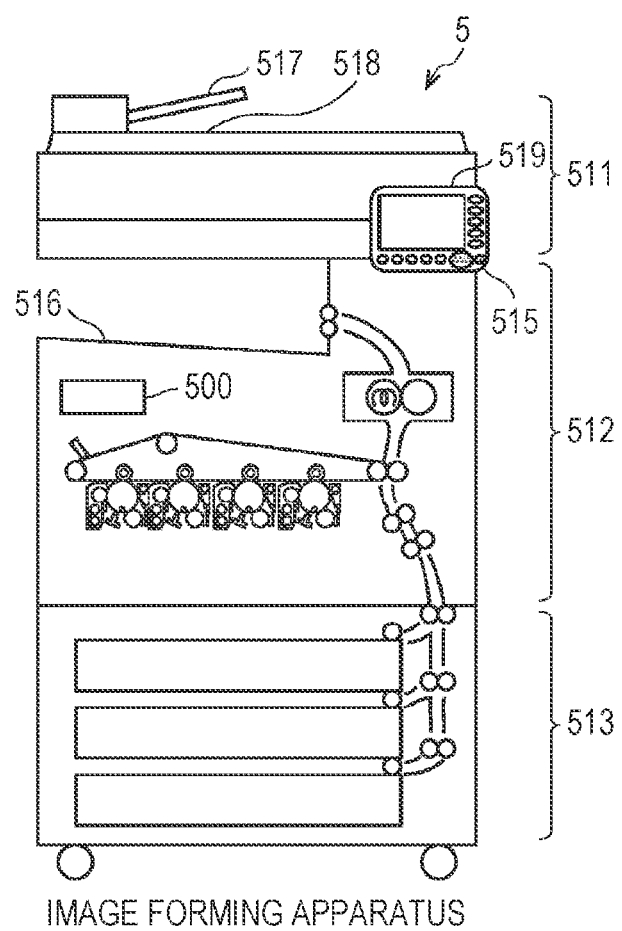
FIG. 2A is a diagram illustrating a schematic configuration of an image forming apparatus.

As illustrated in FIGS. 1 and 2A, the image forming apparatus 5 (image processing apparatus) is a tandem type color multifunction peripheral (MFP) having functions of a scanner, a printer, and a copier.

As illustrated in FIG. 2A, the image forming apparatus 5 is provided with a sheet feeding unit 513 that houses and feeds a recording sheet in a housing bottom part. Above the sheet feeding unit 513, a printer 512 that forms an image by an electrophotographic method is provided. Above the printer 512, an image reader 511 that reads a document to generate image data and an operation panel 519 (outputter) that displays an operation screen and receives input operation from an operator are provided.

The image reader 511 includes an automatic document feeder. The automatic document feeder conveys documents set in a document tray 517 one by one to a predetermined reading position via a conveying path. The image reader 511 reads, with a scanner, a document conveyed to a reading position by the automatic document feeder or a document placed on a document glass plate by the operator, and obtains image data including multi-level digital signals of red (R), green (G), and blue (B). The image reader 511 conveys a document that has been conveyed from the document tray 517 and has been read to a document discharge tray 518.

The document tray 517 is provided with a document detection sensor (not illustrated) that detects that a document is set in the document tray 517. In addition, the document discharge tray 518 is provided with a document detection sensor (not illustrated) that detects that a document that has been read is conveyed and placed on the document discharge tray 518.

The image data of each color component obtained by the image reader 511 undergoes various types of data processing in a control circuit 500, and is further converted into image data of each reproduction color of yellow (Y), magenta (M), cyan (C), and black (K).

The printer 512 includes: an intermediate transfer belt stretched by a drive roller, a driven roller, and a backup roller; a secondary transfer roller; four image forming units arranged at predetermined intervals along a traveling direction of the intermediate transfer belt to face the intermediate transfer belt; a fixing unit; the control circuit 500; and the like.

The four image forming units form toner images of Y, M, C, and K colors, respectively. Specifically, each image forming unit includes a photosensitive drum that is an image carrier, an LED array for performing exposing scanning of the surface of the photosensitive drum, a charger, a developing device, a cleaner, a primary transfer roller, and the like.

The sheet feeding unit 513 includes a plurality of sheet feeding cassettes that accommodate recording sheets having different sizes, and a plurality of pickup rollers for delivering the recording sheets from the respective sheet feeding cassettes to the conveying path.

In each of the plurality of image forming units, each photosensitive drum is uniformly charged by the charger and exposed by the LED array, and an electrostatic latent image is formed on the surface of the photosensitive drum. Each electrostatic latent image is developed by a developing device of a corresponding color, toner images of Y to K colors are formed on the surfaces of respective photosensitive drums, and the toner images are sequentially transferred onto the surface of the intermediate transfer belt by electrostatic action of respective primary transfer rollers arranged on the back surface side of the intermediate transfer belt.

Image forming timings of the respective colors are shifted so that toner images of Y to K colors are multiply transferred on the intermediate transfer belt.

Meanwhile, a recording sheet is fed from any of the sheet feeding cassettes of the sheet feeding unit 513 in accordance with image forming operation by the plurality of image forming units.

The recording sheet is conveyed on the conveying path to a secondary transfer position where the secondary transfer roller and the backup roller face each other with the intermediate transfer belt interposed therebetween, and at the secondary transfer position, the toner images of Y to K colors multiply transferred on the intermediate transfer belt are secondarily transferred to the recording sheet by electrostatic action of the secondary transfer roller. The recording sheet on which the toner images of Y to K colors have been secondarily transferred is further conveyed to the fixing unit.

When the toner image on the surface of the recording sheet passes through a fixing nip formed between a heating roller of the fixing unit and a pressure roller pressed against the heating roller, the toner image is fused and fixed to the surface of the recording sheet by heating and pressurization, and the recording sheet passes through the fixing unit and then is sent to a printed matter discharge tray 516.

The printed matter discharge tray 516 is provided with a printed matter detection sensor (not illustrated) that detects that the recording sheet (printed matter) sent from the fixing unit is placed on the printed matter discharge tray 516.

The operation panel 519 is provided with a display unit including a liquid crystal display plate or the like, and displays contents set by the operator and various messages. The operation panel 519 receives an instruction to start copying, a setting of the number of copies, a setting of a copy condition, a setting of an output destination of data, and the like from the operator, and notifies the control circuit 500 of the received contents. The operation panel 519 also includes a speaker 515 (outputter) that converts an analog audio signal into sound and outputs the sound.

1.3 Control Circuit 500

As illustrated in FIG. 2B, the control circuit 500 includes a central processing unit (CPU) 551, a read only memory (ROM) 552, a random access memory (RAM) 553, an image memory 554, an image processing circuit 555, a network communication circuit 556, a scanner control circuit 557, an input/output circuit 558, a printer control circuit 559, a storage circuit 560, an input circuit 561, an output circuit 562, a Box storage circuit 565, an input/output circuit 567, a bus 566, and the like.

The CPU 551, the ROM 552, the RAM 553, the image memory 554, the image processing circuit 555, the network communication circuit 556, the scanner control circuit 557, the input/output circuit 558, the printer control circuit 559, the input circuit 561, the output circuit 562, and the input/output circuit 567 are connected to one another via the bus 566. The storage circuit 560 and the Box storage circuit 565 are connected to the input/output circuit 567.

The CPU 551, the ROM 552, and the RAM 553 constitute a main control unit 541.

The RAM 553 temporarily stores various control variables, the number of copies set by the operation panel 519, and the like, and provides a work area when the CPU 551 executes a program.

The ROM 552 stores a control program and the like for causing various jobs such as copy operation to be executed. Note that the control program and the like may be stored in the storage circuit 560.

The CPU 551 operates in accordance with the control program stored in the ROM 552.

The image memory 554 temporarily stores image data included in a print job or the like.

For example, the image processing circuit 555 performs various data processing on the image data of each color component of R, G, and B obtained by the image reader 511, and converts the image data into image data of each reproduction color of Y, M, C, and K.

The network communication circuit 556 receives a print job from an external terminal device via the network 2. In addition, the network communication circuit 556 (receiver) receives a processing code (0) to a processing code (n) (control information) from the server device 4 via the network 2. The processing code (0) to the processing code (n) will be described later. In addition, the network communication circuit 556 transmits a mail via the network 2.

The scanner control circuit 557 controls the image reader 511 to cause document reading operation to be executed.

The storage circuit 560 includes a nonvolatile semiconductor memory. Note that the storage circuit 560 may include a hard disk.

The storage circuit 560 stores a user table 531.

As illustrated in FIG. 2B, the user table 531 is a data table including a plurality of pieces of user information. Each piece of user information corresponds to a user of the image forming apparatus 5.

Each piece of user information includes a user identifier and a password. The user identifier is an identifier for uniquely identifying a user of the image forming apparatus 5. The password is a password set corresponding to the user identifier. The user identifier and the password are used at the time of login as described later.

The Box storage circuit 565 includes a nonvolatile semiconductor memory. Note that the Box storage circuit 565 may include a hard disk.

The Box storage circuit 565 includes a Box for storing data for each user. Note that the Box storage circuit 565 may include a Box for storing data for each group including a plurality of users.

The Box includes, for example, an area for storing a print job.

The input circuit 561 is connected to the camera 6 via a signal line. The input circuit 561 receives image data from the camera 6.

The output circuit 562 converts a digital audio signal into an analog audio signal, and outputs the generated analog audio signal to the speaker 515.

1.4 Screen Example

Figure 3A:
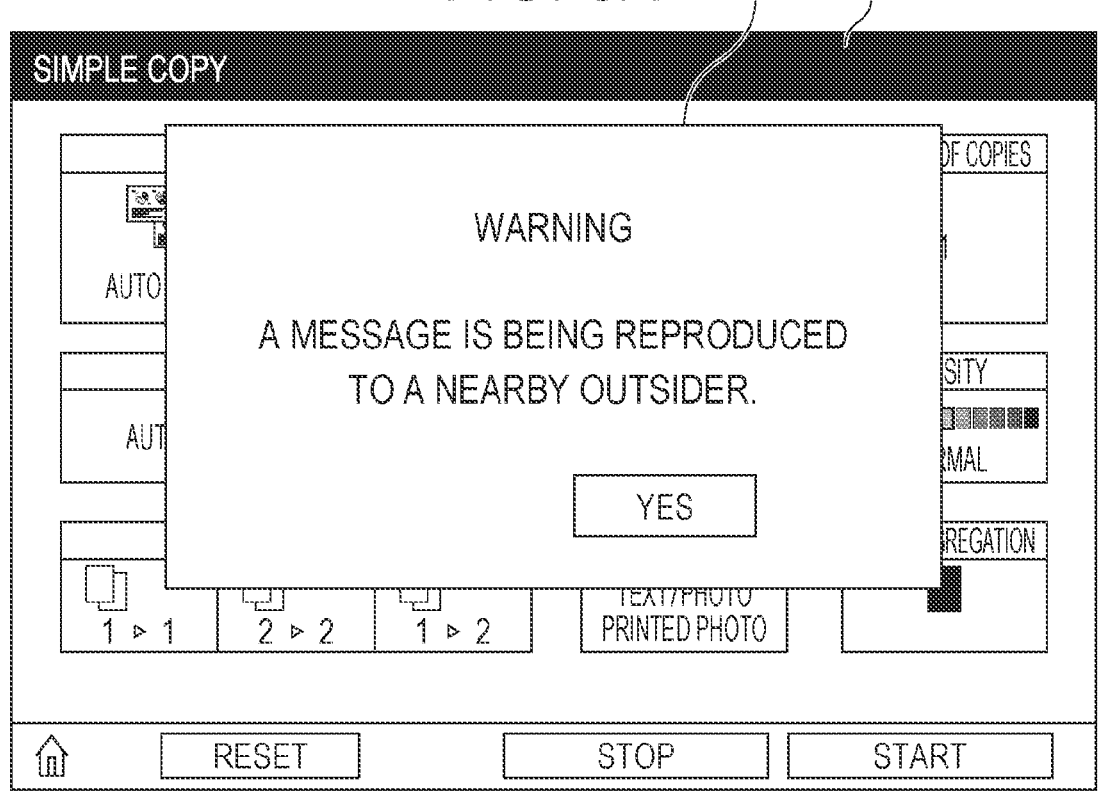
FIG. 3A illustrates, as an example, a screen including a warning message displayed on an operation panel of the image forming apparatus.
Figure 3B:
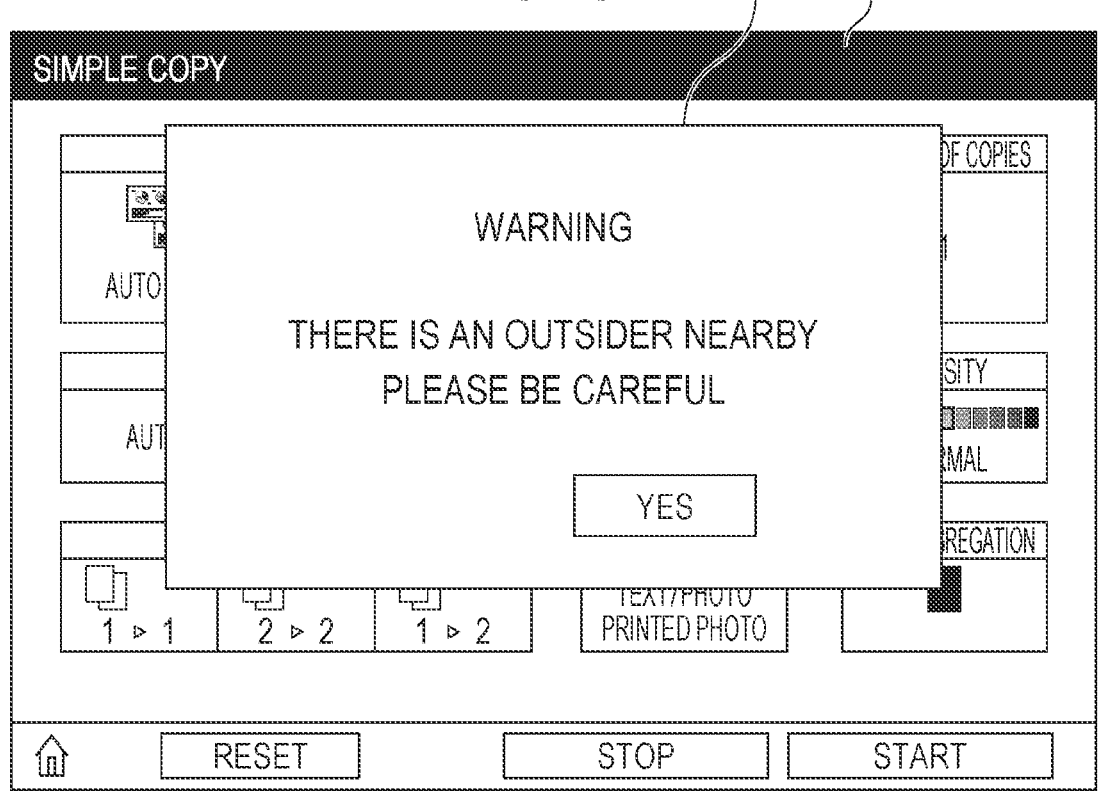
FIG. 3B illustrates, as another example, a screen including a warning message displayed on the operation panel of the image forming apparatus.

As an example, a screen 581 and a screen 583 displayed on the operation panel 519 of the image forming apparatus 5 are illustrated in FIGS. 3A and 3B, respectively.

The screen 581 includes a message area 582. In the message area 582, a warning message for the operator is displayed. In the message area 582, for example, a message "WARNING A MESSAGE IS BEING REPRODUCED TO A NEARBY OUTSIDER. [YES]" is included. This message indicates that a warning message by voice is output to a person standing around the operator. The warning message by voice is, for example, "WE ARE DEALING WITH IMPORTANT DOCUMENTS. PLEASE MOVE AWAY BY A CERTAIN DISTANCE".

In addition, the screen 583 includes a message area 584. In the message area 584, a warning message for the operator is displayed. The message area 584 includes, for example, a message "WARNING THERE IS AN OUTSIDER NEARBY PLEASE BE CAREFUL [YES]". This message indicates that a person (outsider) who is not a related person stands around the operator.

1.5 Example of Image

Figure 4:
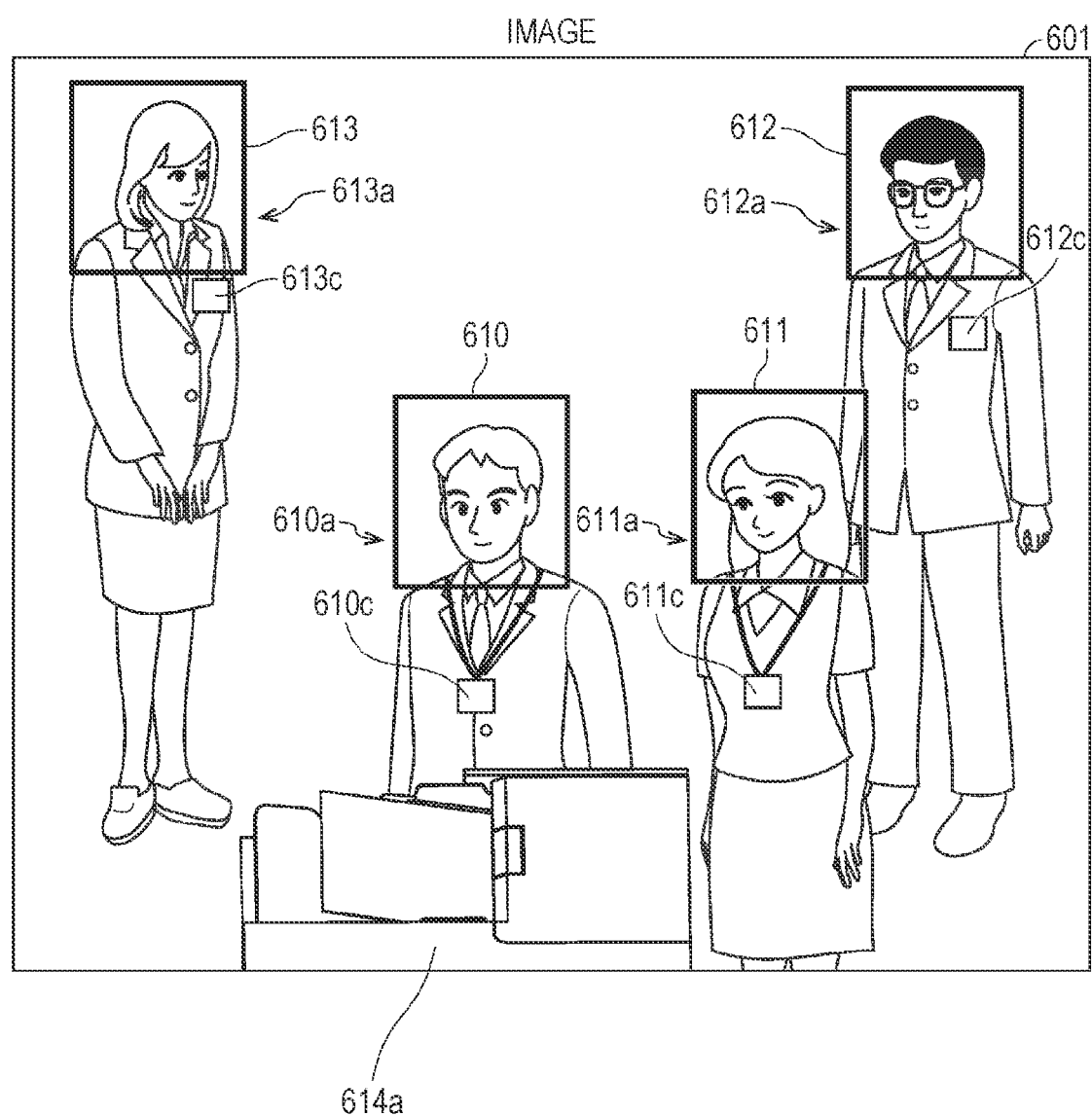
FIG. 4 illustrates, as an example, an image generated by imaging by a camera.

FIG. 4 illustrates, as an example, an image 601 represented by image data received from the camera 6 via the input circuit 561.

The image 601 includes person images 610a, 611a, 612a, and 613a respectively representing a plurality of persons 10 to 13 standing around the image forming apparatus 5, and a back image 614a from the back side upper part of the image forming apparatus 5. Since an imaging direction of the camera 6 is fixed, the back image 614a of the same portion of the image forming apparatus 5 is always reflected at the same position (center, lower part) of the image 601. For this reason, it is possible to know standing positions of the persons represented by the person images 610a, 611a, 612a, and 613a in a three-dimensional space where the image forming apparatus 5 exists, from a positional relationship between the back image 614a and each of the person images 610a, 611a, 612a, and 613a, in the image 601. In addition, since the person image 610a arranged at the center of the image 601 is located in front of the image forming apparatus 5, it can be seen that the person represented by the person image 610a is the operator who operates the image forming apparatus 5.

In addition, in the image 601, face images 610, 611, 612, and 613 are indicated that are face portions of respective persons of the person images 610a, 611a, 612a, and 613a. Each of shapes of the face images 610, 611, 612, and 613 is a rectangular shape.

Here, each user of the image forming apparatus 5 may hang an employee ID card indicating his/her own identification from the neck or attach the employee ID card to the chest. In the image 601, employee ID card images 610c, 611c, 612c, and 613c representing the employee ID cards are displayed on the person images 610a, 611a, 612a, and 613a, respectively.

Note that the image 601 represented by the image data received from the camera 6 via the input circuit 561 is a still image, but a dynamic image may be received from the camera 6 via the input circuit 561.

1.6 Main Control Unit 541

The CPU 551 operates in accordance with the control program, whereby the main control unit 541 configures an integrated control unit 542, a determination unit 543, a message generation unit 544, a warning sound generation unit 545, and a login control unit 546 as illustrated in FIG. 2B.

(Integrated Control Unit 542)

The CPU 551 operates in accordance with the control program, whereby the integrated control unit 542 integrally controls the image memory 554, the image processing circuit 555, the network communication circuit 556, the scanner control circuit 557, the input/output circuit 558, the printer control circuit 559, the input circuit 561, the output circuit 562, the input/output circuit 567, and the like. In addition, the integrated control unit 542 integrally controls the determination unit 543, the message generation unit 544, the warning sound generation unit 545, and the login control unit 546.

The integrated control unit 542 determines which of login, copy, print, scan to mail, and others a received input is. In a case where the received input is login, copy, print, scan to mail, and others, the integrated control unit 542 performs control so that login processing, copy processing, Box print processing, scan to mail processing, and other processing are executed, respectively.

For example, the integrated control unit 542 receives operation by an operator from the operation panel 519. In a case where the operation by the operator is a copy instruction, the integrated control unit 542 causes the scanner control circuit 557 to execute reading of a document and causes the printer control circuit 559 to execute image forming processing using document image data generated by reading. In a case where a print job including designation of writing to the Box is received from the network communication circuit 556, the integrated control unit 542 causes the input/output circuit 567 to store the received print job in the Box storage circuit 565. In a case where the operation by the operator is an instruction to execute the print job stored in the Box storage circuit 565, the integrated control unit 542 causes the input/output circuit 567 to execute reading of the print job from the Box storage circuit 565, and causes the printer control circuit 559 to execute image forming processing in accordance with the read print job. In a case where the operation by the operator is a scan to mail instruction, the integrated control unit 542 causes the scanner control circuit 557 to execute reading of a document to generate document image data, and causes the network communication circuit 556 to attach the generated document image data to an e-mail and transmit the e-mail. In a case where the operation by the operator is another instruction, the integrated control unit 542 causes other processing to be executed.

When the image data is received from the camera 6 by the input circuit 561, the integrated control unit 542 controls the network communication circuit 556 so that the received image data is transmitted to the server device 4 via the network 2.

(Login Control Unit 546)

As described below, the login control unit 546 executes login processing using the user identifier and the password by control of the integrated control unit 542.

The login control unit 546 receives the user identifier and the password from the operation panel 519 via the input/output circuit 558.

When the user identifier and the password are received, the login control unit 546 refers to the user table 531 and determines whether or not a received set of the user identifier and the password exists in the user table 531.

In a case where the received set of the user identifier and the password does not exist in the user table 531, the login control unit 546 outputs a message indicating that there is an input error to the operation panel 519 via the input/output circuit 558. The operation panel 519 displays this message. In this case, the login is a failure.

In a case where the received set of the user identifier and the password exists in the user table 531, the login control unit 546 temporarily stores the input user identifier. In this case, the login is successful. The temporary storage of the input user identifier is valid until logout.

In a case where the login is successful, the login control unit 546 controls the network communication circuit 556 so that the received user identifier is transmitted to the server device 4 via the network 2.

Note that the login method is not limited to the above. For example, the login may be performed using the image data received from the camera 6. That is, it is regarded that a person reflected in the central part of the image represented by the received image data is the operator, a face image is extracted from a person image of the person, it is determined whether the face image matches a previously stored face image, and in a case where the face image matches the previously stored face image, it is regarded that the login is successful, and a user identifier corresponding to the previously stored face image may be acquired.

(Determination Unit 543)

When the processing code (0) to the processing code (n) are received from the server device 4 via the network 2 by the network communication circuit 556, the determination unit 543 (control device) determines whether or not there is at least one processing code of "1" among the received processing code (0) to processing code (n). In a case where there is at least one processing code of "1" among the received processing code (0) to processing code (n), the determination unit 543 determines that there is a person who is not a related person around the operator. In a case where all of the received processing code (0) to processing code (n) are "0", the determination unit 543 determines that there are only related persons around the operator.

The processing code (0) to the processing code (n) will be described later.

In a case where it is determined that there is a person who is not a related person around the operator, the determination unit 543 instructs the message generation unit 544 to generate a warning message indicating that there is a person who is not a related person near the operator, and instructs the warning sound generation unit 545 to generate a warning sound.

In a case where it is determined that there are only related persons around the operator, the determination unit 543 instructs the message generation unit 544 to prevent generation of a warning message, and instructs the warning sound generation unit 545 to prevent generation of a warning sound.

(Message Generation Unit 544)

The message generation unit 544 generates a warning message in accordance with an instruction from the determination unit 543. The warning message generated by the message generation unit 544 is, for example, as illustrated in FIGS. 3A and 3B.

The message generation unit 544 outputs the generated warning message to the operation panel 519 via the input/output circuit 558. The warning message is displayed by the operation panel 519.

(Warning Sound Generation Unit 545)

The warning sound generation unit 545 generates a warning sound in accordance with an instruction from the determination unit 543. The warning sound generated by the warning sound generation unit 545 is, for example, a digital audio signal obtained by converting a message "WE ARE DEALING WITH IMPORTANT DOCUMENTS PLEASE MOVE AWAY BY A CERTAIN DISTANCE." into audio.

The warning sound generation unit 545 outputs the generated warning sound to the speaker 515 via the output circuit 562. The warning sound is output by voice by the speaker 515.

1.7 Server Device 4

Figure 5:
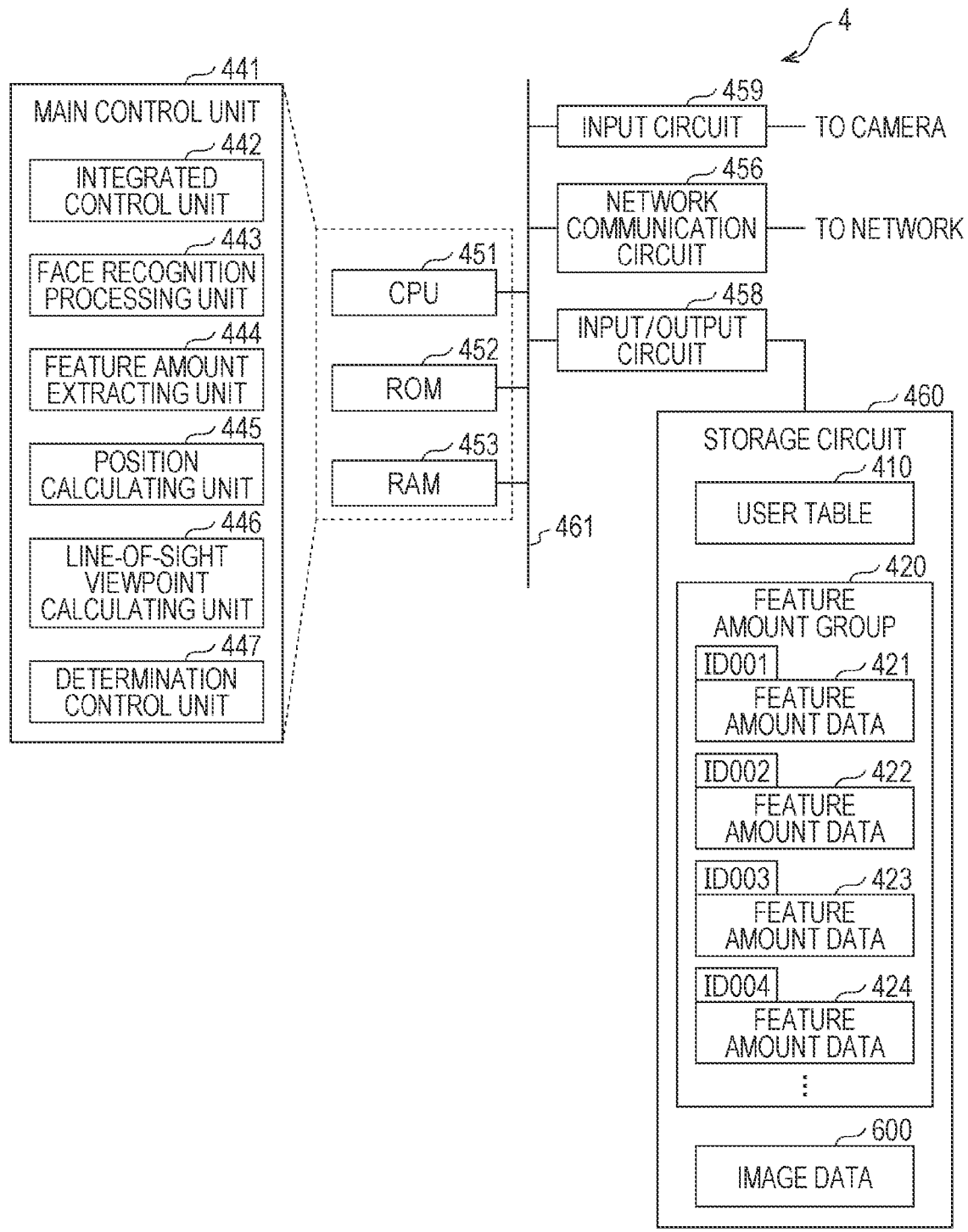
FIG. 5 is a block diagram illustrating a configuration of a server device.

As illustrated in FIG. 5, the server device 4 includes a CPU 451, a ROM 452, a RAM 453, a storage circuit 460, a network communication circuit 456, an input/output circuit 458, an input circuit 459, a bus 461, and the like.

The CPU 451, the ROM 452, the RAM 453, the network communication circuit 456, the input/output circuit 458, and the input circuit 459 are connected to one another via the bus 461.

The RAM 453 provides a work area when the CPU 451 executes a program.

The ROM 452 and the storage circuit 460 store a control program and the like for causing functions of the server device 4 to be executed.

The CPU 451 operates in accordance with the control program stored in the ROM 452 and the storage circuit 460.

The CPU 451, the ROM 452, and the RAM 453 constitute a main control unit 441.

The CPU 451 operates in accordance with the control program, whereby the main control unit 441 configures an integrated control unit 442, a face recognition processing unit 443, a feature amount extracting unit 444, a position calculating unit 445, a line-of-sight viewpoint calculating unit 446, and a determination control unit 447.

The network communication circuit 456 is connected to the image forming apparatus 5 via the network 2. The network communication circuit 456 receives a user identifier that identifies a user, and image data generated by imaging by the camera 6 from the image forming apparatus 5 via the network 2. In addition, the network communication circuit 456 transmits the processing code (0) to the processing code (n) to the image forming apparatus 5 via the network 2.

The input circuit 459 is connected to a camera 9 (see FIG. 22) via a signal line. In addition, the input circuit 459 is connected to a camera 9a (see FIG. 28A) via another signal line.

The input/output circuit 458 is connected to the storage circuit 460. The input/output circuit 458 reads data from the storage circuit 460 and writes data to the storage circuit 460. When the image data generated by imaging by the camera 6 is received from the image forming apparatus 5 by the network communication circuit 456, the input/output circuit 458 writes the received image data to the storage circuit 460 as the image data 600.

(1) Storage Circuit 460

The storage circuit 460 (storage) includes, for example, a hard disk.

The storage circuit 460 stores the control program for causing the functions of the server device 4 to be executed.

In addition, as illustrated in FIG. 5, the storage circuit 460 stores a user table 410 and feature amount data 421, 422, 423, 424, in advance. The feature amount data 421, 422, 423, 424, constitute a feature amount group 420.

Further, the storage circuit 460 includes an area for storing the image data 600. The image data 600 is image data generated by imaging by the camera 6 and received from the image forming apparatus 5.

(User Table 410)

The user table 410 is a data table that stores information regarding a user who uses the image forming apparatus 5.

Figures 6, 7:
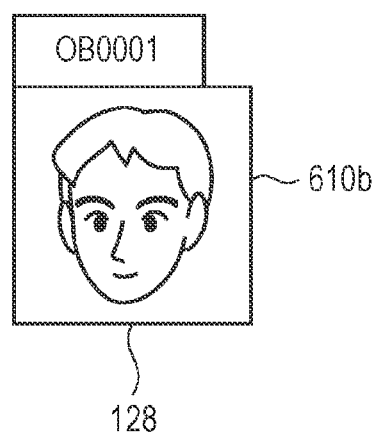
FIG. 6 illustrates an example of a data structure of a user table stored in a storage circuit of the server device.
FIG. 7 illustrates, as an example, face image data extracted from the image.

As illustrated in FIG. 6, the user table 410 includes a plurality of pieces of user information 411. The plurality of pieces of user information corresponds to a respective plurality of users who uses the image forming apparatus 5.

Each piece of user information 411 includes a user identifier 412, a company name 413, and an affiliation department name 414.

The user identifier 412 is identification information for uniquely identifying the user.

The company name 413 is a name of a company or the like to which the user belongs.

The affiliation department name 414 is a name of a department or the like to which the user belongs.

Here, the company name 413 and the affiliation department name 414 are collectively referred to as an organization name.

(Feature Amount Group 420)

As described above, the feature amount group 420 includes the feature amount data 421, 422, 423, 424, . . . .

Each piece of feature amount data is data including a feature amount extracted from the face image of the user who uses the image forming apparatus 5. The feature amount includes, for example, a relative positional relationship between two eyes, a nose, and a mouth in the face image.

The feature amount data 421, 422, 423, 424, corresponds to respective face images of the plurality of users who uses the image forming apparatus 5.

An identifier is assigned to the feature amount data 421, 422, 423, 424, Each identifier assigned to the feature amount data 421, 422, 423, 424, is the same as the user identifier that identifies each of the plurality of users who uses the image forming apparatus 5.

Note that the storage circuit 460 may store a face image of each of the plurality of users who uses the image forming apparatus 5 instead of the feature amount data 421, 422, 423, 424, . . . . In this case, the feature amount data 421, 422, 423, 424, may be generated from each face image by the feature amount extracting unit 444.

As described above, the storage circuit 460 (storage) stores the identifier that identifies the user who uses the image forming apparatus 5, the face image (feature amount data) of the user, and the company name and the affiliation department name (organization name) that are names of the company and the affiliation department to which the user belongs, in association with each other.

(2) Integrated Control Unit 442

The CPU 451 operates in accordance with the control program, whereby the integrated control unit 442 integrally controls the network communication circuit 456, the input/output circuit 458, the input circuit 459, and the like. In addition, the CPU 451 operates in accordance with the control program, whereby the integrated control unit 442 integrally controls the face recognition processing unit 443, the feature amount extracting unit 444, the position calculating unit 445, the line-of-sight viewpoint calculating unit 446, the determination control unit 447, and the like.

When the user identifier that identifies the user is received from the image forming apparatus 5 via the network 2 by the network communication circuit 456, the integrated control unit 442 reads the user information corresponding to the received user identifier from the user table 410, and extracts the company name and the affiliation department name (first organization name) from the read user information. The integrated control unit 442 temporarily stores the extracted company name and affiliation department name.

In addition, when the image data generated by imaging by the camera 6 is received from the image forming apparatus 5 via the network 2 by the network communication circuit 456, the integrated control unit 442 controls the face recognition processing unit 443, the feature amount extracting unit 444, the position calculating unit 445, the line-of-sight viewpoint calculating unit 446, the determination control unit 447, and the like so that processing of each unit is executed.

(3) Face Recognition Processing Unit 443

By control of the integrated control unit 442, the face recognition processing unit 443 (acquisition device) reads the image data 600 from the storage circuit 460, and cuts out face image data including the face image representing the face portion of the user from the image 601 (FIG. 4) included in the read image data 600. The face image data is cut out, for example, by recognizing a set of an eye, a nose, a mouth, and an ear in the image 601. As an example, face image data respectively including face images 610, 611, 612, and 613 are cut out from the image 601 illustrated in FIG. 4. Here, in FIG. 7, face image data 610*b* cut out by the face recognition processing unit 443 is illustrated as an example.

Here, the face image data is person information indicating a person present within a predetermined range from the image forming apparatus 5, and the face recognition processing unit 443 acquires the face image data as the person information.

In addition, the face recognition processing unit 443 also cuts out each of the eye, the nose, the mouth, and the ear as part data. Further, for each piece of part data, the face recognition processing unit 443 determines which of the eye, the nose, the mouth, or the ear the part data is, and identifies its part type. Here, in FIG. 8, part data 137*a*, 137*b*, 137*c*, 137*d*, 137*e*, and 137*f* cut out by the face recognition processing unit 443 are illustrated as an example.

The face recognition processing unit 443 writes the face image data and the part data cut out from the image data 600 to the storage circuit 460.

In addition, the face recognition processing unit 443 selects a face image located in the central part of the image 601 from the cut-out face image data, thereby identifying the face image data of the operator who operates the image forming apparatus 5. As an example, in the image 601 illustrated in FIG. 4, the face recognition processing unit 443 identifies the face image 610 located at the central part of the image 601 as the face image of the operator who operates the image forming apparatus 5.

(4) Position Calculating Unit 445

In the image 601 included in the image data 600, the position calculating unit 445 calculates a standing position of the user of the cut-out face image in the three-dimensional space where the image forming apparatus 5 exists, based on a positional relationship between a position of the face image represented by the face image data cut out by the face recognition processing unit 443 and the back image of the image forming apparatus 5 reflected in the image 601. Here, the standing position of the user is indicated by a position of the central portion of the face of the user standing around the image forming apparatus 5.

Note that it is assumed that a position where the image forming apparatus 5 is installed in the three-dimensional space is known. In addition, it is assumed that a position of the operation panel 519, a position of the document tray 517, a position of the document discharge tray 518, and a position of the printed matter discharge tray 516 are also known in the three-dimensional space.

(5) Line-of-Sight Viewpoint Calculating Unit 446

(Calculation of Horizontal Orientation of Face of User)

The line-of-sight viewpoint calculating unit 446 calculates a horizontal orientation of the face of the user for each user as follows.

Figure 9A:
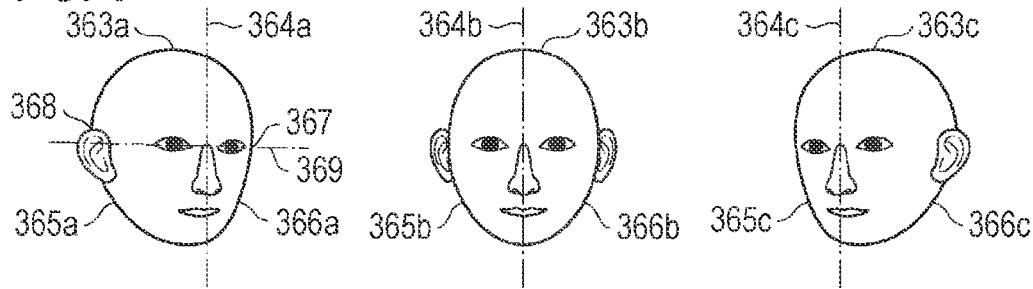
FIG. 9A illustrates a schematic diagram of a user's head oriented in three directions.

FIG. 9A illustrates, as an example, a schematic diagram of the user's head in three directions imaged in a two-dimensional image. That is, a head 363*a* of the user facing the left side, a head 363*b* of the user facing front, and a head 363*c* of the user facing the right side are illustrated.

In the head 363*a* facing the left side, when a center line 364*a* that is a straight line passing through a midpoint between the left eye and the right eye in the vertical direction of the head 363*a* is set, and a left side contour line 366*a* indicating a left side contour of the head 363*a* is set, and a right side contour line 365*a* indicating a right side contour of the head 363*a* is set, the center line 364*a* exists at a position closer to the left side contour line 366*a* than the right side contour line 365*a*.

In addition, in the head 363*b* facing the front, when a center line 364*b*, a left side contour line 366*b*, and a right side contour line 365*b* are set similarly to the head 363*a*, the center line 364*b* exists at a substantially center position between the right side contour line 365*b* and the left side contour line 366*b*.

In addition, in the head 363c facing the right side, when a center line 364c, a left side contour line 366c, and a right side contour line 365c are set similarly to the head 363a, the center line 364c exists at a position closer to the right side contour line 365c than the left side contour line 366c.

Thus, the line-of-sight viewpoint calculating unit 446 can estimate the horizontal orientation of the face of the user by determining whether the center line of the head exists on the side close to the left side contour line or the side close to the right side contour line.

Figure 9B:
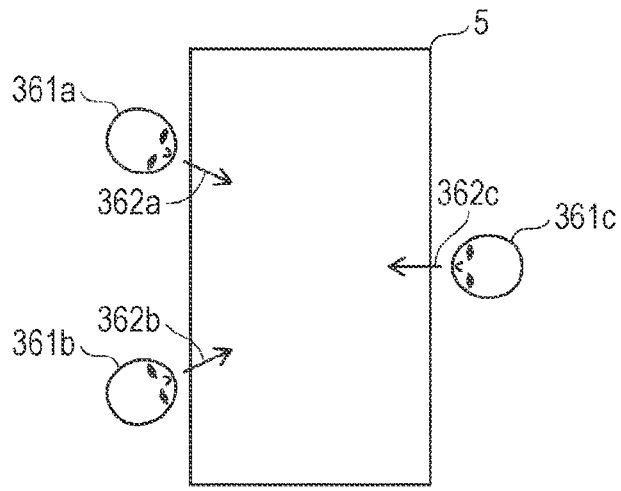
FIG. 9B illustrates horizontal orientations of the user's head.

As a result, as illustrated in FIG. 9B, the horizontal orientations 362a, 362b, and 362c in which the user's heads 361a, 361b, and 361c face can be estimated. Here, FIG. 9B is a conceptual diagram in a case where a plurality of users standing around the image forming apparatus 5 is viewed from above the image forming apparatus 5. Note that, this figure is a conceptual diagram for explaining a method of estimating the horizontal orientation of the face of the user, and does not illustrate an image generated by imaging by the camera 6 installed at back side upper part of the image forming apparatus 5.

Specifically, the line-of-sight viewpoint calculating unit 446 calculates the center line by using left eye part data, right eye part data, and the face image data. In addition, the line-of-sight viewpoint calculating unit 446 calculates the left side contour line and the right side contour line by using the face image data. Next, the line-of-sight viewpoint calculating unit 446 calculates a ratio between a left distance between the center line and the left side contour line, and a right distance between the center line and the right side contour line, by using the face image data. For example, in a case where the center line exists at the center between the left side contour line and the right side contour line, the ratio is 50%. In a case where the center line matches the left side contour line, the ratio is left 0%. In a case where the center line matches the right side contour line, the ratio is right 0%. In a case where the ratio between the left distance between the center line and the left side contour line, and the right distance between the center line and the right side contour line is 1:3, the ratio is left 25%. In a case where the ratio between the left distance between the center line and the left side contour line, and the right distance between the center line and the right side contour line is 3:1, the ratio is right 25%.

As described above, the line-of-sight viewpoint calculating unit 446 calculates the horizontal orientation in which the face of the user faces, based on the calculated ratio.

(Calculation of Inclination from Vertical Direction of Face of User)

The line-of-sight viewpoint calculating unit 446 calculates an inclination from the vertical direction of the face (head) of the user for each user as follows.

Figure 9C:
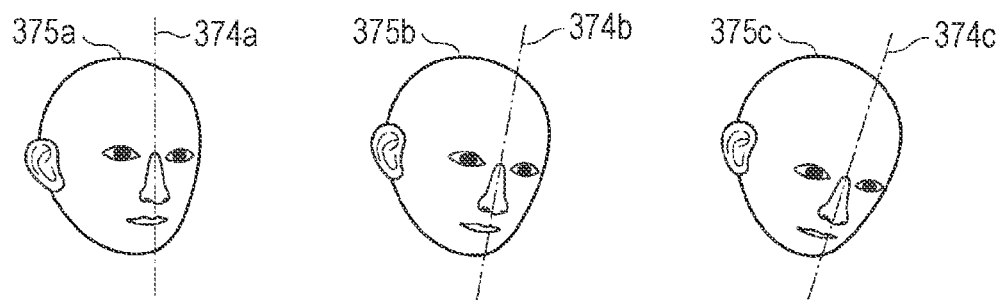
FIG. 9C illustrates a schematic diagram of the user's head having three inclinations with respect to the vertical direction.

FIG. 9C illustrates a face 375a of the user that is not inclined with respect to the vertical direction, a face 375b of the user that is slightly inclined with respect to the vertical direction, and a face 375c of the user that is further inclined with respect to the vertical direction.

On the face 375a of the user that is not inclined with respect to the vertical direction, a center line 374a maintains substantially the vertical direction. On the face 375b of the user that is slightly inclined with respect to the vertical direction, a center line 374b is slightly inclined with respect to the vertical direction. On the face 375c of the user that is further inclined with respect to the vertical direction, a center line 374c is further inclined with respect to the vertical direction.

Figure 9D:
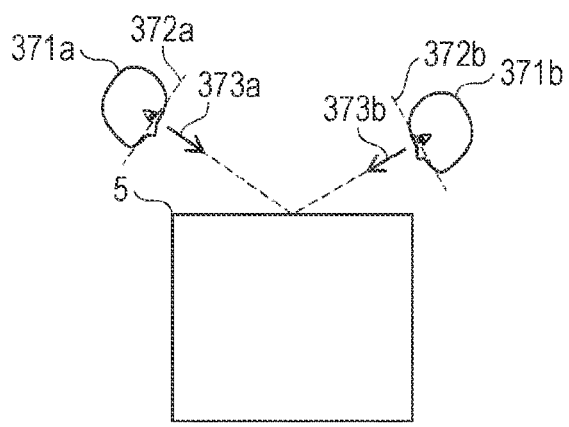
FIG. 9D illustrates inclinations from the vertical direction of the user's head.

Thus, if the center line of the user's head is used, it is possible to know the inclination from the vertical direction of the face of the user. That is, as illustrated in FIG. 9D, it is possible to know line-of-sight directions 373a and 373b from inclinations from the vertical direction of center lines 372a and 372b of faces 371a and 371b of the user. Here, FIG. 9D is a conceptual diagram in a case where a plurality of users standing around the image forming apparatus 5 is viewed from a side face of the image forming apparatus 5. Note that, this figure is a conceptual diagram for explaining a method of estimating the inclination from the vertical direction of the face of the user, and does not illustrate an image generated by imaging by the camera 6 installed at back side upper part of the image forming apparatus 5.

Specifically, similarly to the case of calculating the horizontal orientation of the face of the user, the line-of-sight viewpoint calculating unit 446 calculates the center line by using the left eye part data, the right eye part data, and the face image data.

Next, the line-of-sight viewpoint calculating unit 446 calculates an angle with respect to a vertical line of the calculated center line, and sets the angle as the inclination from the vertical direction of the face of the user.

(Generation of Line-of-Sight Information)

The line-of-sight viewpoint calculating unit 446 calculates line-of-sight information indicating a line of sight of the user, by combining the standing position of the user, the calculated horizontal orientation of the face of the user, and the inclination from the vertical direction of the face of the user, for each user.

(Generation of Viewpoint Information)

The line-of-sight viewpoint calculating unit 446 extends a straight line in a direction in which the line of sight of the user indicated by the calculated line-of-sight information is directed, and calculates a point at which the extended straight line intersects a surface of the housing of the image forming apparatus 5 as a viewpoint position of the user.

(6) Feature Amount Extracting Unit 444

The feature amount extracting unit 444 extracts, from each face image data cut out by the face recognition processing unit 443, its feature amount. The feature amount extracting unit 444 extracts, as a feature amount, an arrangement relationship of both eyes, nose, and mouth in the face image, for example. Specifically, it is an index in which a distance between the left eye and the right eye, a distance between the right eye and the nose, a distance between the left eye and the nose, and a distance between the nose and the mouth included in the face image are represented by relative lengths.

(7) Determination Control Unit 447

The determination control unit 447 (determination device, control device) determines whether or not a person other than the operator among persons indicated by the acquired person information is a related person of the operator as described below, and controls the image forming apparatus 5 so that warning information is output in a case where it is determined that the person is not a related person, and controls the image forming apparatus 5 so that output of warning information is prevented in a case where it is determined that the person is the related person.

The determination control unit 447 has processing code (0) to processing code (i) as array type variables. When the number of users reflected in the image 601 is n, the determination control unit 447 uses the processing code (0) to the processing code (n). Here, both n and i are integers, and n<i.

The processing code (0) corresponds to the operator who is performing operation onto the image forming apparatus 5.

The processing code (1) to the processing code (n) correspond to other users except the operator who is performing operation onto the image forming apparatus 5.

The other users include a related person of the operator who is performing operation onto the image forming apparatus 5 and a person who is not a related person of the operator who is performing operation.

The related person of the operator who is performing operation is allowed to peep into the document set in the image forming apparatus 5, the printed matter output from the image forming apparatus 5, the operation panel 519, or the like. In this case, the determination control unit 447 sets "0" for the corresponding processing code.

On the other hand, the person who is not a related person of the operator who is performing operation is prohibited from peeping into the document set in the image forming apparatus 5, the printed matter output from the image forming apparatus 5, the operation panel 519, or the like. In this case, the determination control unit 447 sets "1" for the corresponding processing code.

Here, the processing code set to "1" among the processing code (1) to the processing code (n) is warning information.

Details of the determination control unit 447 will be described below.

The determination control unit 447 first sets an initial value "0" for an index n of the processing code. In addition, the determination control unit 447 sets an initial value "0" for all of the processing code (0) to the processing code (i).

Next, in a case where there is not another face image other than the face image of the operator who operates the image forming apparatus 5 in the image data 600, the determination control unit 447 sets "0" for the processing code (0), and controls the network communication circuit 456 so that the processing code (0) is transmitted to the image forming apparatus 5 via the network 2. In this case, this ends a series of pieces of processing.

In a case where there is another face image other than the face image of the operator who operates the image forming apparatus 5 in the image data 600, the determination control unit 447 performs control so that following procedures (a), (b), (c), (c-1), (c-1-1), (c-1-2), and (c-2) are repeated for each of the other face images.

(a) The determination control unit 447 adds "1" to the index n.

(b) The determination control unit 447 controls the feature amount extracting unit 444 so that a feature amount is extracted from another face image.

(c) The determination control unit 447 (reading device) compares a feature amount extracted from another face image with feature amounts included in all pieces of feature amount data in the feature amount group 420 of the storage circuit 460, and determines whether or not the extracted feature amount matches the feature amounts.

(c-1) In a case where it is determined that there is a matched feature amount, the determination control unit 447 (reading device) acquires an identifier of feature amount data including the matched feature amount in the feature amount group 420, and reads a company name and an affiliation department name identified by the acquired identifier from the user table 410. The determination control unit 447 compares the read company name and affiliation department name (second organization name) with the company name and affiliation department name (first organization name) of the operator who is operating the image forming apparatus 5, and determines whether or not the second organization name matches the first organization name.

(c-1-1) In a case where it is determined that the read company name and affiliation department name match the company name and affiliation department name of the operator, the determination control unit 447 sets the processing code (n) to "0" and performs control so that the processing code (n) is transmitted to the image forming apparatus 5 via the network 2.

(c-1-2) In a case where it is determined that the read company name and affiliation department name do not match the company name and affiliation department name of the operator, the determination control unit 447 performs control so that viewpoint processing (see description of FIG. 13 described later) is performed, and performs control so that the processing code (n) is transmitted to the image forming apparatus 5 via the network 2.

(c-2) In a case where it is determined that there is not a matched feature amount, the determination control unit 447 performs control so that viewpoint processing is executed, and performs control so that the processing code (n) is transmitted to the image forming apparatus 5 via the network 2.

As described above, the determination control unit 447 acquires the first organization name that is a name of the organization to which the operator belongs and the second organization name that is a name of the organization to which the person indicated by the person information belongs, and determines whether or not the person is a related person of the operator depending on whether or not the first organization name matches the second organization name. The determination control unit 447 determines that the person is not a related person of the operator in a case where the first organization name does not match the second organization name, and determines that the person is a related person of the operator in a case where the first organization name matches the second organization name.

1.8 Description of Operation (1) Operation in the Security System 1

The operation in the security system 1 will be described with reference to a sequence diagram illustrated in FIGS. 10 to 12.

The login control unit 546 executes login by the operator. As a result, the user identifier is received (step S101). The login control unit 546 controls the network communication circuit 556 so that the user identifier is transmitted to the server device 4 via the network 2. The integrated control unit 442 receives the user identifier from the image forming apparatus 5 via the network 2 and the network communication circuit 456 (step S102).

The integrated control unit 442 reads the user information corresponding to the received user identifier from the user table 410, and extracts the company name and the affiliation department name from the read user information (step S105).

The camera 6 generates image data by imaging (step S103), and outputs the generated image data to the image forming apparatus 5 (step S104). The input circuit 561 receives the image data from the camera (step S104).

The integrated control unit 542 controls the network communication circuit 556 so that the received image data is transmitted to the server device 4 via the network 2. The network communication circuit 456 receives the image data from the image forming apparatus 5 via the network 2, and writes the received image data in the storage circuit 460 (step S106).

The face recognition processing unit 443 detects face images representing face portions of all the users from the image data 600 written in the storage circuit 460 (step S107).

The face recognition processing unit 443 identifies a face image of an operator who operates the image forming apparatus 5 from the detected face image (step S108).

The determination control unit 447 sets "0" for the index n of the processing code (step S109), and initializes each of the processing code (0) to the processing code (i) to "0" (step S110).

The face recognition processing unit 443 determines whether or not there is another face image other than the face image of the operator who operates the image forming apparatus 5 in the detected face image (step S131).

In a case where it is determined that there is not another face image other than the face image of the operator who operates the image forming apparatus 5 ("NO" in step S131), the determination control unit 447 sets "0" for the processing code (0) since only the operator who operates the image forming apparatus 5 is included in the image data 600 (step S132), and controls the network communication circuit 456 so that the processing code (0) is transmitted to the image forming apparatus 5 via the network 2 (step S133). In this case, this ends a series of processing steps in the server device 4.

In a case where it is determined that there is another face image other than the face image of the operator who operates the image forming apparatus 5 ("YES" in step S131), the determination control unit 447 repeats the next steps S135 to S143 for each of the other face images (steps S134 to S144).

The determination control unit 447 adds "1" to the index n (step S135).

The feature amount extracting unit 444 extracts a feature amount from the other face image (step S136).

The determination control unit 447 compares the feature amount extracted from the other face image with the feature amounts included in all pieces of feature amount data in the feature amount group 420 of the storage circuit 460, and determines whether or not the feature amounts match each other (step S137).

In a case where it is determined that there is a matched feature amount ("YES" in step S138), the determination control unit 447 acquires an identifier of feature amount data including the matched feature amount in the feature amount group 420, reads a company name and an affiliation department name identified by the acquired identifier from the user table 410, compares the read company name and affiliation department name with the company name and the affiliation department name of the operator who is operating the image forming apparatus 5 read in step S105, and determines whether or not the read company name and affiliation department name match the company name and the affiliation department name of the operator (step S139).

In a case where it is determined that the read company name and affiliation department name match the company name and the affiliation department name of the operator ("YES" in step S140), the determination control unit 447 sets the processing code (n) to "0" (step S141), and performs control so that the processing code (n) is transmitted to the image forming apparatus 5 via the network 2 (step S143).

In a case where it is determined that there is not a matched feature amount ("NO" in step S138), the determination control unit 447 performs control so that viewpoint processing is executed (step S145), and performs control so that the processing code (n) is transmitted to the image forming apparatus 5 via the network 2 (step S143).

In a case where it is determined that the read company name and affiliation department name do not match the company name and affiliation department name of the operator ("NO" in step S140), the determination control unit 447 performs control so that viewpoint processing is performed (step S142), and performs control so that the processing code (n) is transmitted to the image forming apparatus 5 via the network 2 (step S143).

When repetition of steps S135 to S143 ends, a series of processing steps in the server device 4 ends.

The network communication circuit 556 receives the processing code (0) to the processing code (n) from the server device 4 via the network 2 (step S133, S143).

The determination unit 543 determines whether or not there is at least one processing code of "1" among the received processing code (0) to processing code (n) (step S161).

In a case where there is at least one processing code of "1" among the received processing code (0) to processing code (n) ("YES" in step S162), the message generation unit 544 generates a warning message in accordance with an instruction from the determination unit 543. The message generation unit 544 outputs the generated warning message to the operation panel 519 via the input/output circuit 558. The operation panel 519 displays the warning message (step S163). Next, the warning sound generation unit 545 generates a warning sound in accordance with an instruction from the determination unit 543. The warning sound generation unit 545 outputs the generated warning sound to the speaker 515 via the output circuit 562. The speaker 515 outputs the warning sound by voice (step S164).

In a case where there is no processing code of "1" among the received processing code (0) to processing code (n) ("NO" in step S162), the warning message and the warning sound are not generated and are not output.

The operation panel 519 receives the operation by the operator (step S165).

The main control unit 541 controls the network communication circuit 556, the scanner control circuit 557, the printer control circuit 559, and the like to cause them to operate in accordance with the operation by the operator, and corresponding processing is executed (step S166).

Next, the login control unit 546 performs logout (step S167), and then the main control unit 541 shifts the control to step S101 and continues the processing.

Thus, a series of pieces of processing in the security system 1 is ended.

(2) Operation of Viewpoint Processing

Figure 13:
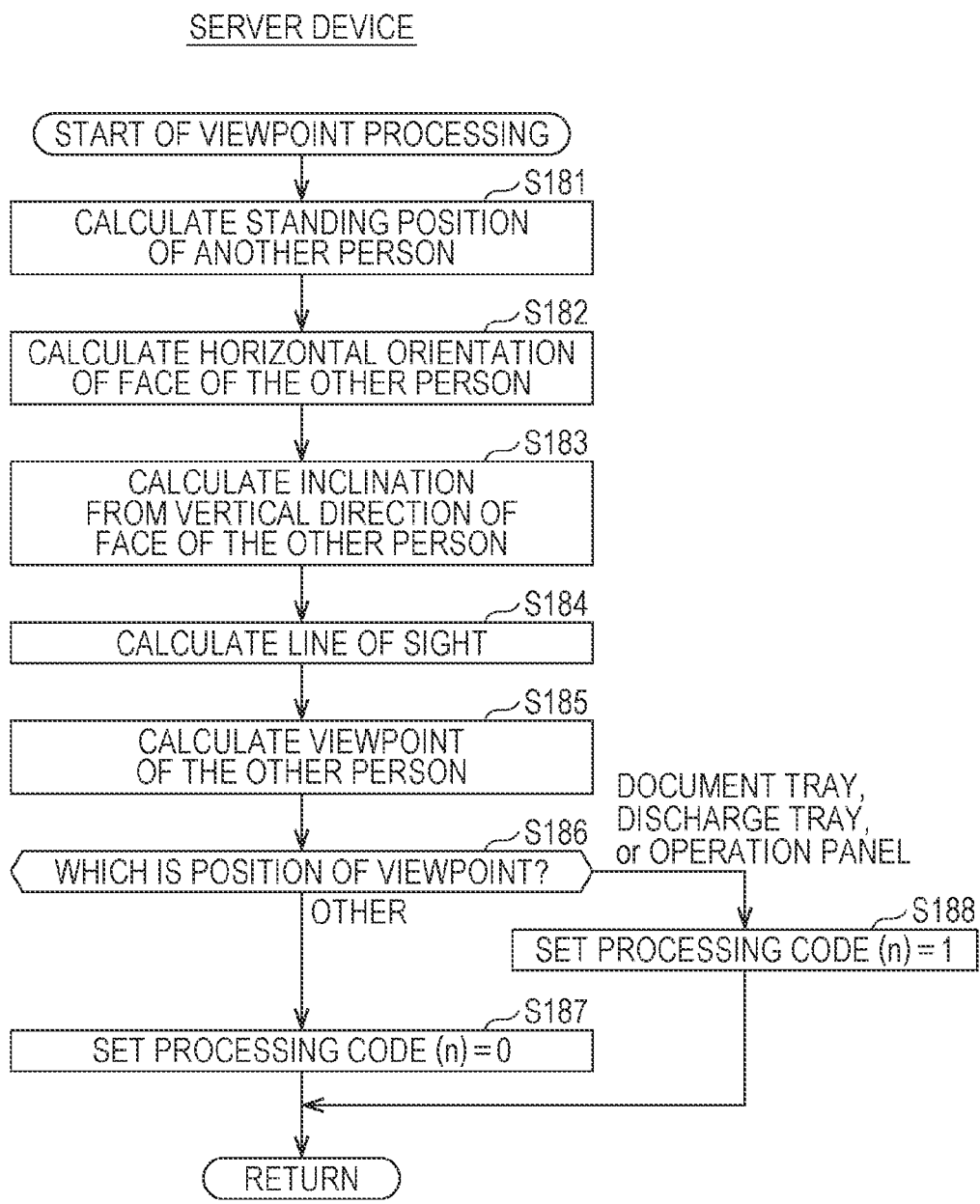
FIG. 13 is a flowchart illustrating operation of viewpoint processing in the server device.

The operation of the viewpoint processing in the server device 4 will be described with reference to a flowchart illustrated in FIG. 13.

Note that the operation described below is details of steps S145 and S142 illustrated in FIG. 11.

The position calculating unit 445 calculates a standing position of another person (step S181).

Next, the line-of-sight viewpoint calculating unit 446 calculates a horizontal orientation of the face of the other person (step S182).

Next, the line-of-sight viewpoint calculating unit 446 calculates an inclination from the vertical direction of the face of the other person (step S183).

Next, the line-of-sight viewpoint calculating unit 446 calculates a line of sight (step S184).

Next, the line-of-sight viewpoint calculating unit 446 calculates a viewpoint of the other person (step S185).

Next, the determination control unit 447 determines whether or not a position of the calculated viewpoint is any of the document tray 517, the document discharge tray 518, the printed matter discharge tray 516, and the display surface of the operation panel 519 of the image forming apparatus 5 (step S186).

In a case where it is determined that the position of the calculated viewpoint is any of the document tray 517, the document discharge tray 518, the printed matter discharge tray 516, and the display surface of the operation panel 519 of the image forming apparatus 5 ("DOCUMENT TRAY, DISCHARGE TRAY, or OPERATION PANEL" in step S186), the determination control unit 447 sets the processing code (n) to "1" (step S188).

Otherwise ("OTHER" in step S186), the determination control unit 447 sets the processing code (n) to "0" (step S187).

Thus, the operation of the viewpoint processing is ended.

1.9 Summary

As described above, according to the first example, in a case where a person who peeps into the document, the printed matter, the display screen, or the like is a related person of the operator, a warning is not issued, and thus there is an effect that it is possible to reduce botheration caused by the warning for the operator.

Note that, in the above description, in a case where it is determined that the position of the calculated viewpoint is any of the document tray 517, the document discharge tray 518, the printed matter discharge tray 516, and the display surface of the operation panel 519 of the image forming apparatus 5, the determination control unit 447 sets the processing code (n) to "1". That is, in a case where the viewpoint of the user exists in any of the document discharge tray 518, the printed matter discharge tray 516, and the display surface of the operation panel 519, it is regarded that the user is peeping in. However, the present embodiment is not limited thereto.

A user present within a certain range from the image forming apparatus 5 may be regarded as peeping in or having a possibility of peeping in, except for a related person. That is, it is not necessarily required to determine whether or not the position of the calculated viewpoint is any of the document tray 517, the document discharge tray 518, the printed matter discharge tray 516, and the display surface of the operation panel 519 of the image forming apparatus 5.

In addition, in a case where the determination control unit 447 determines that a person is not a related person, the network communication circuit 456 (notifier) may notify the image forming apparatus 5 to cause the image forming apparatus 5 to warn the person who is not a related person to move away by a certain distance or more.

In addition, in a case where the determination control unit 447 determines that a person is not a related person, the network communication circuit 456 (notifier) may notify the image forming apparatus 5 to cause the image forming apparatus 5 to warn the operator that there is a person who is not a related person.

In addition, a speaker connected to the network 2 may be installed in proximity to the image forming apparatus 5. In a case where the determination control unit 447 determines that a person is not a related person, the network communication circuit 456 may cause the speaker to output a voice via the network 2 so that the operator or the person who is not a related person is warned that there is a person who is not a related person.

In the first example described above, the determination unit 543 of the image forming apparatus 5 determines whether or not there is at least one processing code of "1" among the received processing code (0) to processing code (n). In a case where there is at least one processing code of "1" among the received processing code (0) to processing code (n), a warning message is displayed and a warning sound is output by voice. On the other hand, in a case where there is no processing code of "1" among the received processing code (0) to processing code (n), the warning message and the warning sound are not generated and are not output.

However, the present embodiment is not limited to this configuration.

Instead of the determination unit 543 of the image forming apparatus 5, the determination control unit 447 (control device) of the server device 4 may determine whether or not there is at least one processing code of "1" among the processing code (0) to processing code (n). The determination control unit 447 may transmit the determination result (whether or not there is at least one processing code of "1") to the image forming apparatus 5 by the network communication circuit 456 (notifier). That is, in a case where there is at least one processing code of "1" among the processing code (0) to processing code (n), that is, in a case where it is determined that there is at least one person who is not a related person, the determination control unit 447 may perform control so that warning information is output. On the other hand, in a case where there is no processing code of "1" among the received processing code (0) to processing code (n), that is, in a case where it is determined that all the persons are related persons, control may be performed so that the output of the warning information is prevented. The determination control unit 447 may transmit the determination result (whether or not there is at least one processing code of "1") to the image forming apparatus 5 by the network communication circuit 456 (notifier). The network communication circuit 556 of the image forming apparatus 5 may receive the determination result, and the determination unit 543 may determine whether to display a warning message and output a warning sound by voice, or not to generate or output the warning message and the warning sound depending on the received determination result.

That is, in a case where the received determination result indicates that there is at least one processing code of "1", the determination unit 543 performs control so that a warning message is displayed and a warning sound is output by voice, the operation panel 519 displays the warning message, and the speaker 515 outputs the warning sound by voice. On the other hand, in a case where the received determination result indicates that there is no processing code of "1", the determination unit 543 performs control so that display of the warning message and output of the warning sound by voice are prevented.

2 First Modification

A first modification of the first example will be described focusing on differences between the first example and the first modification.

Each user of the image forming apparatus 5 may wear the employee ID card indicating the user's own identification, the name of the organization to which the user belongs, and the like, with the employee ID card's display surface facing outward, by hanging the employee ID card from the neck or attaching the employee ID card to the chest.

As illustrated in FIG. 4, in the image 601, the employee ID card images 610c, 611c, 612c, and 613c representing the employee ID cards are displayed on the person images 610a, 611a, 612a, and 613a, respectively.

Figure 14A:
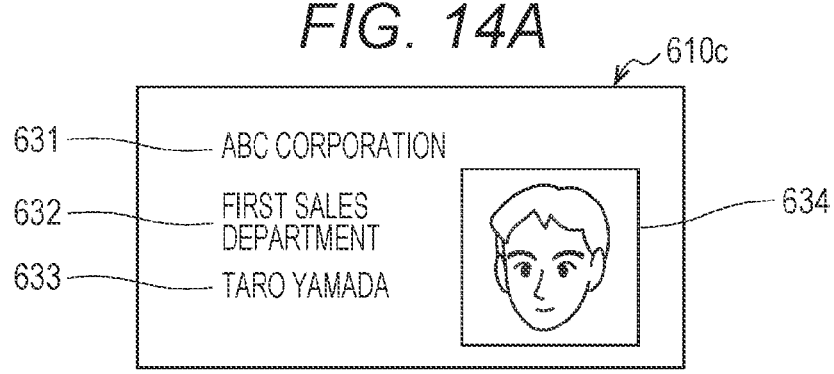
FIG. 14A illustrates an employee ID card image representing an employee ID card owned by a user as a first modification of the first example.

FIG. 14A illustrates details of the employee ID card image 610c. As illustrated in this figure, the employee ID card image 610c includes a company name image 631, a department name image 632, a name image 633, and a face image 634. The employee ID card images 611c, 612c, and 613c are similar to the employee ID card image 610c.

The main control unit 441 further includes an employee ID card image recognition unit 449 (not illustrated) and an optical character recognition (OCR) processing unit 450 (not illustrated).

The employee ID card image recognition unit 449 (acquisition device) recognizes and extracts the employee ID card image from the image 601 as follows.

The employee ID card image recognition unit 449 extracts an area surrounded by a quadrangular frame from the image 601.

Next, the employee ID card image recognition unit 449 controls the OCR processing unit 450 so that a character string is extracted from the extracted area.

By control of the employee ID card image recognition unit 449, the OCR processing unit 450 (extraction device) performs OCR processing on the extracted area to attempt to extract a character string. In a case where a character string can be extracted, the extracted character string is output to the employee ID card image recognition unit 449. In a case where a character string cannot be extracted, that fact is output to the employee ID card image recognition unit 449.

In a case where the character string is received from the OCR processing unit 450, the employee ID card image recognition unit 449 determines that the area is the employee ID card image. Subsequently, the employee ID card image recognition unit 449 (extraction device) recognizes the company name and the affiliation department name by estimation from the received character string. Specifically, the employee ID card image recognition unit 449 estimates that the character string is the company name if there is a character string "corporation" in the received character string, for example. In addition, if the received character string includes, for example, character strings "department" and "section", the employee ID card image recognition unit 449 estimates that the received character string is an affiliation department name. The employee ID card image recognition unit 449 writes the company name and the affiliation department name (second organization name) obtained by the estimation into the storage circuit 460.

On the other hand, in a case where the fact that the character string cannot be extracted is received from the OCR processing unit 450, the employee ID card image recognition unit 449 determines that the area is not the employee ID card image.

As described above, the employee ID card image recognition unit 449 recognizes and extracts one or a plurality of employee ID card images from the image 601. Here, the employee ID card image is person information indicating a person present around (within a predetermined range from) the image forming apparatus 5, and the employee ID card image recognition unit 449 acquires the employee ID card image as the person information.

In addition, the employee ID card image recognition unit 449 may not recognize the employee ID card image at all from the image 601. In this case, processing in the first modification is not performed.

In a case where one or a plurality of employee card images is recognized and extracted from the image 601, the employee ID card image recognition unit 449 identifies the employee card image existing at a position close to substantially the central part of the image 601 among the extracted employee card images, as the employee card image of the employee card worn by the operator.

The determination control unit 447 (reading device) acquires the user identifier acquired by the login of the operator, and reads the company name and the affiliation department name identified by the acquired user identifier from the user table 410 as the first organization name.

The determination control unit 447 compares the second organization name that is the company name and the affiliation department name extracted from the employee ID card image of a person other than the operator with the first organization name that is the company name and the affiliation department name read on the basis of the user identifier acquired by the login of the operator, and determines whether or not the second organization name matches the first organization name.

Note that the determination control unit 447 may compare the company name and the affiliation department name extracted from the employee ID card image of a person other than the operator with the company name and the affiliation department name extracted from the employee ID card image of the operator, and determine whether or not they match each other.

(Operation of First Modification)

Figure 14B:
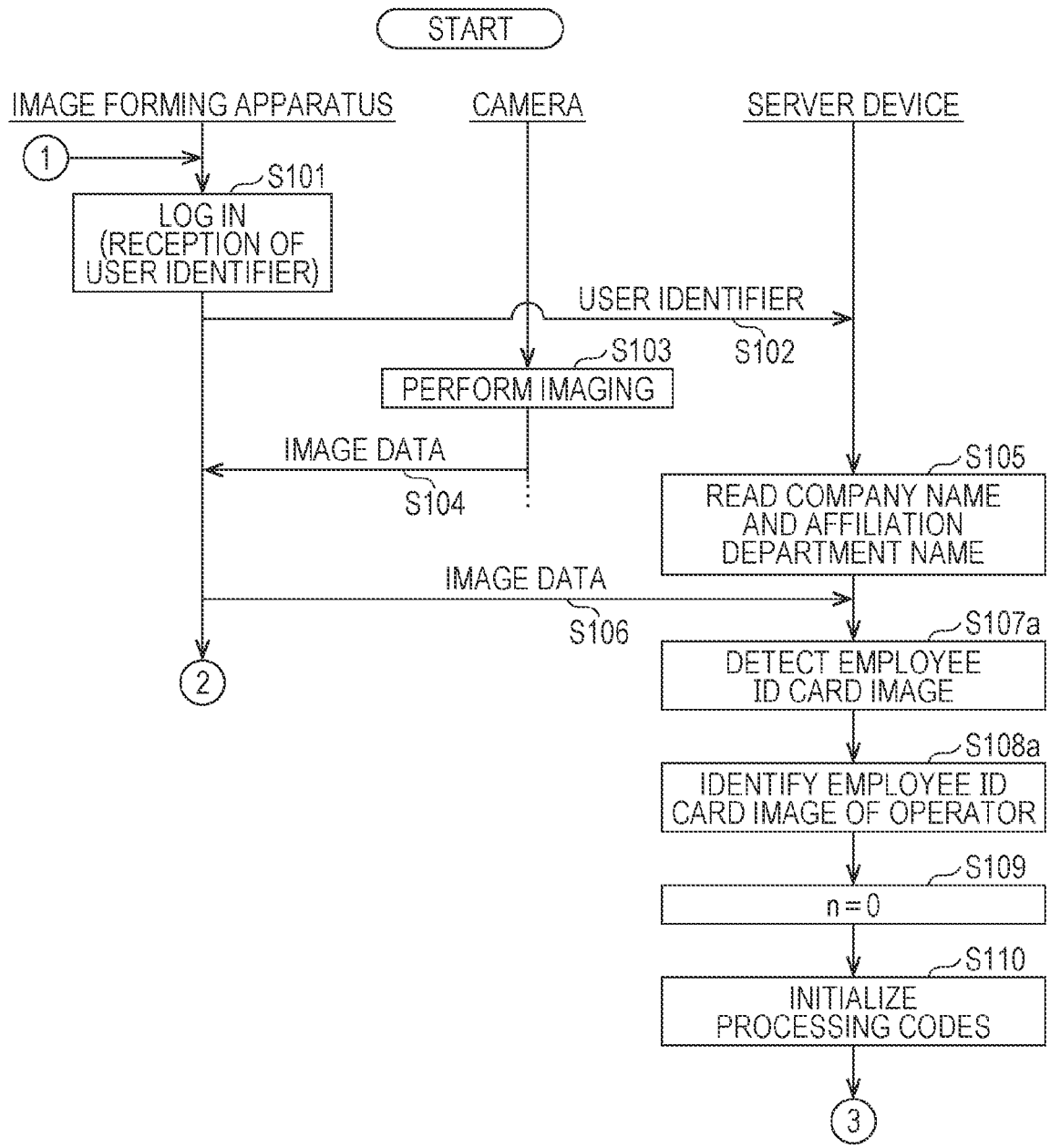
FIG. 14B is a sequence diagram illustrating operation in the first modification (continuing to FIG. 15)
Figure 15:
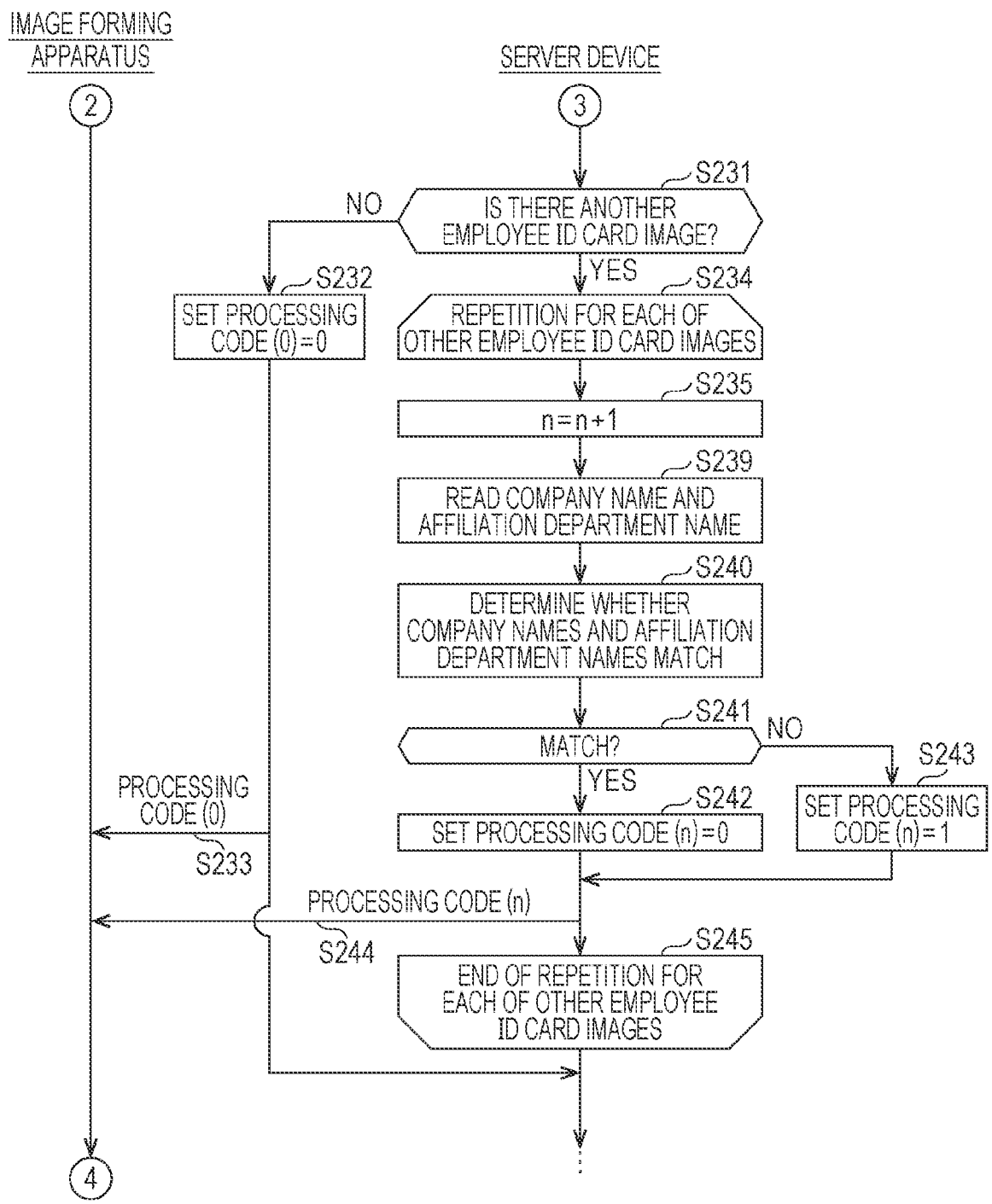
FIG. 15 is the sequence diagram illustrating the operation in the first modification.

The operation of the first modification is similar to the operation of the first example, and can be described by the operation obtained by replacing the operation illustrated in FIGS. 10 and 11 in the operation illustrated in FIGS. 10 to 12 in the first example with the operation illustrated in FIGS. 14B and 15 to be described next.

Thus, here, for the operation of the first modification, a description will be given of the operation illustrated in FIGS. 14B and 15, which is the differences between the first example and the first modification.

The login control unit 546 executes login by the operator. As a result, the user identifier is received (step S101). The login control unit 546 controls the network communication circuit 556 so that the user identifier is transmitted to the server device 4 via the network 2. The integrated control unit 442 receives the user identifier from the image forming apparatus 5 via the network 2 and the network communication circuit 456 (step S102).

The integrated control unit 442 reads the user information corresponding to the received user identifier from the user table 410, and extracts the company name and the affiliation department name from the read user information (step S105).

The camera 6 generates image data by imaging (step S103), and outputs the generated image data to the image forming apparatus 5 (step S104). The input circuit 561 receives the image data from the camera (step S104).

The integrated control unit 542 controls the network communication circuit 556 so that the received image data is transmitted to the server device 4 via the network 2. The network communication circuit 456 receives the image data from the image forming apparatus 5 via the network 2, and writes the received image data in the storage circuit 460 (step S106).

The employee ID card image recognition unit 449 detects the employee ID card images representing the employee IDs of all the users from the image data 600 written in the storage circuit 460 (step S107a).

The employee ID card image recognition unit 449 identifies the employee ID card image of the operator who operates the image forming apparatus 5 from the detected employee ID card images (step S108a).

The determination control unit 447 sets "0" for the index n of the processing code (step S109), and initializes each of the processing code (0) to the processing code (i) to "0" (step S110).

The employee ID card image recognition unit 449 determines whether or not there is another employee ID card image other than the employee ID card image of the operator who operates the image forming apparatus 5 in the detected face image (step S231).

In a case where it is determined that there is not another employee ID card image other than the employee ID card image of the operator who operates the image forming apparatus 5 ("NO" in step S231), the employee ID card image recognition unit 449 sets "0" for the processing code (0) since only the employee ID card image of the operator who operates the image forming apparatus 5 is included in the image data 600 (step S232), and controls the network communication circuit 456 so that the processing code (0) is transmitted to the image forming apparatus 5 via the network 2 (step S233). In this case, this ends a series of processing steps in the server device 4.

In a case where it is determined that there is another employee ID card image other than the employee ID card image of the operator who operates the image forming apparatus 5 ("YES" in step S231), the employee ID card image recognition unit 449 repeats the next steps S235 to S244 for each of the other employee ID card images (steps S234 to S245).

The determination control unit 447 adds "1" to the index n (step S235).

The determination control unit 447 reads the company name and the affiliation department name (second organization name) from the storage circuit 460 (step S239).

The determination control unit 447 compares the company name and the affiliation department name (second organization name) of the read other employee ID card image from the storage circuit 460 with the company name and the affiliation department name (first organization name) of the operator who is operating the image forming apparatus 5 read in step S105, and determines whether or not the second organization name matches the first organization name (step S240).

In a case where it is determined that the second organization name matches the first organization name ("YES" in step S241), the determination control unit 447 sets the processing code (n) to "0" (step S242), and performs control so that the processing code (n) is transmitted to the image forming apparatus 5 via the network 2 (step S244).

In a case where it is determined that the second organization name does not match the first organization name ("NO" in step S241), the determination control unit 447 sets the processing code (n) to "1" (step S243), and performs control so that the processing code (n) is transmitted to the image forming apparatus 5 via the network 2 (step S244).

When repetition of steps S235 to S244 ends, a series of processing steps in the server device 4 ends.

SUMMARY

As described above, it is possible to determine whether the user other than the operator is a related person or not a related person of the operator, by comparing the company name and the department name (second organization name) extracted from the employee ID card image of the person other than the operator with the company name and the department name (first organization name) of the operator.

3 Second Example

A security system 1a as a second example of the embodiment will be described.

3.1 Security System 1a

Figure 16:
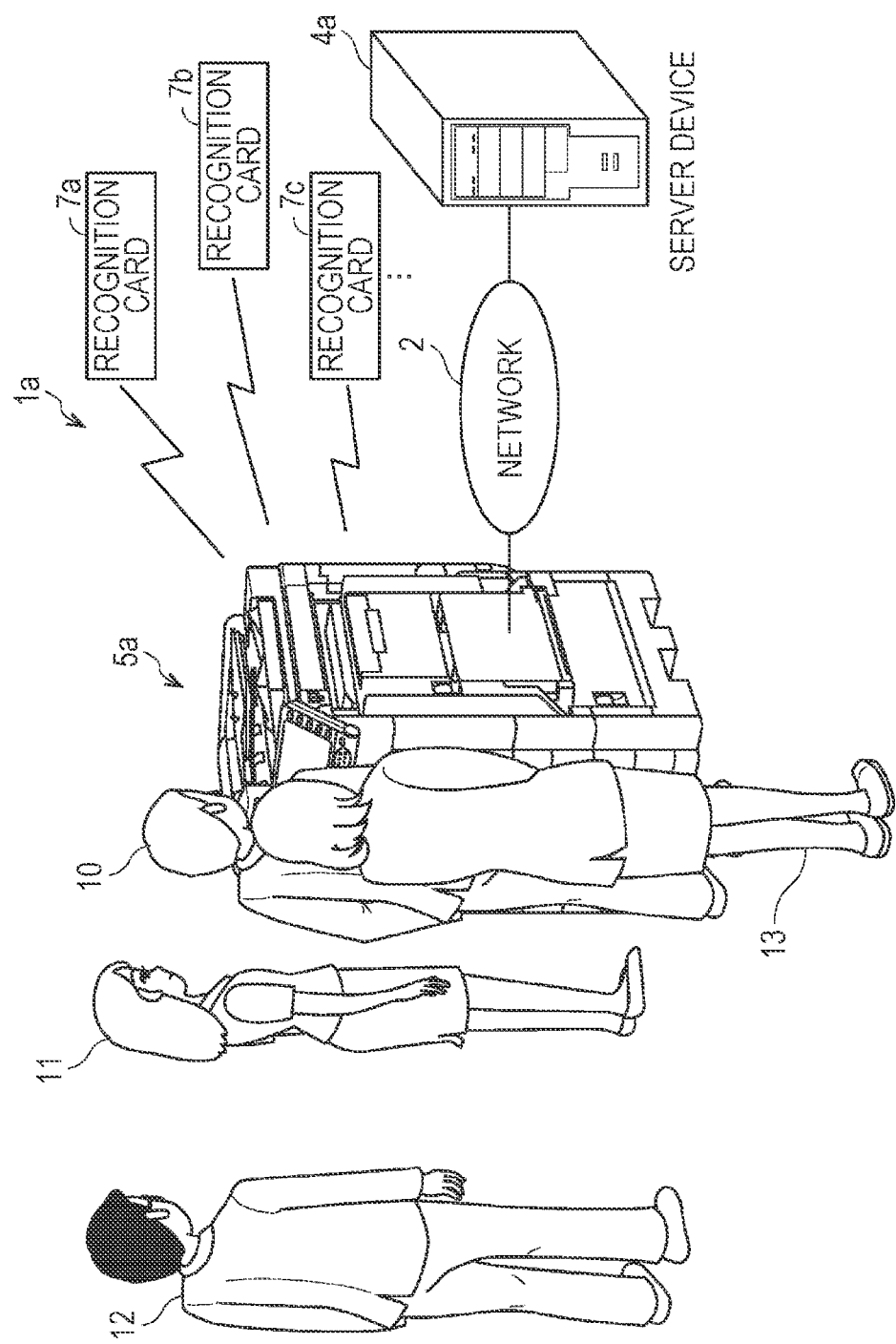
FIG. 16 illustrates a configuration of a security system as a second example.

As illustrated in FIG. 16, the security system 1a includes an image forming apparatus 5a, a server device 4a, and portable identification cards 7a, 7b, 7c, . . . .

The image forming apparatus 5a and the server device 4a are connected to each other via the network 2.

The image forming apparatus 5a is installed in a shared office similarly to the image forming apparatus 5 of the first example.

Similarly to the image forming apparatus 5, the image forming apparatus 5a reads a document to produce printed matter that is a copy of the document, produces printed matter in accordance with a print job received from another information processing device, and transmits document image data generated by reading a document to another information processing device.

Each of the operator 10 who operates the image forming apparatus 5a and the persons 11 to 12 standing around the image forming apparatus 5a possesses a corresponding one of the identification cards 7a, 7b, 7c, Each of the identification cards 7a, 7b, 7c, stores a user identifier that identifies a corresponding one of the persons 10 to 12 who possesses the identification card.

The image forming apparatus 5a and each of the identification cards 7a, 7b, 7c, communicate with each other by short-distance wireless. Each of the identification cards 7a, 7b, 7c, transmits the user identifier stored therein to the image forming apparatus 5a by short-distance wireless.

The image forming apparatus 5a receives the user identifier from each of the identification cards 7a, 7b, 7c, by short-distance wireless. The image forming apparatus 5a transmits all the received user identifiers to the server device 4a via the network 2.

Here, the short-distance wireless is, for example, a wireless communication method defined by the IEEE 802.11 standard. Since a range in which the radio wave reaches by short-distance wireless is within a certain range (predetermined range), only the identification card present within the certain range from the image forming apparatus 5a can transmit the user identifier to the image forming apparatus 5a. For this reason, the image forming apparatus 5a can capture only a person present within the certain range from the image forming apparatus 5a.

The server device 4a receives the user identifier from the image forming apparatus 5a via the network 2.

The server device 4a compares the user identifier of the operator of the image forming apparatus 5a with the received other user identifier, and determines whether the received other user identifier is a user identifier of a person who is a related person who is allowed to peep in or a user identifier of a person who is not a related person who is not allowed to peep in when viewed from the operator.

In a case where the server device 4a determines that the user identifier is a user identifier of a person who is not a related person who is not allowed to peep in, the image forming apparatus 5a outputs a warning to the operator by display, voice, or the like, and further outputs a warning to a surrounding person by voice or the like.

3.2 Image Forming Apparatus 5a

The image forming apparatus 5a has a configuration similar to that of the image forming apparatus 5 of the first example. Here, differences from the image forming apparatus 5 will be mainly described.

Figure 17:
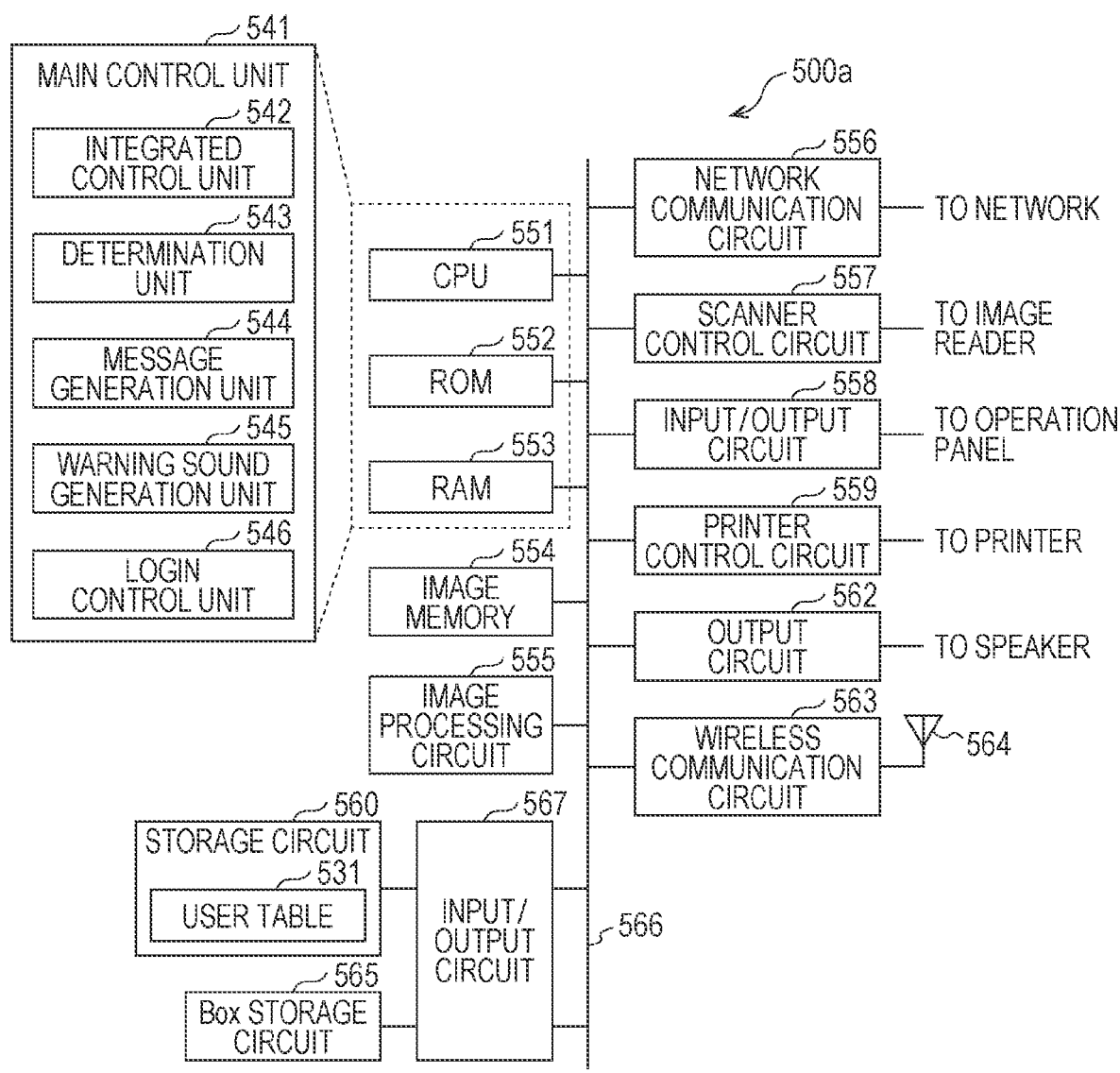
FIG. 17 is a block diagram illustrating a configuration of a control circuit of the second example.

The image forming apparatus 5a includes a control circuit 500a illustrated in FIG. 17 instead of the control circuit 500 included in the image forming apparatus 5 of the first example.

The control circuit 500a has a configuration similar to that of the control circuit 500. Differences between the control circuit 500a and the control circuit 500 are as follows.

The control circuit 500a does not include the input circuit 561 included in the control circuit 500.

The control circuit 500a includes a wireless communication circuit 563 and an antenna 564.

The antenna 564 transmits and receives a wireless signal to and from an antenna of another device by short-distance wireless. The wireless communication circuit 563 performs frequency selection, frequency conversion, and the like of the wireless signal transmitted and received by the antenna 564.

By control of the integrated control unit 542, the wireless communication circuit 563 transmits a user identifier transmission request by short-distance wireless via the antenna 564.

In addition, the wireless communication circuit 563 receives the user identifier from each of the identification cards 7a, 7b, 7c, that have received the user identifier transmission request, by short-distance wireless via the antenna 564. When receiving the user identifier, the wireless communication circuit 563 outputs the received user identifier to the integrated control unit 542.

When receiving the login from the operator by the login control unit 546, the integrated control unit 542 generates a user identifier transmission request. Next, the integrated control unit 542 controls the wireless communication circuit 563 so that the generated user identifier transmission request is transmitted by short-distance wireless via the antenna 564.

When receiving the user identifier from the wireless communication circuit 563, the integrated control unit 542 controls the network communication circuit 556 so that the received user identifier is transmitted to the server device 4a via the network 2.

3.3 Identification Cards 7a, 7b, 7c

Here, the identification card 7a (authentication device) will be described as a representative of the identification cards 7a, 7b, 7c, . . . . Note that the identification cards 7b, 7c, have the same configuration as the identification card 7a, and the description thereof will be omitted.

Figure 18:
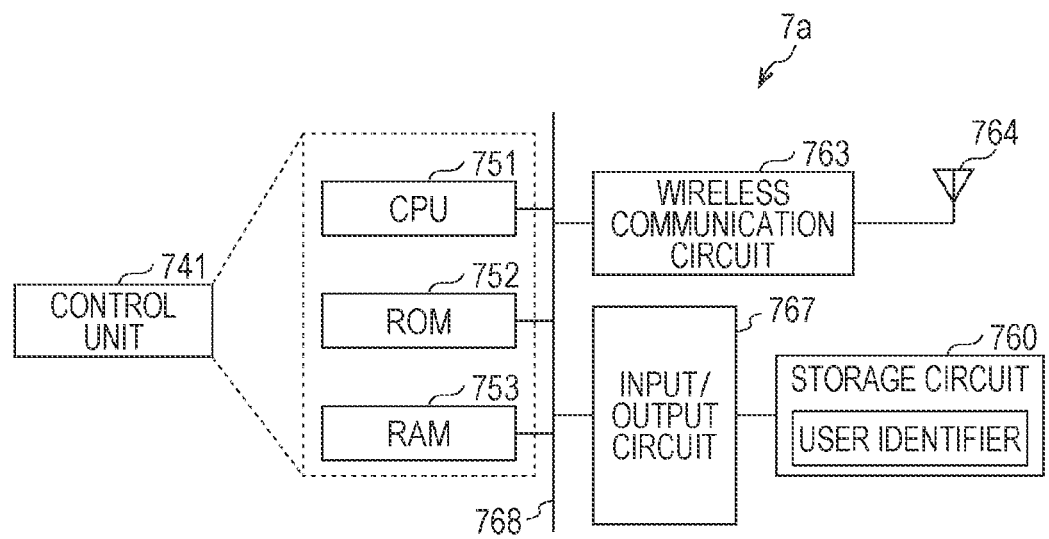
FIG. 18 is a block diagram illustrating a configuration of an identification card of the second example.

As illustrated in FIG. 18, the identification card 7a includes a CPU 751, a ROM 752, a RAM 753, a storage circuit 760, a wireless communication circuit 763, an antenna 764, an input/output circuit 767, a bus 768, and the like.

The CPU 751, the ROM 752, the RAM 753, the wireless communication circuit 763, and the input/output circuit 767 are connected to one another via the bus 768.

In addition, the input/output circuit 767 is connected to the storage circuit 760, and the antenna 764 is connected to the wireless communication circuit 763.

The RAM 753 provides a work area when the CPU 751 executes a program.

The ROM 752 stores a control program and the like for causing operation in the identification card 7a to be executed.

The CPU 751 operates in accordance with the control program stored in the ROM 752.

The CPU 751, the ROM 752, and the RAM 753 constitute a control unit 741.

The storage circuit 760 stores in advance a user identifier for identifying a user who possesses the identification card 7a.

The antenna 764 transmits and receives a wireless signal to and from an antenna of another device by short-distance wireless. The wireless communication circuit 763 performs frequency selection, frequency conversion, and the like of the wireless signal transmitted and received by the antenna 764.

The wireless communication circuit 763 receives the user identifier transmission request from the image forming apparatus 5a by short-distance wireless via the antenna 764. In addition, by control of the control unit 741, the wireless communication circuit 763 transmits a user identifier read from the storage circuit 760 by short-distance wireless via the antenna 764.

When the wireless communication circuit 763 receives the user identifier transmission request, the control unit 741 reads the user identifier from the storage circuit 760 via the input/output circuit 767, and outputs the read user identifier to the wireless communication circuit 763 so that the read user identifier is transmitted.

3.4 Server Device 4a

The server device 4a has a configuration similar to that of the server device 4 of the first example. Here, differences from the server device 4 will be mainly described.

Figure 19:
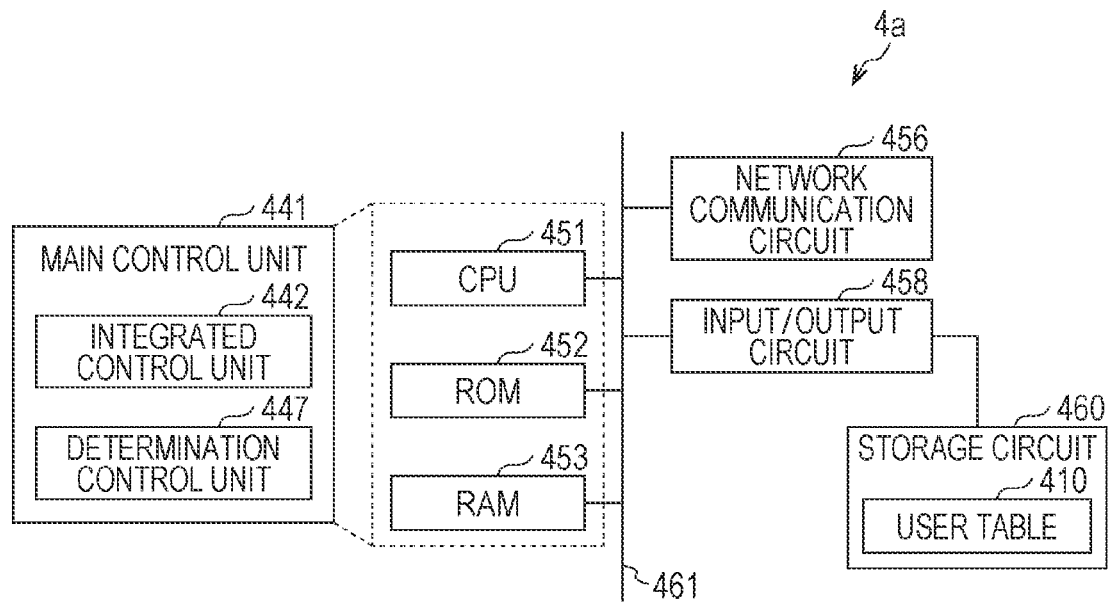
FIG. 19 is a block diagram illustrating a configuration of a server device of the second example.

As illustrated in FIG. 19, the server device 4a does not include the input circuit 459 included in the server device 4.

In addition, the storage circuit 460 included in the server device 4a does not store the feature amount group 420.

Further, the main control unit 441 included in the server device 4a does not include the face recognition processing unit 443, the feature amount extracting unit 444, the position calculating unit 445, or the line-of-sight viewpoint calculating unit 446 constituting the main control unit 441 included in the server device 4.

The network communication circuit 456 (notifier) included in the server device 4a receives the user identifier from the image forming apparatus 5a via the network 2. Here, the user identifier is person information indicating a person present around (within a predetermined range of) the image forming apparatus 5a, and the network communication circuit 456 acquires the user identifier as the person information.

Next, the determination control unit 447 constituting the main control unit 441 will be described.

At the beginning of processing, the determination control unit 447 sets "0" for the index n of the processing code, and initializes each of the processing code (0) to the processing code (i) to "0".

The determination control unit 447 performs control so that the following procedures (a), (b), (b-1), (b-2), (b-2-1), (b-2-1-1), and (b-2-1-2) are repeated for each received user identifier.

(a) The determination control unit 447 adds "1" to the index n.

(b) The determination control unit 447 searches the user table 410 for a user identifier that matches the received user identifier.

(b-1) In a case where the user identifier that matches the received user identifier does not exist in the user table 410, the determination control unit 447 sets "1" for the processing code (n) and performs control so that the processing code (n) is transmitted to the image forming apparatus 5*a* via the network 2.

(b-2) In a case where the user identifier that matches the received user identifier exists in the user table 410, the determination control unit 447 (reading device) reads the company name and the affiliation department name (second organization name) corresponding to the user identifier from the user table 410.

Figure 20:
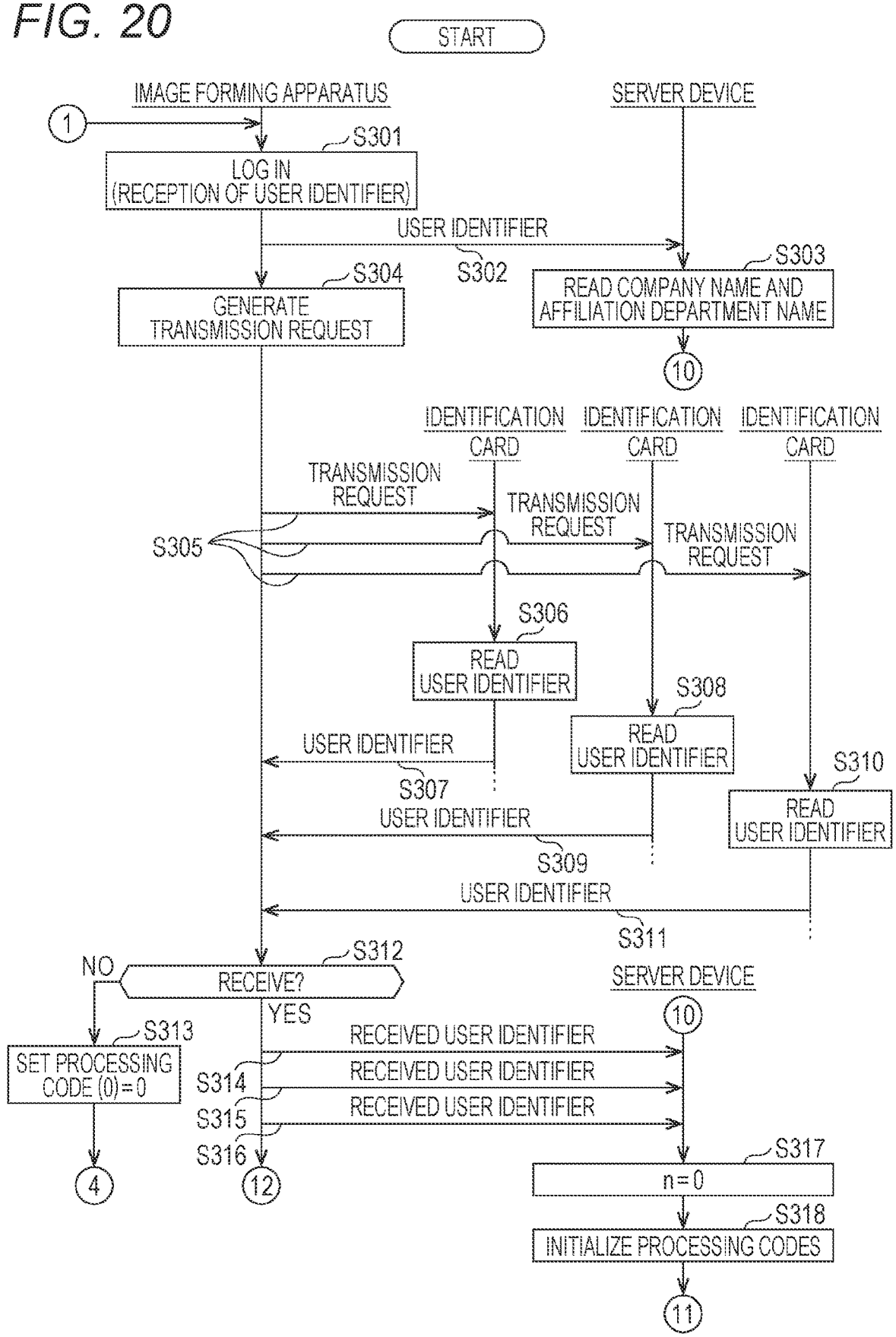
FIG. 20 is a sequence diagram (part 1) illustrating operation in the security system (continuing to FIG. 21)

(b-2-1) Next, the determination control unit 447 compares the read company name and affiliation department name (second organization name) with the company name and affiliation department name (first organization name) of the operator who is operating the image forming apparatus 5*a* read in step S303 of FIG. 20 described later, and determines whether or not the second organization name matches the first organization name.

(b-2-1-1) In a case where it is determined that the read company name and affiliation department name match the company name and affiliation department name of the operator, the determination control unit 447 sets the processing code (n) to "0" and performs control so that the processing code (n) is transmitted to the image forming apparatus 5*a* via the network 2.

(b-2-1-2) In a case where it is determined that the read company name and affiliation department name do not match the company name and affiliation department name of the operator, the determination control unit 447 sets the processing code (n) to "1" and performs control so that the processing code (n) is transmitted to the image forming apparatus 5*a* via the network 2.

3.5 Operation in Security System 1*a*

Figure 21:
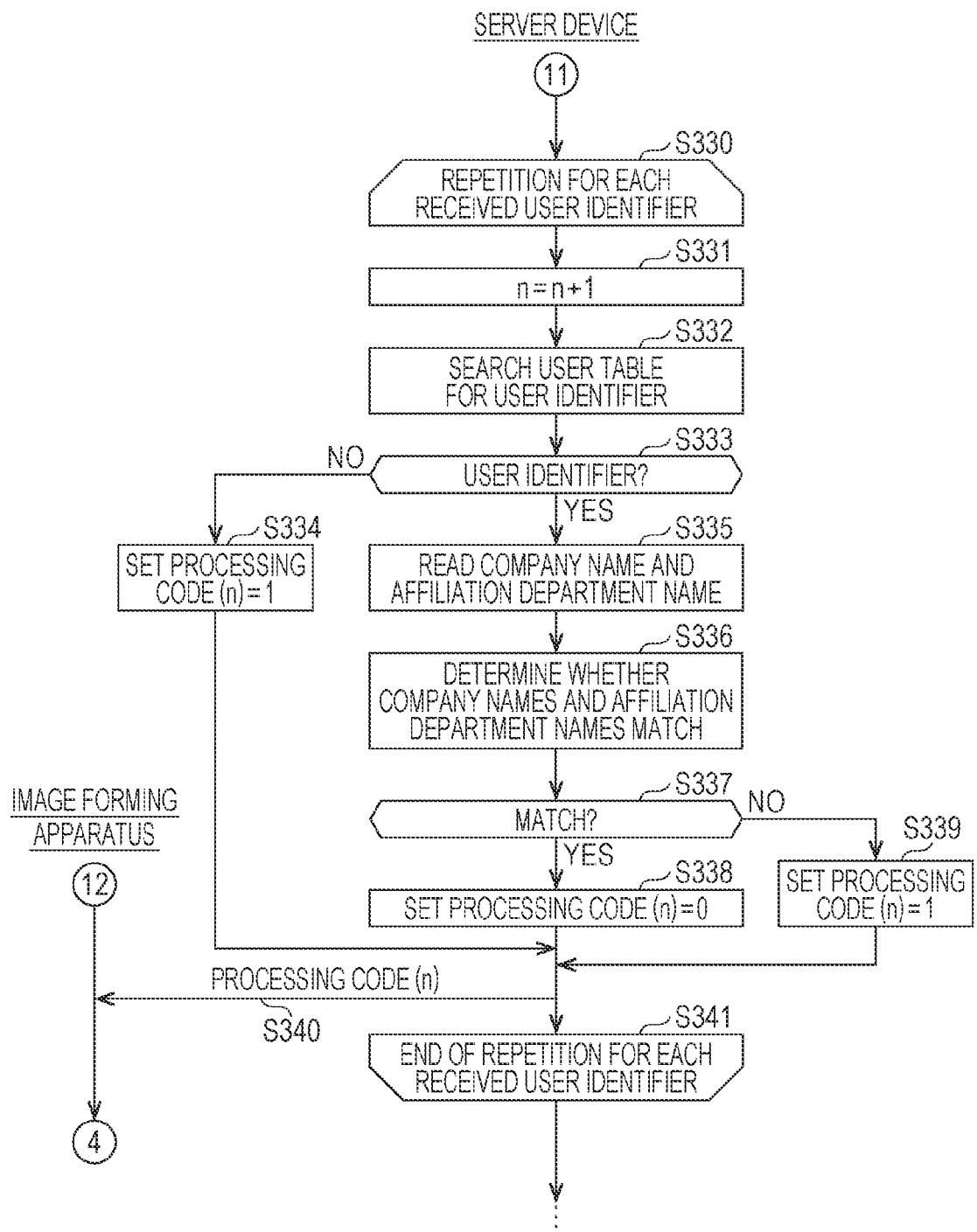
FIG. 21 is a sequence diagram (part 2) illustrating the operation in the security system.

The operation of the second example is similar to the operation of the first example, and can be described by the operation obtained by replacing the operation illustrated in FIGS. 10 to 11 in the operation illustrated in FIGS. 10 to 12 in the first example with the operation illustrated in FIGS. 20 to 21 to be described next.

Thus, here, for the operation of the second example, a description will be given of the operation illustrated in FIGS. 20 to 21, which is the differences between the first example and the second example.

The login control unit 546 executes login by the operator. As a result, the user identifier is received (step S301). The login control unit 546 controls the network communication circuit 556 so that the user identifier is transmitted to the server device 4*a* via the network 2. The integrated control unit 442 receives the user identifier from the image forming apparatus 5*a* via the network 2 and the network communication circuit 456 (step S302).

The integrated control unit 442 reads the user information corresponding to the received user identifier from the user table 410, and extracts the company name and the affiliation department name from the read user information (step S303). Next, the control shifts to step S314.

When receiving the login from the operator by the login control unit 546, the integrated control unit 542 generates a user identifier transmission request (step S304). Next, the integrated control unit 542 controls the wireless communication circuit 563 so that the generated user identifier transmission request is transmitted by short-distance wireless via the antenna 564, and the wireless communication circuit 563 transmits the transmission request (step S305).

The wireless communication circuit 563 of each identification card receives the user identifier transmission request from the image forming apparatus 5*a* by short-distance wireless via the antenna 564 (step S305).

When the user identifier transmission request is received by the wireless communication circuit 563 of each identification card, the control unit 741 of each identification card reads the user identifier from the storage circuit 760 via the input/output circuit 767 (steps S306, S308, S310), and outputs the read user identifier to the wireless communication circuit 763 so that the read user identifier is transmitted. The wireless communication circuit 763 of each identification card transmits the user identifier read from the storage circuit 760 by short-distance wireless via the antenna 764 (steps S307, S309, S311).

Figure 12:
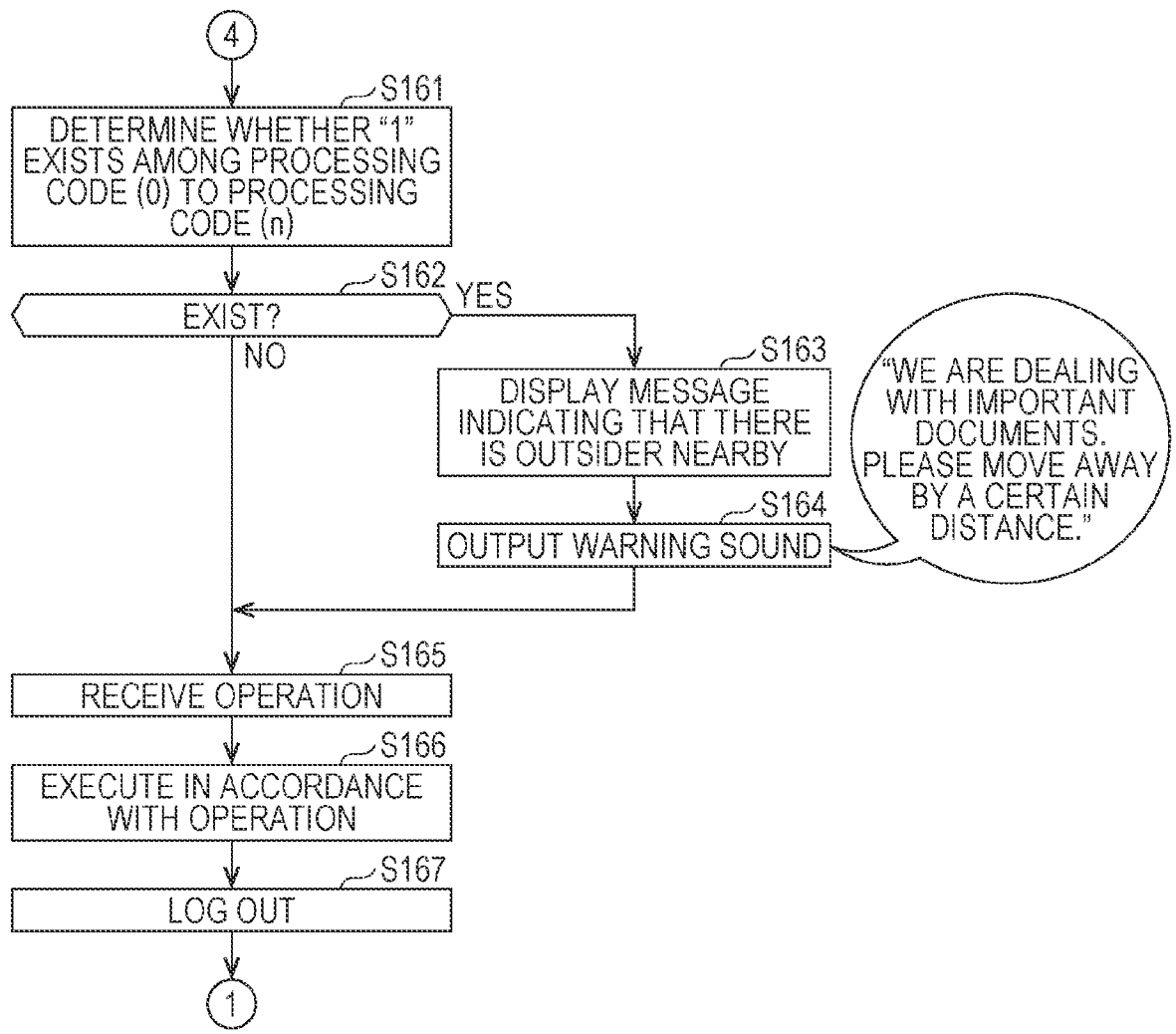
FIG. 12 is a sequence diagram (part 3) illustrating the operation in the security system (continuing from FIG. 11)

In a case where the wireless communication circuit 563 does not receive the user identifier ("NO" in step S312), since there is no identification card around the operator, the integrated control unit 542 sets the processing code (0) to "0" (step S313), and then shifts the control to step S161 illustrated in FIG. 12.

When receiving the user identifier from the wireless communication circuit 563 ("YES" in step S312), the integrated control unit 542 controls the network communication circuit 556 so that all the received user identifiers are transmitted to the server device 4*a* via the network 2, and the network communication circuit 556 transmits all the received user identifiers to the server device 4*a* via the network 2 (steps S314, S315, S316).

The network communication circuit 456 included in the server device 4*a* receives the user identifier from the image forming apparatus 5*a* via the network 2 (steps S314, S315, S316).

The determination control unit 447 sets "0" for the index n of the processing code (step S317), and initializes each of the processing code (0) to the processing code (i) to "0" (step S318).

The determination control unit 447 repeats the next steps S331 to S340 for each received user identifier (steps S330 to S341).

The determination control unit 447 adds "1" to the index n (step S331).

The determination control unit 447 searches the user table 410 for a user identifier that matches the received user identifier (step S332).

In a case where the user identifier that matches the received user identifier does not exist in the user table 410 ("NO" in step S333), the determination control unit 447 sets "1" for the processing code (n) (step S334), and performs control so that the processing code (n) is transmitted to the image forming apparatus 5*a* via the network 2 (step S340).

In a case where the user identifier that matches the received user identifier exists in the user table 410 ("YES" in step S333), the determination control unit 447 reads the company name and the affiliation department name (second organization name) corresponding to the user identifier from the user table 410 (step S335). Next, the determination control unit 447 compares the read company name and affiliation department name (second organization name) with the company name and affiliation department name (first organization name) of the operator who is operating the image forming apparatus 5*a* read in step S303, and determines whether or not the second organization name matches the first organization name (step S336).

In a case where it is determined that the read company name and affiliation department name match the company name and affiliation department name of the operator ("YES" in step S337), the determination control unit 447 sets the processing code (n) to "0" (step S338), and performs control so that the processing code (n) is transmitted to the image forming apparatus 5a via the network 2 (step S340).

In a case where it is determined that the read company name and affiliation department name do not match the company name and affiliation department name of the operator ("NO" in step S337), the determination control unit 447 sets the processing code (n) to "1" (step S339), and performs control so that the processing code (n) is transmitted to the image forming apparatus 5a via the network 2 (step S340).

When repetition of steps S331 to S340 ends, a series of processing steps in the server device 4a ends.

3.6 Summary

As described above, also in the case of acquiring the user identifier from the identification card possessed by the user, it is possible to determine whether the user other than the operator is a related person or not a related person of the operator, by comparing the company name and the department name (second organization name) acquired on the basis of the user identifier acquired from the identification card of a user other than the operator with the company name and the department name (first organization name) of the operator.

4 Third Example

A third example of the embodiment will be described.

4.1 Configuration of System

Figure 22:
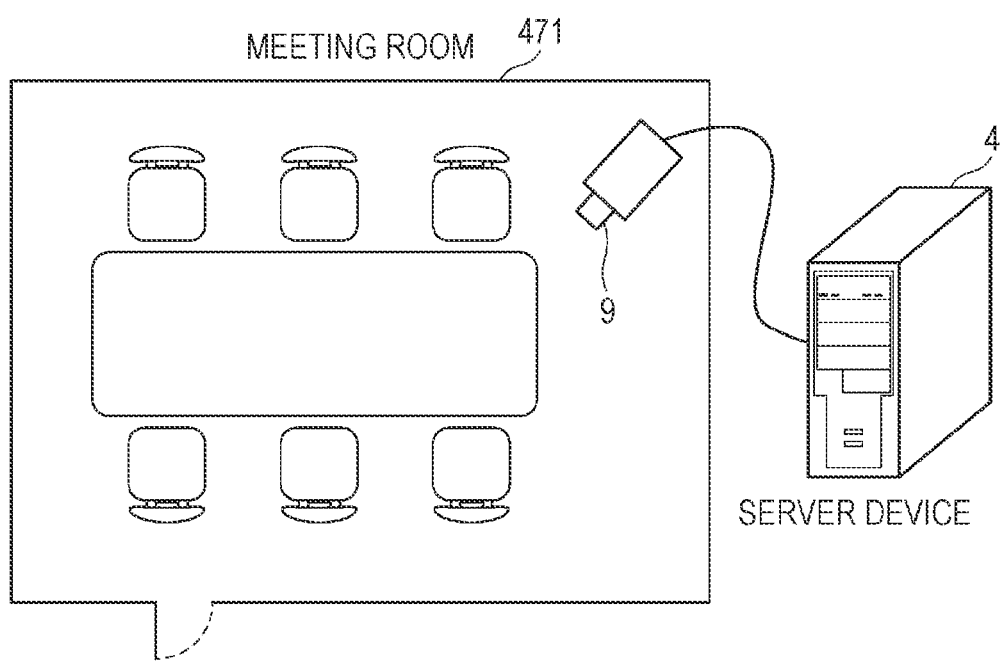
FIG. 22 illustrates connection between the server device and a camera in a third example.

In the third example, as illustrated in FIG. 22, the camera 9 is installed on an upper part of an inner wall of a meeting room 471 (closed space) such that the optical axis of the lens faces the inside of the meeting room 471.

In the meeting room 471, a plurality of users gathers and holds a meeting, and the camera 9 images the users gathered in the meeting room 471 and generates image data. In an image (still image) represented by the generated image data, the users gathered in the meeting room 471 are reflected together with their respective faces.

The camera 9 is connected to the server device 4 of the security system 1 of the first example via a signal line, and transmits the generated image data to the server device 4 via the signal line.

Note that the camera 9 may generate dynamic image data by imaging. In addition, a plurality of cameras may be installed in the meeting room 471. Each of the plurality of cameras generates image data by imaging, and transmits the generated image data to the server device 4.

4.2 Server Device 4

The input circuit 459 of the server device 4 is connected to the camera 9.

The input circuit 459 receives image data from the camera 9.

Figure 23:
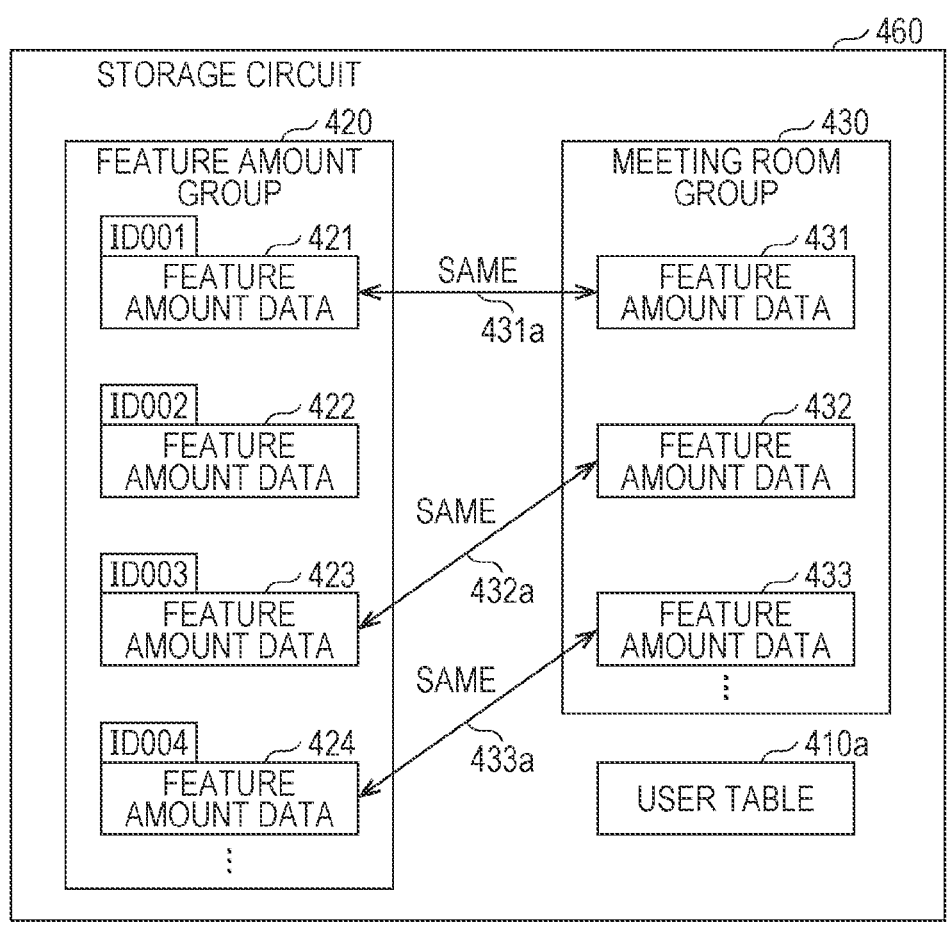
FIG. 23 illustrates a configuration of the storage circuit in the third example.

As illustrated in FIGS. 5 and 23, the storage circuit 460 of the server device 4 stores the feature amount group 420. In addition, as illustrated in FIG. 23, the storage circuit 460 includes an area for storing a meeting room group 430. The meeting room group 430 stores feature amount data 431, 432, 433, . . . .

In addition, the storage circuit 460 holds a user table 410a illustrated in FIG. 24 instead of the user table 410 illustrated in FIG. 6.

The user table 410a has a data structure similar to that of the user table 410. The user table 410a is different from the user table 410 in that the user information 411 included in the user table 410a further includes a related person number 415 in addition to the user identifier 412, the company name 413, and the affiliation department name 414. Here, in a case where the first user information and the second user information in the user table 410a include the same related person number, it indicates that a user indicated by the first user information and a user indicated by the second user information are related persons reflected in one piece of image data imaged and generated by the camera 9.

For example, in the user table 410a illustrated in FIG. 24, three pieces of user information including user identifiers "ID001", "ID003", and "ID004" include the same related person number "010". Thus, three users identified by the user identifiers "ID001", "ID003", and "ID004" are related persons.

The face recognition processing unit 443 detects a plurality of face images from an image represented in the image data received from the camera 9.

The feature amount extracting unit 444 extracts a feature amount from each of the detected face images, generates feature amount data, and writes the generated feature amount data in the storage circuit 460. When extraction of the feature amount from each of all the detected face images ends, the feature amount extracting unit 444 associates all pieces of the generated feature amount data in the storage circuit 460 as the meeting room group 430.

As an example, as illustrated in FIG. 23, the meeting room group 430 includes the feature amount data 431, 432, 433, . . . . These pieces of feature amount data 431, 432, 433, are extracted from the face images of the users gathered in the meeting room 471.

For all pieces of feature amount data in the meeting room group 430, the determination control unit 447 determines whether or not the feature amount matches the feature amount represented by any of the feature amount data in the feature amount group 420 of the storage circuit 460.

In a case where there is a matched feature amount, the determination control unit 447 associates the feature amount data in the meeting room group 430 with the feature amount data in the feature amount group 420 as the same feature amount data.

Here, FIG. 23 illustrates that the feature amount data 431 in the meeting room group 430 and the feature amount data 421 in the feature amount group 420 are the same as each other. Similarly, the feature amount data 432 in the meeting room group 430 and the feature amount data 423 in the feature amount group 420 are the same as each other, and the feature amount data 433 in the meeting room group 430 and the feature amount data 424 in the feature amount group 420 are the same as each other.

As described above, the feature amount data 421, 423, and 424 in the feature amount group 420 are associated with any of pieces of feature amount data in the meeting room group 430 as the same feature amount data.

Next, the determination control unit 447 generates and assigns the same related person number to a plurality of pieces of feature amount data in the feature amount group 420 associated with any of pieces of feature amount data in the meeting room group 430.

As an example, the same related person number "010" is generated and assigned to the feature amount data 421, 423, and 424 in the feature amount group 420 illustrated in FIG. 23.

Next, the determination control unit 447 acquires an identifier that identifies the feature amount data in the feature amount group 420 associated as the same as any of pieces of feature amount data in the meeting room group 430, and reads user information including the same user identifier as the acquired identifier from the user table 410*a*.

Next, the determination control unit 447 assigns the generated related person number to the read user information, and writes back the user information to which the related person number is assigned to the user table 410*a*.

Here, as an example, as illustrated in FIG. 24, in the user table 410*a*, three pieces of user information including the user identifiers "ID001", "ID003", and "ID004" include the same related person number "010". Thus, it can be seen that the three users identified by the user identifiers "ID001", "ID003", and "ID004" are related persons reflected in one piece of image data imaged and generated by the camera 9.

As described above, in the third example, a plurality of users reflected in one piece of image data imaged and generated by the camera 9 are regarded as related persons.

Figure 25:
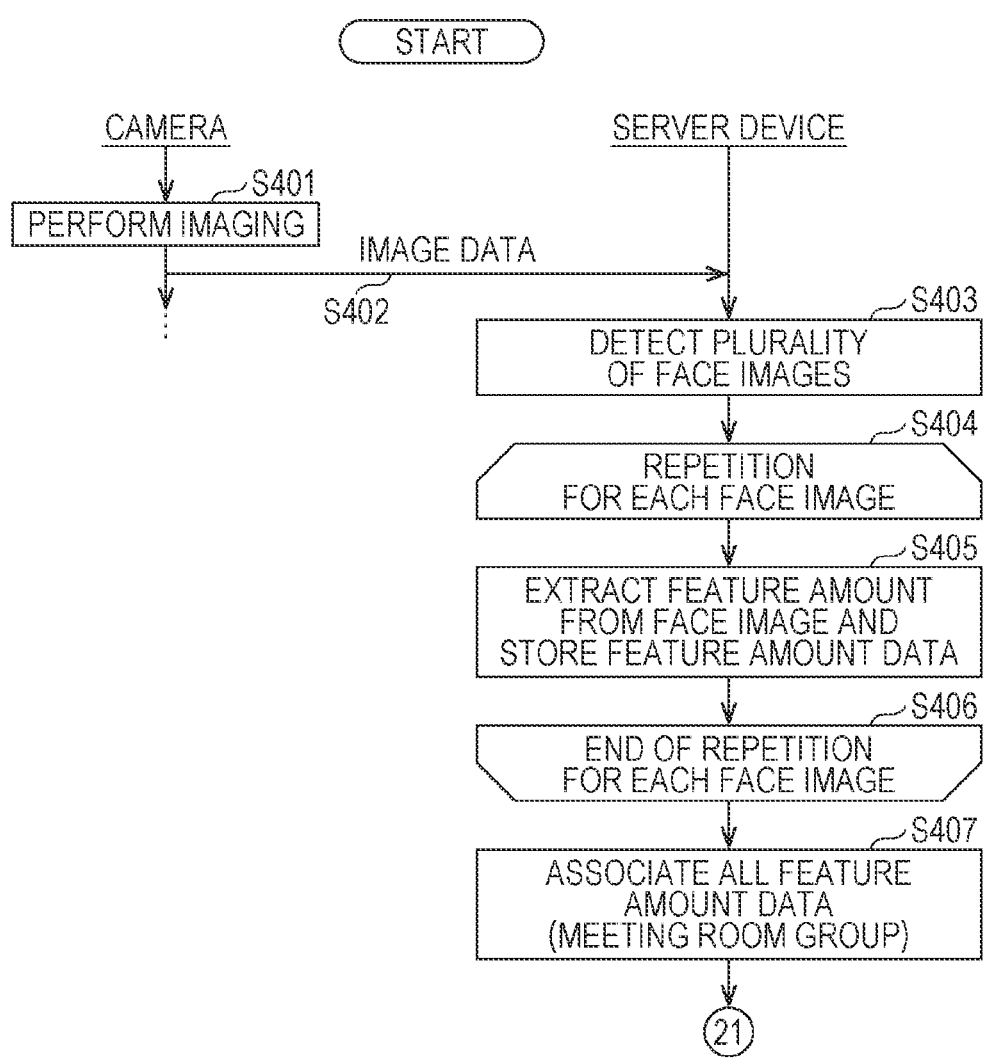
FIG. 25 is a sequence diagram (part 1) illustrating operation in the third example (continuing to FIG. 26)
Figure 26:
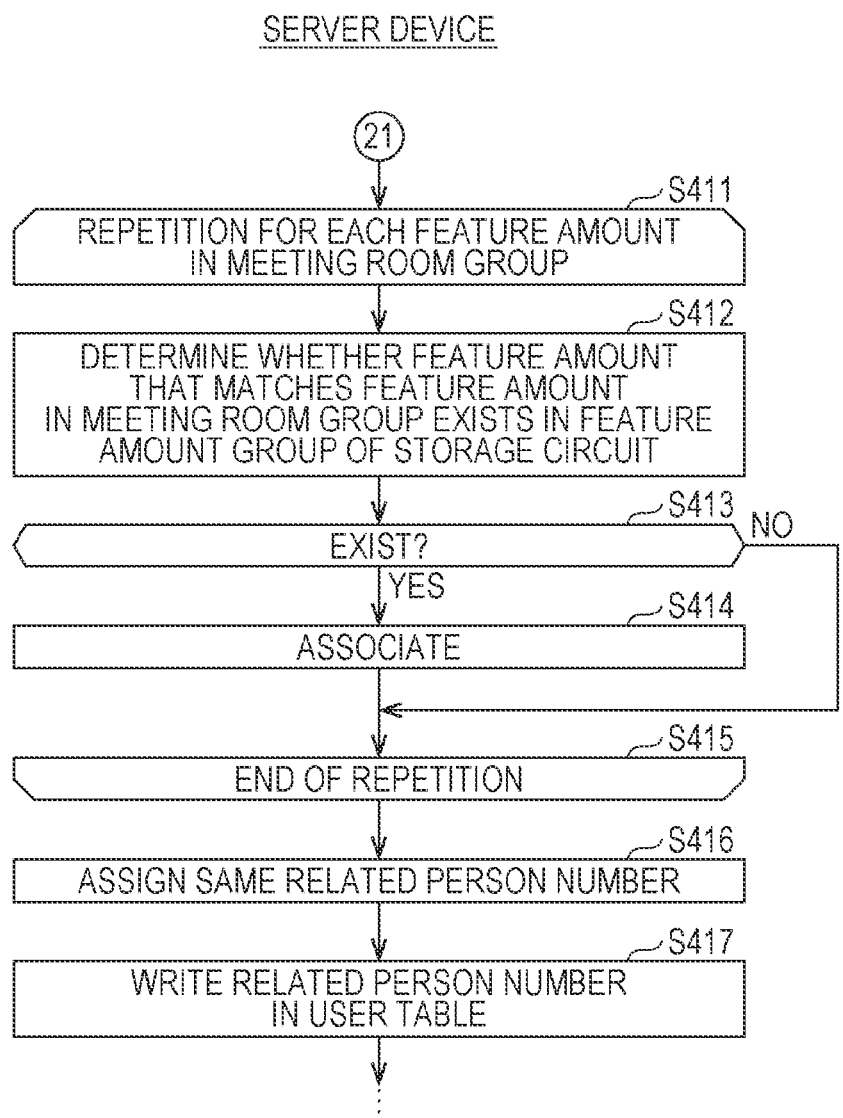
FIG. 26 is a sequence diagram (part 2) illustrating the operation in the third example.

4.3 Operation in Third Example (1) Operation of Assigning a Related Person Number The operation of assigning the related person number will be described with reference to a sequence diagram illustrated in FIGS. 25 to 26.

The camera 9 images the users gathered in the meeting room 471 and generates image data (step S401). The camera 9 transmits the generated image data to the server device 4 via the signal line. The input circuit 459 receives the image data from the camera 9 (step S402).

The face recognition processing unit 443 detects a plurality of face images from an image represented in the received image data (step S403).

The feature amount extracting unit 444 repeats the following step S405 for each of the plurality of face images (steps S404 to S406).

The feature amount extracting unit 444 extracts a feature amount from each detected face image, generates feature amount data, and writes the generated feature amount data in the storage circuit 460 (step S405).

When extraction of the feature amount from all the detected face images ends, the feature amount extracting unit 444 associates all pieces of the generated feature amount data in the storage circuit 460 as the meeting room group 430 (step S407).

The determination control unit 447 repeats steps S412 to S414 for all pieces of feature amount data in the meeting room group 430 (steps S411 to S415).

For each piece of feature amount data in the meeting room group 430, the determination control unit 447 determines whether or not the feature amount matches a feature amount represented by any of the feature amount data in the feature amount group 420 of the storage circuit 460 (step S412).

In a case where there is a matched feature amount ("YES" in step S413), the determination control unit 447 associates the feature amount data in the meeting room group 430 with the feature amount data in the feature amount group 420 (step S414).

When repetition of steps S412 to S414 ends for all pieces of feature amount data in the meeting room group 430, next, the determination control unit 447 generates and assigns the same related person number to a plurality of pieces of feature amount data in the feature amount group 420 associated with any of pieces of feature amount data in the meeting room group 430 (step S416).

Next, the determination control unit 447 acquires an identifier that identifies the feature amount data in the feature amount group 420 associated with any of pieces of feature amount data in the meeting room group 430, reads the user information including the same user identifier as the acquired identifier from the user table 410*a*, assigns the generated related person number to the read user information, and writes back the user information to which the related person number is assigned to the user table 410*a* (step S417).

Thus, the operation of generating and assigning the related person number ends.

(2) Operation of Determining Whether or not a Person is a Related Person

The operation of determining whether or not a person is a related person in the third example is similar to the operation of determining whether or not a person is a related person in the first example, and can be described by the operation obtained by replacing the operation illustrated in FIG. 11 in the operation illustrated in FIGS. 10 to 12 in the first example with the operation illustrated in FIG. 27 to be described next.

Thus, here, the operation of determining whether or not a person is a related person in the third example will be described with reference to a sequence diagram illustrated in FIG. 27.

The integrated control unit 442 reads user information including a user identifier of the operator from the user table 410*a*, and extracts a related person number from the read user information (step S130).

The face recognition processing unit 443 determines whether or not there is another face image other than the face image of operator who operates the image forming apparatus 5 in the detected face image in the image data received from the camera 6 (step S131).

In a case where it is determined that there is not another face image other than the face image of the operator who operates the image forming apparatus 5 ("NO" in step S131), the determination control unit 447 sets "0" for the processing code (0) since only the operator who operates the image forming apparatus 5 is included in the image data 600 (step S132), and controls the network communication circuit 456 so that the processing code (0) is transmitted to the image forming apparatus 5 via the network 2 (step S133). As a result, a series of processing steps in the server device 4 ends.

In a case where it is determined that there is another face image other than the face image of the operator who operates the image forming apparatus 5 ("YES" in step S131), the determination control unit 447 repeats the next steps S135 to S143 for each of the other face images (steps S134 to S144).

The determination control unit 447 adds "1" to the index n (step S135).

The feature amount extracting unit 444 extracts a feature amount from the other face image (step S136).

The determination control unit 447 compares the feature amount extracted from the other face image with the feature amounts included in all pieces of feature amount data in the feature amount group 420 of the storage circuit 460, and determines whether or not the feature amounts match each other (step S137).

In a case where it is determined that there is a matched feature amount ("YES" in step S138), the determination control unit 447 acquires the identifier of the feature amount data including the matched feature amount in the feature amount group 420, reads the related person number identified by the acquired identifier from the user table 410*a*, compares the read related person number with the related person number acquired in step S130, and determines whether or not the related person numbers match each other (step S139*a*).

In a case where it is determined that the related person numbers match each other ("YES" in step S140*a*), the determination control unit 447 sets the processing code (n) to "0" (step S141), and performs control so that the processing code (n) is transmitted to the image forming apparatus 5 via the network 2 (step S143).

In a case where it is determined that there is not a matched feature amount ("NO" in step S138), the determination control unit 447 sets the processing code (n) to "1" (step S145*a*), and performs control so that the processing code (n) is transmitted to the image forming apparatus 5 via the network 2 (step S143).

In a case where it is determined that the related person numbers do not match each other ("NO" in step S140*a*), the determination control unit 447 sets the processing code (n) to "1" (step S142*a*), and performs control so that the processing code (n) is transmitted to the image forming apparatus 5 via the network 2 (step S143).

When repetition of steps S135 to S143 ends, a series of processing steps in the server device 4 ends.

4.4 Summary

In a case where a plurality of users gathers in a meeting room and holds a meeting, image data generated by imaging the users gathered in the meeting room by the camera 9 is used, and the users of the plurality of face images reflected in the image data are set as related persons. Using a relationship set in this manner, it is possible to determine whether or not the user other than the operator is a related person of the operator.

Note that the storage circuit 460 (storage) may store the number of times of a meeting held in the same meeting room in the past by the operator and a person other than the operator. That is, in the user table 410*a* illustrated in FIG. 24, each piece of user information further includes the number of times. The number of times is the number of times of a meeting held in the same meeting room in the past by a plurality of persons.

The determination control unit 447 may read the number of times from the user table 410*a* of the storage circuit 460 and determine whether or not the user is a related person by determining whether or not the number of times of reading is greater than or equal to a predetermined threshold value. In a case where the number of times of reading is greater than or equal to the predetermined threshold value, it is determined that the user is a related person, and in a case where the number of times of reading is less than the predetermined threshold value, it is determined that the user is not a related person.

5 Fourth Example

A fourth example of the embodiment will be described.

5.1 Configuration of System

Figure 28A:
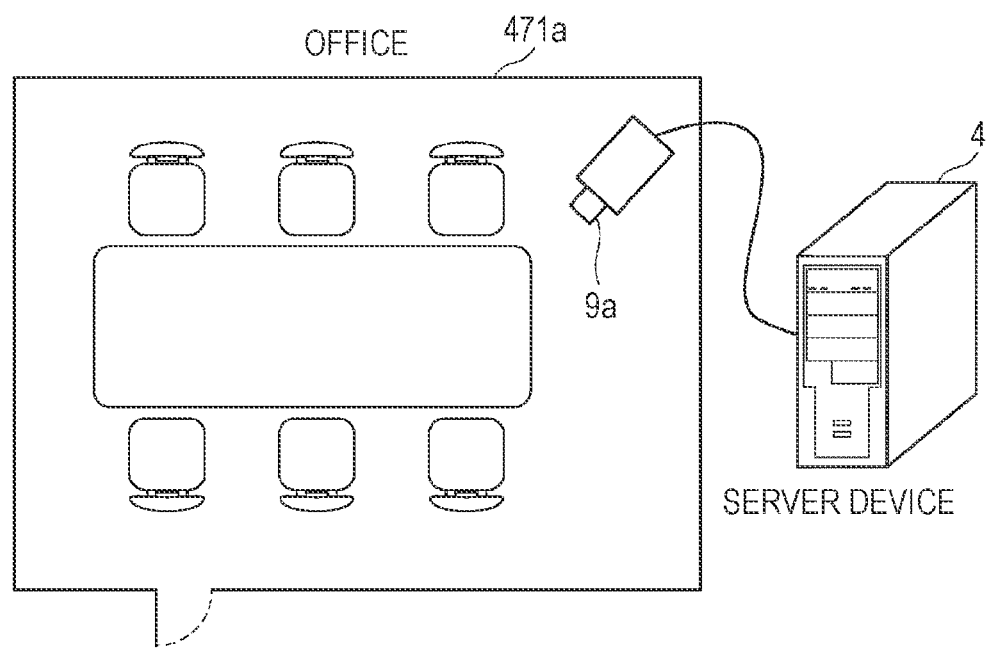
FIG. 28A illustrates connection between the server device and a camera in a fourth example.

In the fourth example, as illustrated in FIG. 28A, the camera 9*a* is installed on the upper part of an inner wall of an office 471*a* such that the optical axis of the lens faces the inside of the office 471*a*.

In the office 471*a*, a plurality of users gathers and views the same document. The camera 9*a* images the users gathered in the office 471*a* and generates image data. In an image (still image) represented by the generated image data, the users gathered in the office 471*a* are reflected together with their respective faces.

The camera 9*a* is connected to the server device 4 of the security system 1 of the first example via a signal line, and transmits the generated image data to the server device 4 via the signal line.

Note that the camera 9*a* may generate dynamic image data by imaging. In addition, a plurality of cameras may be installed in the office 471*a*. Each of the plurality of cameras generates image data by imaging, and transmits the generated image data to the server device 4.

5.2 Server Device 4

The input circuit 459 of the server device 4 is connected to the camera 9*a*.

The input circuit 459 receives image data from the camera 9*a*.

Figure 28B:
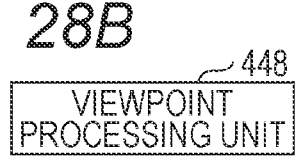
FIG. 28B illustrates a viewpoint processing unit.

The main control unit 441 of the server device 4 further includes a viewpoint processing unit 448 as illustrated in FIG. 28B. The viewpoint processing unit 448 will be described later.

Figure 29:
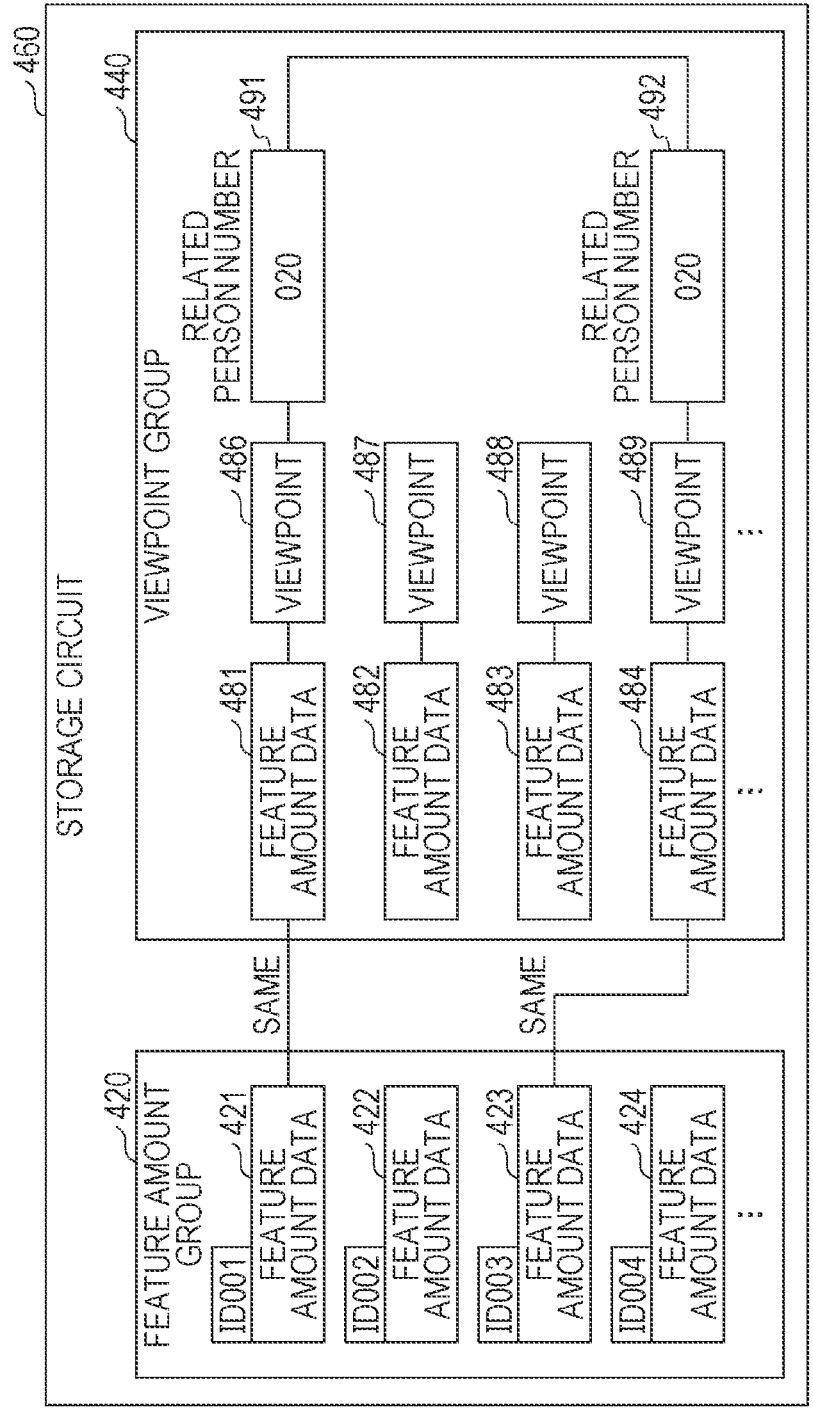
FIG. 29 illustrates a configuration of the storage circuit in the fourth example.

As illustrated in FIGS. 5 and 29, the storage circuit 460 of the server device 4 stores the feature amount group 420. In addition, as illustrated in FIG. 29, the storage circuit 460 includes an area for storing a viewpoint group 440. The viewpoint group 440 stores feature amount data 481, 482, 483, 484, . . . , and stores viewpoints 486, 487, 488, 489, in association with the feature amount data 481, 482, 483, 484, . . . , respectively. In addition, in the example illustrated in this figure, related person numbers 491 and 492 are assigned to the viewpoints 486 and 489, respectively.

The feature amount data 481, 482, 483, 484, are extracted from face images of the users gathered in the office 471*a*.

The viewpoints 486, 487, 488, 489, corresponding to the feature amount data 481, 482, 483, 484, are extracted from the face images of the users gathered in the office 471*a*, and indicate positions ahead of lines of sight viewed by the respective face images.

The same related person number is assigned to matched viewpoints (or viewpoints present within a predetermined viewpoint range) among the viewpoints 486, 487, 488, 489, . . . . Here, since each of the related person numbers 491 and 492 is "020", it is indicated that the viewpoint 486 and the viewpoint 489 match each other. That is, positions of the viewpoints of two users viewing the viewpoint 486 and the viewpoint 489 are the same, and it is indicated that the two users are viewing the same position.

In addition, the storage circuit 460 holds a user table 410*b* illustrated in FIG. 30 instead of the user table 410 illustrated in FIG. 6.

The user table 410*b* has a data structure similar to that of the user table 410. The user table 410*b* is different from the user table 410 in that the user information 411 included in the user table 410*b* further includes the related person number 415 and a number of times 416 in addition to the user identifier 412, the company name 413, and the affiliation department name 414. Here, in a case where the first user information and the second user information in the user table 410b include the same related person number, it indicates that a user indicated by the first user information and a user indicated by the second user information are related persons reflected in one piece of image data imaged and generated by the camera 9a, and viewing one document.

For example, in the user table 410b illustrated in FIG. 30, two pieces of user information including the user identifiers "ID001" and "ID003" include the same related person number "020".

That is, two users identified by the user identifiers "ID001" and "ID003" are reflected in one piece of image data imaged and generated by the camera 9a, and are in a relationship of related persons viewing one document.

In addition, for example, in the user table 410b illustrated in FIG. 30, the two pieces of user information including the user identifiers "ID001" and "ID003" include the number of times "012".

Here, the number of times indicates the number of times that the two users identified by the user identifiers "ID001" and "ID003" are reflected in one piece of image data and in a relationship of viewing one document in a case where the inside of the office 471a is imaged a plurality of times by the camera 9a.

Thus, it can be said that the relationship between the two users is stronger as the number of times is larger.

In a case where the number of times exceeds a threshold value, for example, in a case where the number of times exceeds the threshold value "10", the two users identified by the user identifiers "ID001" and "ID003" may be regarded as related persons having a strong relationship.

The face recognition processing unit 443 detects a plurality of face images from an image represented in the image data received from the camera 9a.

The following pieces of processing (a) to (f) are executed for each of the plurality of face images detected by the face recognition processing unit 443.

(a) By control of the viewpoint processing unit 448, the feature amount extracting unit 444 extracts a feature amount from the face image and generates feature amount data.

(b) By control of the viewpoint processing unit 448, the position calculating unit 445 calculates a standing position of a user of the face image.

(c) By control of the viewpoint processing unit 448, the line-of-sight viewpoint calculating unit 446 calculates a horizontal orientation of the face of the user of the face image.

(d) By control of the viewpoint processing unit 448, the line-of-sight viewpoint calculating unit 446 calculates an inclination from the vertical direction of the face of the user of the face image.

(e) By control of the viewpoint processing unit 448, the line-of-sight viewpoint calculating unit 446 calculates a viewpoint of the user of the face image.

(f) The viewpoint processing unit 448 writes the generated feature amount data and the calculated viewpoint in association with each other in the viewpoint group 440 of the storage circuit 460.

When repetition of the above (a) to (f) ends, the viewpoint processing unit 448 executes the following pieces of processing (g) to (i) for each of the plurality of face images detected by the face recognition processing unit 443.

(g) The viewpoint processing unit 448 reads one viewpoint from the viewpoint group 440.

(h) The viewpoint processing unit 448 searches the viewpoint group 440 for another viewpoint that matches the read viewpoint (or is present within the predetermined viewpoint range).

(i) In a case where there is a matched viewpoint, the viewpoint processing unit 448 associates the read viewpoint with the other viewpoint in the viewpoint group 440.

When repetition of the above (g) to (i) ends, the viewpoint processing unit 448 generates the same related person number for a plurality of associated viewpoints in the viewpoint group 440, and assigns the generated related person number.

Next, the viewpoint processing unit 448 executes the following pieces of processing (j) to (m) for each of the plurality of face images detected by the face recognition processing unit 443.

(j) The viewpoint processing unit 448 reads one piece of feature amount data from the viewpoint group 440.

(k) The viewpoint processing unit 448 determines whether or not a related person number is assigned to the read feature amount data.

(l) In a case where it is determined that the related person number is assigned, the viewpoint processing unit 448 searches the feature amount group 420 for the same feature amount data as the read feature amount data.

(m) In a case where the same feature amount data as the read feature amount data exists in the feature amount group 420, the viewpoint processing unit 448 assigns the related person number to the user information including the user identifier that identifies the same feature amount data in the user table 410b, adds "1" to the number of times, and writes back the user information to which the related person number is assigned to the user table 410b.

When repetition of the above (j) to (m) ends, a series of pieces of processing ends.

Figure 31:
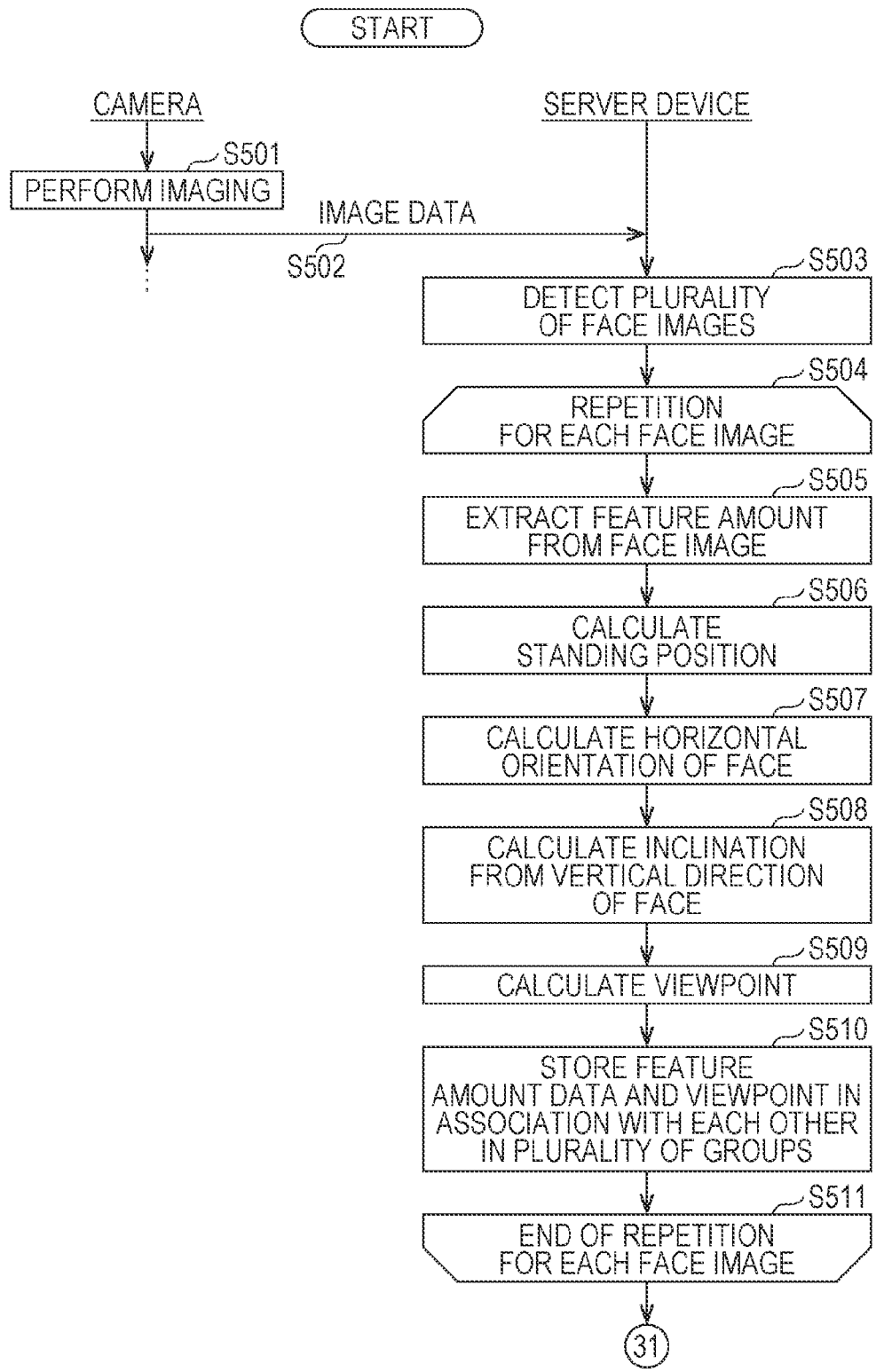
FIG. 31 is a sequence diagram (part 1) illustrating operation in the fourth example (continuing to FIG. 32)
Figure 32:
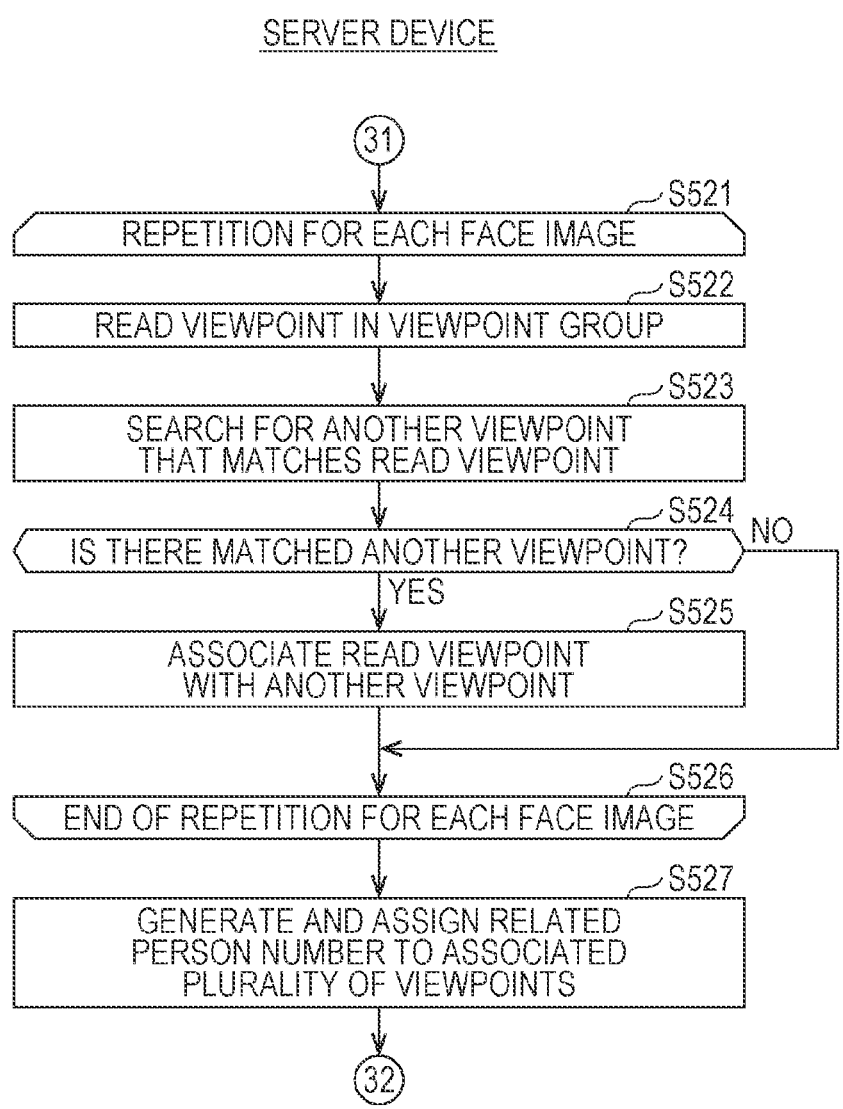
FIG. 32 is a sequence diagram (part 2) illustrating the operation in the fourth example (continuing to FIG. 33)
Figure 33:
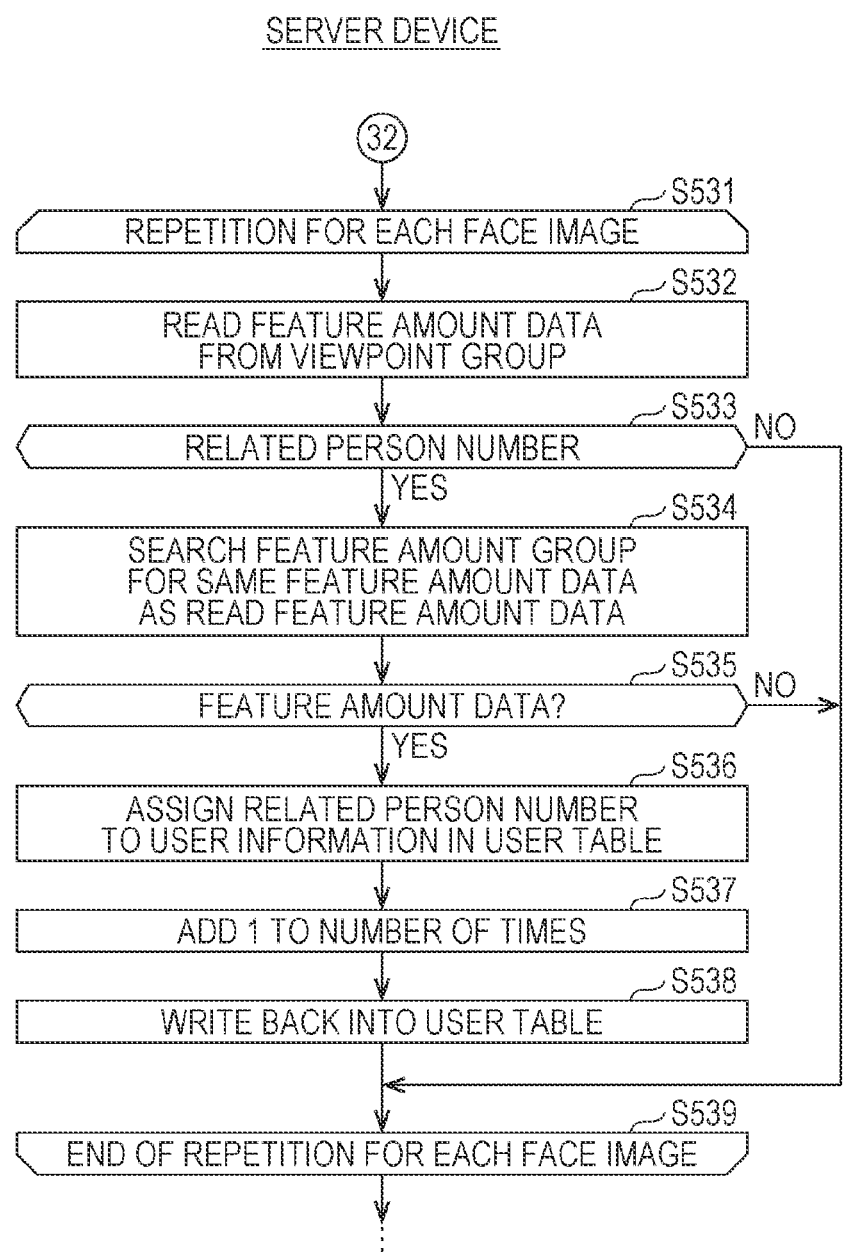
FIG. 33 is a sequence diagram (part 3) illustrating the operation in the fourth example.

5.3 Operation in Fourth Example (1) Operation of Assigning a Related Person Number The operation of assigning a related person number will be described with reference to a sequence diagram illustrated in FIGS. 31 to 33.

The camera 9a images users gathered in the office 471a and generates image data (step S501). The camera 9a transmits the generated image data to the server device 4 via the signal line. The input circuit 459 receives the image data from the camera 9a (step S502).

The face recognition processing unit 443 detects a plurality of face images from an image represented in the received image data (step S503).

The viewpoint processing unit 448 performs control so that the next steps S505 to S510 are repeatedly executed for each of the plurality of face images detected by the face recognition processing unit 443 (steps S504 to S511).

By control of the viewpoint processing unit 448, the feature amount extracting unit 444 extracts a feature amount from the face image and generates feature amount data (step S505).

By control of the viewpoint processing unit 448, the position calculating unit 445 calculates a standing position of a user of the face image (step S506).

By control of the viewpoint processing unit 448, the line-of-sight viewpoint calculating unit 446 calculates a horizontal orientation of the face of the user of the face image (step S507).

By control of the viewpoint processing unit 448, the line-of-sight viewpoint calculating unit 446 calculates an inclination from the vertical direction of the face of the user of the face image (step S508).

By control of the viewpoint processing unit 448, the line-of-sight viewpoint calculating unit 446 calculates a viewpoint of the user of the face image (step S509).

The viewpoint processing unit 448 writes the feature amount data and the viewpoint in association with each other in the viewpoint group 440 of the storage circuit 460 (step S510).

When repetition of steps S505 to S510 described above ends, the viewpoint processing unit 448 performs control so that the next steps S522 to S525 are repeatedly executed for each of the plurality of face images detected by the face recognition processing unit 443 (steps S521 to S526).

The viewpoint processing unit 448 reads one viewpoint from the viewpoint group 440 (step S522).

The viewpoint processing unit 448 searches the viewpoint group 440 for another viewpoint that matches the read viewpoint (or is present within the predetermined viewpoint range) (step S523).

In a case where there is a matched viewpoint ("YES" in step S524), the viewpoint processing unit 448 associates the read viewpoint with the other viewpoint in the viewpoint group 440 (step S525).

When repetition of steps S522 to S525 described above ends, the viewpoint processing unit 448 generates the same related person number for a plurality of associated viewpoints in the viewpoint group 440, and assigns the generated related person number (step S527).

Next, the viewpoint processing unit 448 performs control so that the processing in the next steps S532 to S538 is repeatedly executed for each of the plurality of face images detected by the face recognition processing unit 443 (steps S531 to S539).

The viewpoint processing unit 448 reads one piece of feature amount data from the viewpoint group 440 (step S532).

The viewpoint processing unit 448 determines whether or not a related person number is assigned to the read feature amount data (step S533).

In a case where it is determined that the related person number is assigned ("YES" in step S533), the viewpoint processing unit 448 searches the feature amount group 420 for the same feature amount data as the read feature amount data (step S534).

In a case where the same feature amount data as the read feature amount data exists in the feature amount group 420 ("YES" in step S535), the viewpoint processing unit 448 assigns the related person number to the user information including the user identifier that identifies the same feature amount data in the user table 410b (step S536), adds "1" to the number of times (step S537), and writes back the user information to which the related person number is assigned to the user table 410b (step S538).

When repetition of steps S532 to S538 described above ends, a series of processing steps ends.

(2) Operation of Determining Whether or not a Person is a Related Person

The operation of determining whether or not a person is a related person in the fourth example can be performed similarly to the operation of determining whether or not a person is a related person in the third example. In this case, in a case where the number of times included in the user information in the user table 410b is greater than or equal to a predetermined threshold value, it may be determined that the user is a related person, and in a case where the number of times included in the user information is less than the predetermined threshold value, it may be determined that the user is not a related person.

5.4 Summary

As described above, the storage circuit 460 (storage) stores the number of times of viewing the same document in the past by the operator and a person other than the operator, and the determination control unit 447 reads the number of times from the storage circuit 460 and determines whether or not the person is a related person by determining whether or not the number of times of reading is greater than or equal to the predetermined threshold value. In a case where the number of times of reading is greater than or equal to the predetermined threshold value, it is determined that the user is a related person, and in a case where the number of times of reading is less than the predetermined threshold value, it is determined that the user is not a related person.

In this way, in a case where a plurality of users gathers in the office and the plurality of users views one document, it is possible to use the image data generated by imaging the users gathered in the office by the camera 9a, regard users viewing one document among the users of the plurality of face images reflected in the image data as related persons, and determine whether or not the user other than the operator is a related person of the operator. In addition, the number of times of occurrence of such a situation is counted, and in a case where the number of times is greater than or equal to a threshold value, it is possible to determine that the related person has a stronger relationship.

6 Fifth Example

A fifth example of the embodiment will be described.

In the fifth example, in a case where a face image of another user in image data generated by imaging by the camera 6 or an identifier that identifies a feature amount of the face image is not stored in the user table 410, or in a case where a partial image that cannot be clearly recognized as a face image exists in the image data, the operator is notified of that fact and the determination is left to the operator.

Here, for example, in a case where a person image of a person reflected in the image data is extremely small and an image of a portion corresponding to the face of the person is also extremely small, in a case where an image corresponding to a face image is hidden behind another image such as the hair, in a case where a person faces sideways, obliquely backward, or backward, or the like, a phenomenon occurs in which it is not possible to clearly recognize whether or not an image is a face image.

6.1 Configuration of System

The fifth example has a configuration similar to that of the first example. Here, differences from the first example will be mainly described.

(1) The face recognition processing unit 443 included in the main control unit 441 of the server device 4 determines whether or not a partial image that cannot be clearly recognized as a face image exists when face image data including a face image representing the face portion of the user is cut out from the image 601 included in the image data 600.

Figure 10:
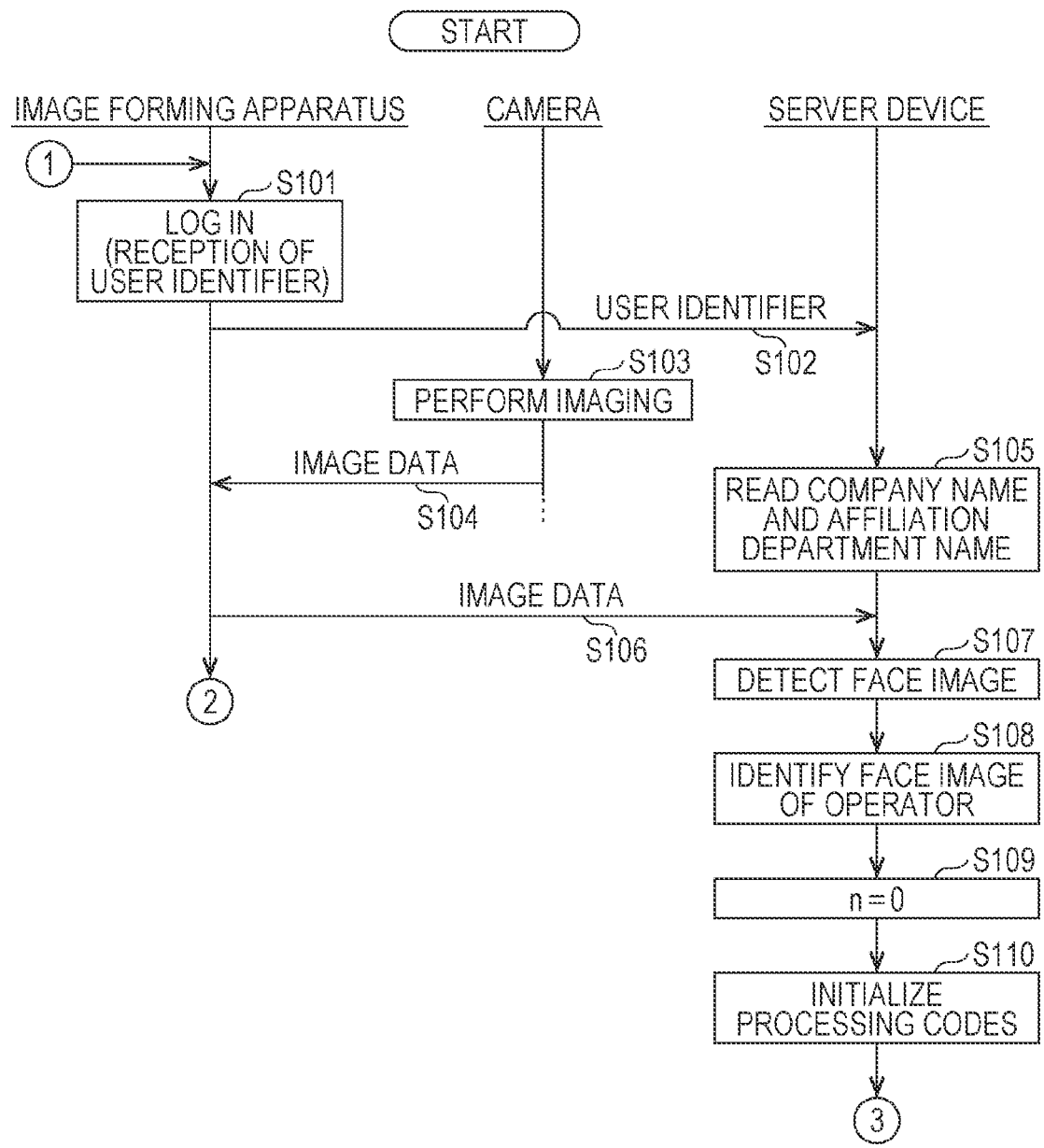
FIG. 10 is a sequence diagram (part 1) illustrating operation in the security system.

In a case where the face recognition processing unit 443 determines that there is no partial image that cannot be recognized as a face image, the integrated control unit 442 shifts the control to step S108 in FIG. 10 and continues the processing.

In a case where the face recognition processing unit 443 determines that there is a partial image that cannot be recognized as a face image, the integrated control unit 442 generates warning information. Here, the generated warning information indicates a message asking the operator whether a person near the operator is a person having no problem in terms of security. The integrated control unit 442 controls the network communication circuit 456 so that the generated warning information is transmitted to the image forming apparatus 5 via the network 2. The network communication circuit 456 transmits the warning information to the image forming apparatus 5.

Figure 34:
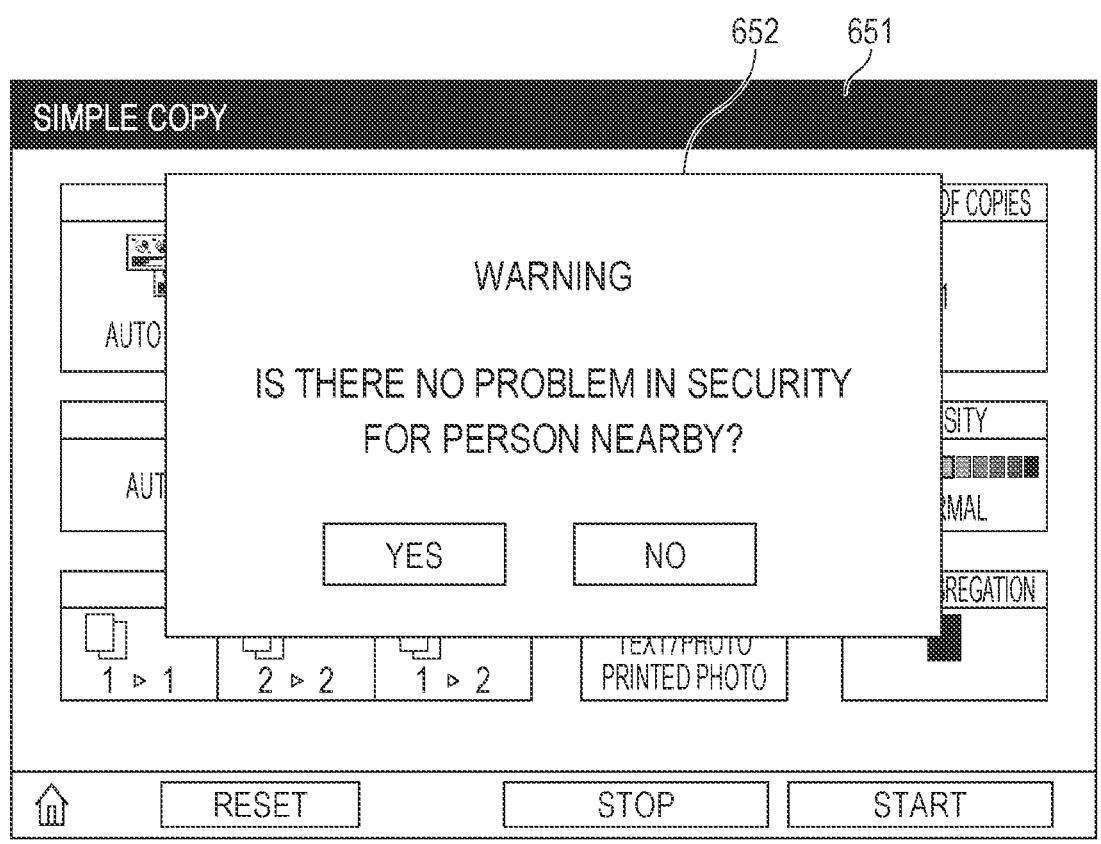
FIG. 34 illustrates a screen including a warning message displayed on the operation panel of the image forming apparatus 5 in a fifth example.

As an example, FIG. 34 illustrates a screen 651 displayed on the operation panel 519 of the image forming apparatus 5 in accordance with the warning information.

The screen 651 includes a message area 652. In the message area 652, a warning message for the operator is displayed. The message area 652 includes, for example, a message "WARNING IS THERE NO PROBLEM IN SECURITY FOR PERSON NEARBY? [YES] [NO]". This message is for inquiring of the operator whether or not a person standing around the operator has no problem in terms of security in a case where the identifier that identifies the feature amount of the face image does not exist in the user table 410 or in a case where it is not possible to clearly recognize an image as the face image.

Figure 11:
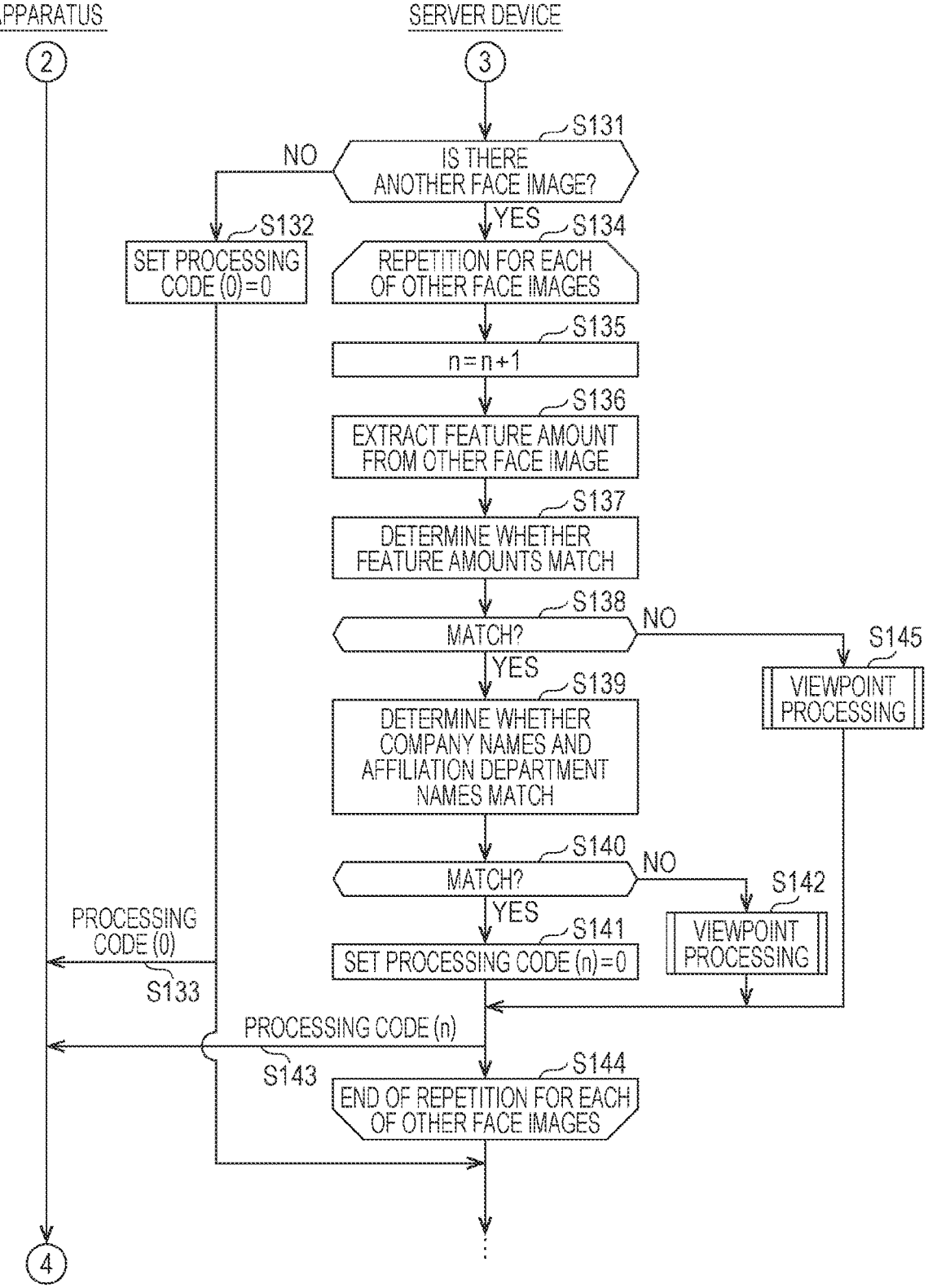
FIG. 11 is a sequence diagram (part 2) illustrating the operation in the security system (continuing from FIG. 10)

(2) The determination control unit 447 included in the main control unit 441 of the server device 4 compares a feature amount extracted from another face image with feature amounts included in all pieces of feature amount data in the feature amount group 420 of the storage circuit 460, as illustrated in step S137 in FIG. 11, and determines whether or not the extracted feature amount matches the feature amounts.

Here, in a case where the determination control unit 447 determines that there is not a matched feature amount, the integrated control unit 442 generates the same warning information as described above. The integrated control unit 442 controls the network communication circuit 456 so that the generated warning information is transmitted to the image forming apparatus 5 via the network 2. The network communication circuit 456 transmits the warning information to the image forming apparatus 5.

(3) The network communication circuit 556 of the image forming apparatus 5 receives the warning information from the server device 4 via the network 2. The network communication circuit 556 outputs the received warning information to the integrated control unit 542.

When receiving the warning information, the integrated control unit 542 performs control so that operation is temporarily stopped in a case where the operation is received from the operator. For example, in a case where copy operation is received from the operator, the integrated control unit 542 controls the scanner control circuit 557 and the printer control circuit 559 so that the copy operation is temporarily stopped.

Next, the integrated control unit 542 controls the message generation unit 544 so that a message is generated in accordance with the received warning information. The message generation unit 544 outputs the generated message to the operation panel 519. The operation panel 519 displays the screen 651 illustrated in FIG. 34 as an example.

The operation panel 519 receives a response from the operator. The response from the operator is "YES" or "NO".

The operation panel 519 outputs the response received from the operator to the integrated control unit 542.

The integrated control unit 542 receives the response received from the operator from the operation panel 519.

In a case where the received response is "YES", the integrated control unit 542 performs control so that the temporarily stopped operation is continued. For example, in a case where the copy operation is received from the operator, the integrated control unit 542 controls the scanner control circuit 557 and the printer control circuit 559 so that the copy operation is continuously executed.

On the other hand, in a case where the received response is "NO", the integrated control unit 542 performs control so that the temporarily stopped operation is canceled. For example, in a case where the copy operation is received from the operator, the integrated control unit 542 cancels a copy job and controls the scanner control circuit 557 and the printer control circuit 559 so that the copy operation is canceled.

As described above, in a case where it is not possible to determine whether or not the person indicated by the person information is a related person, the determination control unit 447 notifies the image forming apparatus 5 to cause the image forming apparatus 5 to request the operator to perform determination whether or not the person is a related person of the operator. In addition, in a case where the face image of the person cannot be recognized from the acquired person image, the determination control unit 447 determines that it is not possible to determine whether or not the person is a related person.

In addition, the face recognition processing unit 443 (search unit) searches the storage circuit 460 for a face image that matches the acquired face image. In a case where a face image that matches the acquired face image cannot be found from the storage circuit 460, the determination control unit 447 determines that it is not possible to determine whether or not the person is a related person.

6.2 Operation in Fifth Example

Figure 35:
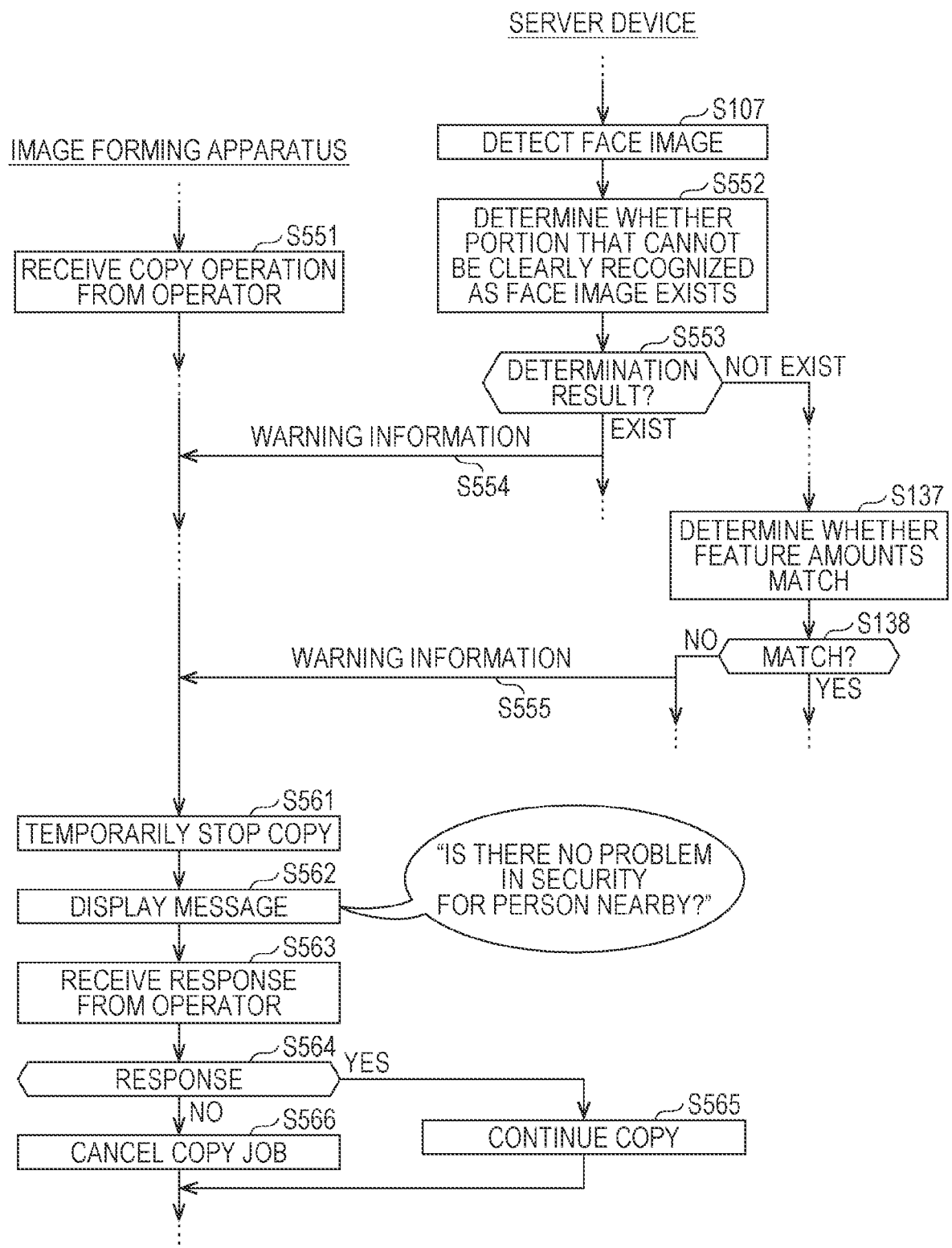
FIG. 35 is a sequence diagram illustrating operation in the fifth example.

The operation in the fifth example will be described with reference to a sequence diagram illustrated in FIG. 35.

After the login by the user is executed by the login control unit 546 in step S101 illustrated in FIG. 10, the operation panel 519 of the image forming apparatus 5 receives, for example, copy operation from the operator (step S551).

In addition, after the face recognition processing unit 443 detects the face images representing the face portions of all the users from the image data 600 written in the storage circuit 460 in step S107 illustrated in FIG. 10, the face recognition processing unit 443 determines whether or not a partial image that cannot be clearly recognized as a face image exists when face image data including a face image representing the face portion of the user is cut out from the image 601 included in the image data 600 (step S552).

In a case where the face recognition processing unit 443 determines that a partial image that cannot be clearly recognized as a face image does not exist ("NOT EXIST" in step S553), the integrated control unit 442 shifts the control to step S108 in FIG. 10 and continues the processing.

On the other hand, in a case where the face recognition processing unit 443 determines that a partial image that cannot be clearly recognized as a face image exists ("EXIST" in step S553), the integrated control unit 442 generates warning information. The integrated control unit 442 performs control so that the generated warning information is transmitted to the image forming apparatus 5 via the network 2 (step S554).

In addition, in step S137 illustrated in FIG. 11, the determination control unit 447 compares a feature amount extracted from another face image with feature amounts included in all pieces of feature amount data in the feature amount group 420 of the storage circuit 460, determines whether or not the extracted feature amount matches the feature amounts, and in a case where it is determined that there is not a matched feature amount ("NO" in step S138), the integrated control unit 442 generates warning information. The integrated control unit 442 performs control so that the generated warning information is transmitted to the image forming apparatus 5 via the network 2 (step S555).

The integrated control unit 542 receives the warning information from the server device 4 via the network 2 (steps S554 and S555).

In a case where the warning information is received, for example, in a case where copy operation is received, the integrated control unit 542 performs control so that the copy operation is temporarily stopped (step S561).

Next, the message generation unit 544 generates a message in accordance with the received warning information, and the operation panel 519 displays a screen including the message (step S562).

The operation panel 519 receives a response from the operator (step S563).

In a case where the received response is "YES" ("YES" in step S564), the integrated control unit 542 controls the scanner control circuit 557 and the printer control circuit 559 so that the copy operation is continuously executed, for example (step S565).

On the other hand, in a case where the received response is "NO" ("NO" in step S564), the integrated control unit 542 cancels a copy job, for example, and controls the scanner control circuit 557 and the printer control circuit 559 so that the copy operation is canceled, for example (step S566).

Thus, a series of operations is ended.

6.3 Summary

In a case where the face image of another user in the image data or the identifier that identifies the feature amount is not stored in the user table 410, or in a case where an image cannot be clearly determined as a face image in the image data, the operator is notified of that fact, and the operation is continued or the operation is stopped depending on the response of the operator. As a result, security can be maintained.

7 Sixth Example

A sixth example of the embodiment will be described.

In the sixth example, in a case where it is determined that there is a person who is not a related person near the operator by using image data generated by imaging by the camera 6, the operation by the operator on the image forming apparatus 5 is invalidated until the person who is not a related person is away from the operator by a certain distance or more.

7.1 Configuration of System

The sixth example has a configuration similar to that of the first example. Here, differences from the first example will be mainly described.

The determination unit 543 of the image forming apparatus 5 determines whether or not there is at least one processing code of "1" among the received processing code (0) to processing code (n). That is, it is determined whether or not there is a person who is not a related person around the operator.

Figure 36:
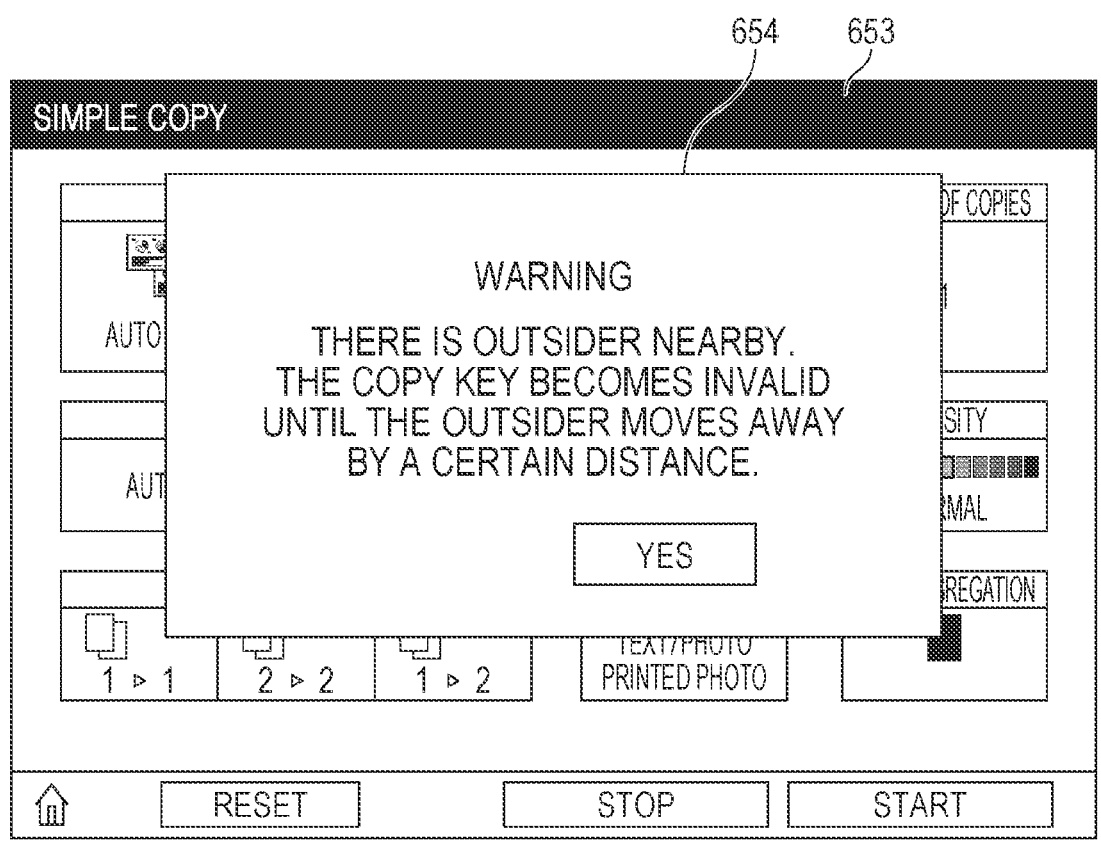
FIG. 36 illustrates a screen including a warning message displayed on the operation panel of the image forming apparatus 5 in a sixth example.

In a case where there is at least one processing code of "1" among the received processing code (0) to processing code (n), that is, in a case where there is a person who is not a related person, the integrated control unit 542 invalidates an operation key included in the operation panel 519 of the image forming apparatus 5. For example, the operation panel 519 includes a copy key as the operation key, and the integrated control unit 542 invalidates the copy key. That is, even when the copy key is pressed, the copy operation is not started. In addition, since a person who is not a related person is present nearby, the integrated control unit 542 controls the message generation unit 544 so that a message is generated indicating that the operation key is invalidated until the person who is not a related person is away. The message generation unit 544 outputs the generated message to the operation panel 519 and performs control so that a screen including the generated message is displayed. As an example, FIG. 36 illustrates a screen 653 displayed on the operation panel 519 of the image forming apparatus 5.

The screen 653 includes a message area 654. In the message area 654, a warning message for the operator is displayed. In the message area 654, for example, a message "WARNING THERE IS OUTSIDER NEARBY. THE COPY KEY BECOMES INVALID UNTIL THE OUTSIDER MOVES AWAY BY A CERTAIN DISTANCE. [YES]" is included.

In a case where there is no processing code of "1" among the received processing code (0) to processing code (n), that is, in a case where there is no person who is not a related person, the integrated control unit 542 validates the operation key. The operation panel 519 receives an operation key, and the integrated control unit 542 performs control so that processing corresponding to the received operation key is executed. For example, the integrated control unit 542 validates the copy key, the operation panel 519 receives the copy key, and the integrated control unit 542 performs control so that the copy operation corresponding to the received copy key is executed. Next, logout is performed.

Next, the camera 6 generates image data by imaging and transmits the generated image data to the image forming apparatus 5, and the image forming apparatus 5 transmits the image data to the server device 4.

The server device 4 executes steps S107 to S144 illustrated in FIGS. 10 to 11, and then shifts the control to the determination by the determination unit 543 as to whether or not there is at least one processing code of "1" among the received processing code (0) to processing code (n).

As described above, the network communication circuit 456 (notifier) notifies the image forming apparatus 5 to cause the image forming apparatus 5 to invalidate the operation key in a case where the determination control unit 447 determines that a person is not a related person.

7.2 Operation of Sixth Example

The operation of the sixth example will be described with reference to a sequence diagram illustrated in FIG. 37.

Figure 37:
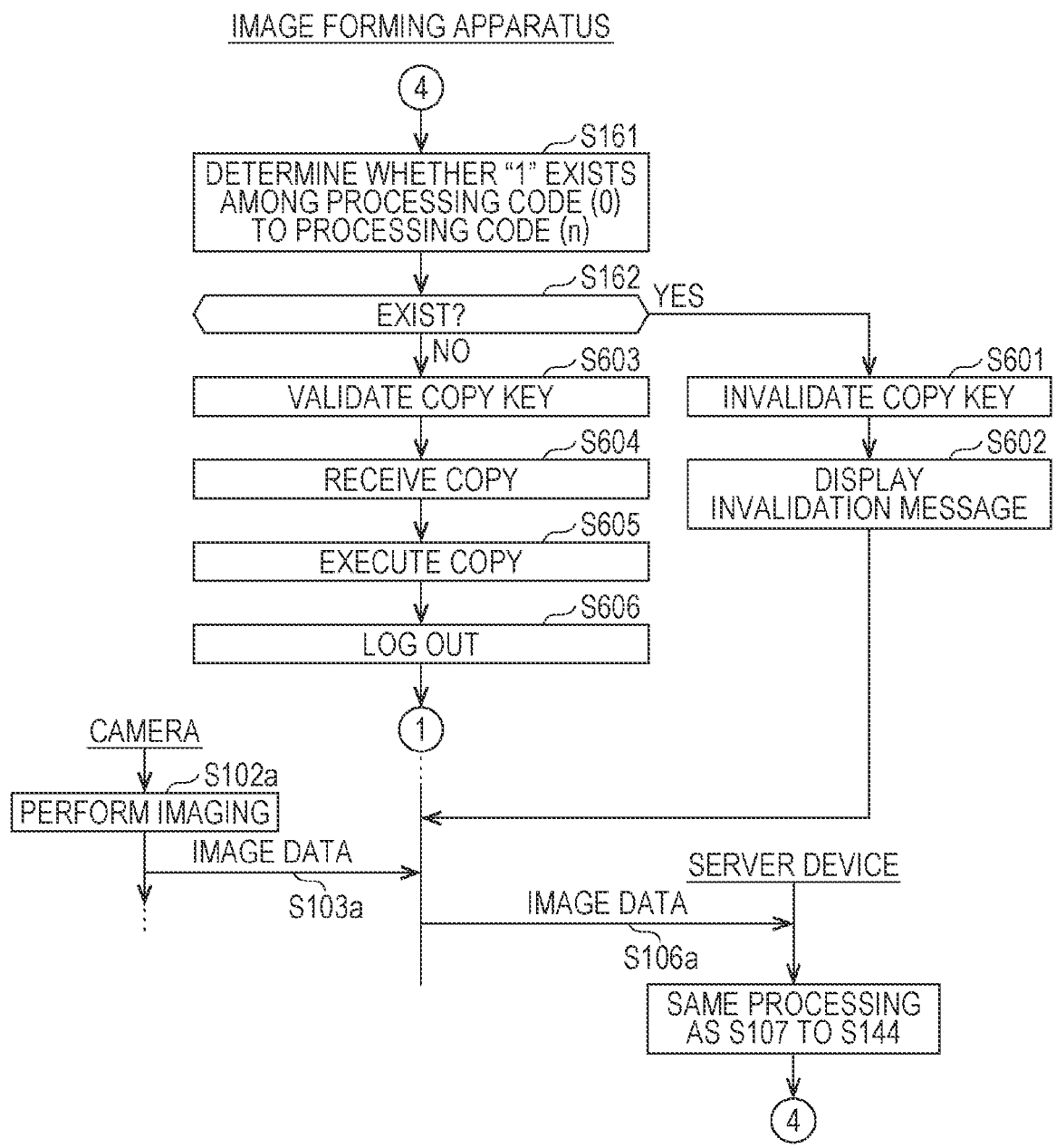
FIG. 37 is a sequence diagram illustrating operation in the sixth example.

Note that the sequence diagram illustrated in FIG. 37 is used instead of the sequence diagram illustrated in FIG. 12 in FIGS. 10 to 12 illustrating the operation of the first example.

After the image forming apparatus 5 receives the processing code (0) to the processing code (n) from the server device 4 in steps S133 and S143 illustrated in FIG. 11, the determination unit 543 determines whether or not there is at least one processing code of "1" among the received processing code (0) to processing code (n) (step S161).

In a case where there is at least one processing code of "1" among the received processing code (0) to processing code (n) ("YES" in step S162), the integrated control unit 542 invalidates an operation key included in the operation panel 519 of the image forming apparatus 5, for example, the copy key (step S601). Next, since a person who is not a related person is present nearby, the message generation unit 544 generates a message indicating that the operation key is invalidated until the person who is not a related person is away. The operation panel 519 displays a screen including the generated message (step S602).

In a case where there is no processing code of "1" among the received processing code (0) to processing code (n), ("NO" in step S162), the integrated control unit 542 validates the operation key (for example, the copy key) (step S603). Next, the operation panel 519 receives an operation key (for example, the copy key) (step S604), and the integrated control unit 542 performs control so that processing corresponding to the received operation key (for example, the copy key) is executed (step S605). Next, logout is performed (step S606).

Next, the camera 6 generates image data by imaging (step S102a), and transmits the generated image data to the image forming apparatus 5 (step S103a), and the image forming apparatus 5 transmits the image data to the server device 4 (step S106a). Next, the server device 4 executes steps S107 to S144 illustrated in FIGS. 10 to 11.

Next, the control is shifted to step S161, and the processing is repeated.

As a result, a series of operations is ended.

7.3 Summary

As described above, in a case where it is determined that there is a person who is not a related person near the operator by using the image data generated by imaging by the camera 6, the operation by the operator on the image forming apparatus 5 is invalidated until the person who is not a related person is away from the operator by a certain distance or more. As a result, security can be maintained.

8 Seventh Example

A seventh example of the embodiment will be described.

In the seventh example, in a case where a document that has been read is left on the document discharge tray 518 due to an operator's forgetting to take the document, or printed matter is left on the printed matter discharge tray 516 due to an operator's forgetting to take the printed matter, the image forming apparatus 5 issues an alert to the operator. At that time, in a case where there is a person who is not a related person around the operator, the image forming apparatus 5 issues a more emphasized alert as compared with a case where there is only a related person around the operator.

8.1 Configuration of System

The seventh example has a configuration similar to that of the first example. Here, differences from the first example will be mainly described.

The operation panel 519 further includes a sound source that generates a beep sound and a speaker that outputs the beep sound. In a case where a document that has been read remains left on the document discharge tray 518 due to the operator's forgetting to take the document, or printed matter remains left on the printed matter discharge tray 516 due to the operator's forgetting to take the printed matter, the speaker outputs the beep sound generated by the sound source as an alert sound by control of the integrated control unit 542. The speaker can change the volume of the beep sound to be output to a large volume, a medium volume, a small volume, or the like and output the beep sound, by control of the integrated control unit 542.

The determination unit 543 of the image forming apparatus 5 determines whether or not there is at least one processing code of "1" among the received processing code (0) to processing code (n). That is, it is determined whether or not there is a person who is not a related person around the operator.

In a case where there is at least one processing code of "1" among the received processing code (0) to processing code (n), that is, in a case where there is a person who is not a related person around the operator, the operation panel 519 displays a message indicating that there is a person who is not a related person near the operator, and the speaker 515 provided in the operation panel 519 outputs a warning sound. Next, the operation panel 519 receives operation for a copy job, a print job, or the like from the operator, and the integrated control unit 542 controls the scanner control circuit 557, the printer control circuit 559, and the like so that operation is performed in accordance with the received operation.

Note that the processing code of "1" among the processing codes (0) to (n) also means instructing the image forming apparatus 5 to output the alert sound in a case where it is detected that a document that has been read remains left on the document discharge tray 518 of the image forming apparatus 5 due to the operator's forgetting to take the document, or it is detected that printed matter remains left on the printed matter discharge tray 516 due to the operator's forgetting to take the printed matter. That is, output of the processing code of "1" among the processing code (0) to the processing code (n) by the server device 4 is synonymous with notification of warning output from the server device 4 to the image forming apparatus 5.

After the operations by the image reader 511, the printer 512, and the like are finished, the integrated control unit 542 measures a lapse of a predetermined time. Here, in the case of a copy job, the predetermined time is a time that is usually required until the document is removed from the document discharge tray 518 by the operator after completion of reading of the document. In addition, in the case of a print job, the predetermined time is usually a time required until the printed matter is removed from the printed matter discharge tray 516 by the operator after completion of printing.

After the predetermined time elapses, in a case where the document detection sensor provided in the document discharge tray 518 detects a document or in a case where the printed matter detection sensor provided in the printed matter discharge tray 516 detects printed matter, the integrated control unit 542 controls the speaker so that the beep sound generated by the sound source is output as the alert sound.

In this case, when it is determined that there is a person who is not a related person around the operator, the integrated control unit 542 controls the speaker so that the beep sound having the large volume is output as the alert sound. On the other hand, when it is determined that there is only a related person around the operator, the integrated control unit 542 controls the speaker so that the beep sound having the small volume is output as the alert sound.

8.2 Operation of Seventh Example

The operation of the seventh example will be described with reference to a sequence diagram illustrated in FIG. 38.

Figure 38:
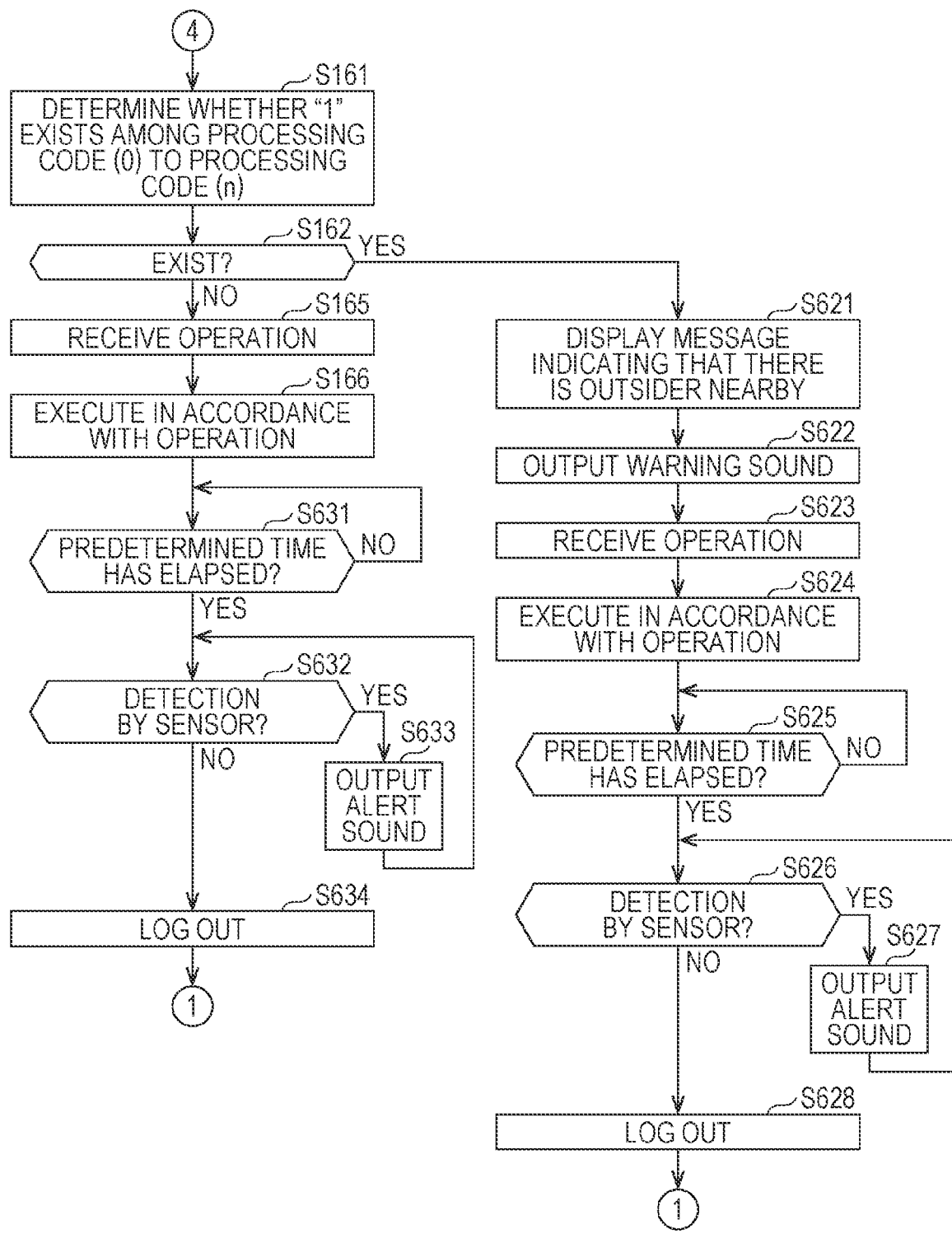
FIG. 38 is a sequence diagram illustrating operation in a seventh example.

Note that the sequence diagram illustrated in FIG. 38 is used instead of the sequence diagram illustrated in FIG. 12 in FIGS. 10 to 12 illustrating the operation of the first example.

After the image forming apparatus 5 receives the processing code (0) to the processing code (n) from the server device 4 in steps S133 and S143 illustrated in FIG. 11, the determination unit 543 determines whether or not there is at least one processing code of "1" among the received processing code (0) to processing code (n) (step S161).

In a case where there is at least one processing code of "1" among the received processing code (0) to processing code (n) ("YES" in step S162), the message generation unit 544 generates a warning message indicating that there is a person who is not a related person nearby, or the like in accordance with an instruction from the determination unit 543. The message generation unit 544 outputs the generated warning message to the operation panel 519 via the input/output circuit 558. The operation panel 519 displays the warning message (step S621). Next, the warning sound generation unit 545 generates a warning sound in accordance with an instruction from the determination unit 543. The warning sound generation unit 545 outputs the generated warning sound to the speaker 515 via the output circuit 562. The speaker 515 outputs the warning sound by voice (step S622).

The operation panel 519 receives operation for a copy job, a print job, or the like from the operator (step S623), and the integrated control unit 542 controls the scanner control circuit 557, the printer control circuit 559, and the like so that operation is performed in accordance with the received operation (step S624).

After the operations by the image reader 511, the printer 512, and the like are finished, the integrated control unit 542 measures a lapse of a predetermined time and waits until the predetermined time elapses ("NO" in step S625).

When the predetermined time elapses ("YES" in step S625), in a case where the document detection sensor provided in the document discharge tray 518 detects a document or in a case where the printed matter detection sensor provided in the printed matter discharge tray 516 detects printed matter ("YES" in step S626), the integrated control unit 542 controls the speaker so that the beep sound generated by the sound source is output at the large volume as the alert sound (step S627). Next, the integrated control unit 542 shifts the control to step S626 and repeats the processing.

In a case where the document detection sensor provided in the document discharge tray 518 does not detect a document and the printed matter detection sensor provided in the printed matter discharge tray 516 does not detect printed matter ("NO" in step S626), the login control unit 546 logs out (step S628). Next, the integrated control unit 542 shifts the control to step S101 and repeats the processing.

On the other hand, in a case where there is no processing code of "1" among the received processing code (0) to processing code (n), ("NO" in step S162), the operation panel 519 receives operation for a copy job, a print job, or the like from the operator (step S165), and the integrated control unit 542 controls the scanner control circuit 557, the printer control circuit 559, and the like so that operation is performed in accordance with the received operation (step S166).

After the operations by the image reader 511, the printer 512, and the like are finished, the integrated control unit 542 measures a lapse of a predetermined time and waits until the predetermined time elapses ("NO" in step S631).

When the predetermined time elapses ("YES" in step S631), in a case where the document detection sensor provided in the document discharge tray 518 detects a document or in a case where the printed matter detection sensor provided in the printed matter discharge tray 516 detects printed matter ("YES" in step S632), the integrated control unit 542 controls the speaker so that the beep sound generated by the sound source is output at the small volume as the alert sound (step S633). Next, the integrated control unit 542 shifts the control to step S632 and repeats the processing.

In a case where the document detection sensor provided in the document discharge tray 518 does not detect a document and the printed matter detection sensor provided in the printed matter discharge tray 516 does not detect printed matter ("NO" in step S632), the login control unit 546 logs out (step S634). Next, the integrated control unit 542 shifts the control to step S101 and repeats the processing.

8.3 Summary

As described above, in a case where the determination control unit 447 determines that a person is not a related person, when the operator has forgot to take a document or printed matter in the image forming apparatus 5, the network communication circuit 456 (notifier) notifies the image forming apparatus 5 to cause the image forming apparatus 5 to issue a more emphasized warning than usual.

Here, the image forming apparatus 5 may be an image reading apparatus that reads a document and generates image data, or a printing apparatus that produces printed matter.

As described above, in a case where a document that has been read is left on the document discharge tray 518 or printed matter is left on the printed matter discharge tray 516, the image forming apparatus 5 issues an alert to the operator. At that time, in a case where there is a person who is not a related person around the operator, the image forming apparatus 5 issues a more emphasized alert as compared with a case where there is only a related person around the operator. As a result, security can be maintained.

As described above, the operation panel 519 includes the sound source that generates the beep sound and the speaker that outputs the beep sound, and in a case where a document that has been read is left on the document discharge tray 518 or printed matter is left on the printed matter discharge tray 516, the speaker outputs the beep sound as the alert sound. However, the present embodiment is not limited thereto.

The operation panel 519 may further include an LED lamp, and in a case where a document that has been read is left on the document discharge tray 518 or printed matter is left on the printed matter discharge tray 516, the LED lamp may emit light as an alert by control of the integrated control unit 542. At that time, in a case where there is a person who is not a related person around the operator, the LED lamp may emit stronger light as compared with a case where there is only a related person around the operator, by control of the integrated control unit 542.

In addition, in a case where a document that has been read is left on the document discharge tray 518 or printed matter is left on the printed matter discharge tray 516, the LED lamp may repeat blinking as an alert by control of the integrated control unit 542. At that time, in a case where there is a person who is not a related person around the operator, the LED lamp may have a shorter blinking cycle than in a case where there is only a related person around the operator, by control of the integrated control unit 542.

9 Eighth Example

An eighth example of the embodiment will be described.

In the eighth example, in a case where there is a person who is not a related person around the operator, the image forming apparatus 5 issues an alert to the operator when the operator has moved away from the image forming apparatus 5 during processing, for example, during execution of a copy job, during execution of a print job, or the like in the image forming apparatus 5, for replenishment of consumables (recording sheet, toner, and the like) in the image forming apparatus 5, for example.

9.1 Configuration of System

The eighth example has a configuration similar to that of the first example. Here, differences from the first example will be mainly described.

(1) Configuration in the Image Forming Apparatus 5 and the Camera 6

The operation panel 519 further includes a sound source that generates a beep sound and a speaker that outputs the beep sound. In a case where there is a person who is not a related person around the operator, when the operator has moved away from the image forming apparatus 5 during processing in the image forming apparatus 5, the speaker outputs the beep sound generated by the sound source as an alert sound by control of the integrated control unit 542.

In a case where there is at least one processing code of "1" among the processing code (0) to processing code (n) received from the server device 4, that is, in a case where there is a person who is not a related person around the operator, the determination unit 543 receives the operator code from the server device 4 via the network 2 and the network communication circuit 556.

Here, the operator code indicates whether or not the operator is reflected in the image 601 generated by imaging by the camera 6. In a case where the operator code is "0", it indicates that the operator is reflected in the image 601. On the other hand, in a case where the operator code is "1", it indicates that the operator is not reflected in the image 601.

The determination unit 543 determines whether the received operator code is "0" or "1".

In a case where it is determined that the received operator code is "0", no alert is issued.

On the other hand, in a case where it is determined that the received operator code is "1", the speaker outputs the beep sound generated by the sound source as the alert sound by control of the integrated control unit 542.

The camera 6 generates image data by imaging as needed, and transmits the generated image data to the image forming apparatus 5.

The input circuit 561 receives the image data from the camera 6.

When the image data is received by the input circuit 561, the network communication circuit 556 transmits the received image data to the server device 4 via the network 2.

(2) Configuration in the Server Device 4

The network communication circuit 456 receives image data from the image forming apparatus 5 via the network 2. The network communication circuit 456 writes the received image data into the storage circuit 460 as the image data 600.

The face recognition processing unit 443 detects face images representing face portions of all the users from the image data 600 written in the storage circuit 460. In addition, the face recognition processing unit 443 attempts to identify the face image of the operator who operates the image forming apparatus 5 from the detected face image.

In a case where the face image of the operator who operates the image forming apparatus 5 can be identified, the determination control unit 447 sets the operator code to "0". On the other hand, in a case where the face image of the operator who operates the image forming apparatus 5 cannot be identified, the determination control unit 447 sets the operator code to "1".

The determination control unit 447 controls the network communication circuit 456 so that the operator code is transmitted to the image forming apparatus 5 via the network 2.

The network communication circuit 456 transmits the operator code to the image forming apparatus 5 via the network 2 by control of the determination control unit 447.

9.2 Operation in Eighth Example

Figure 39:
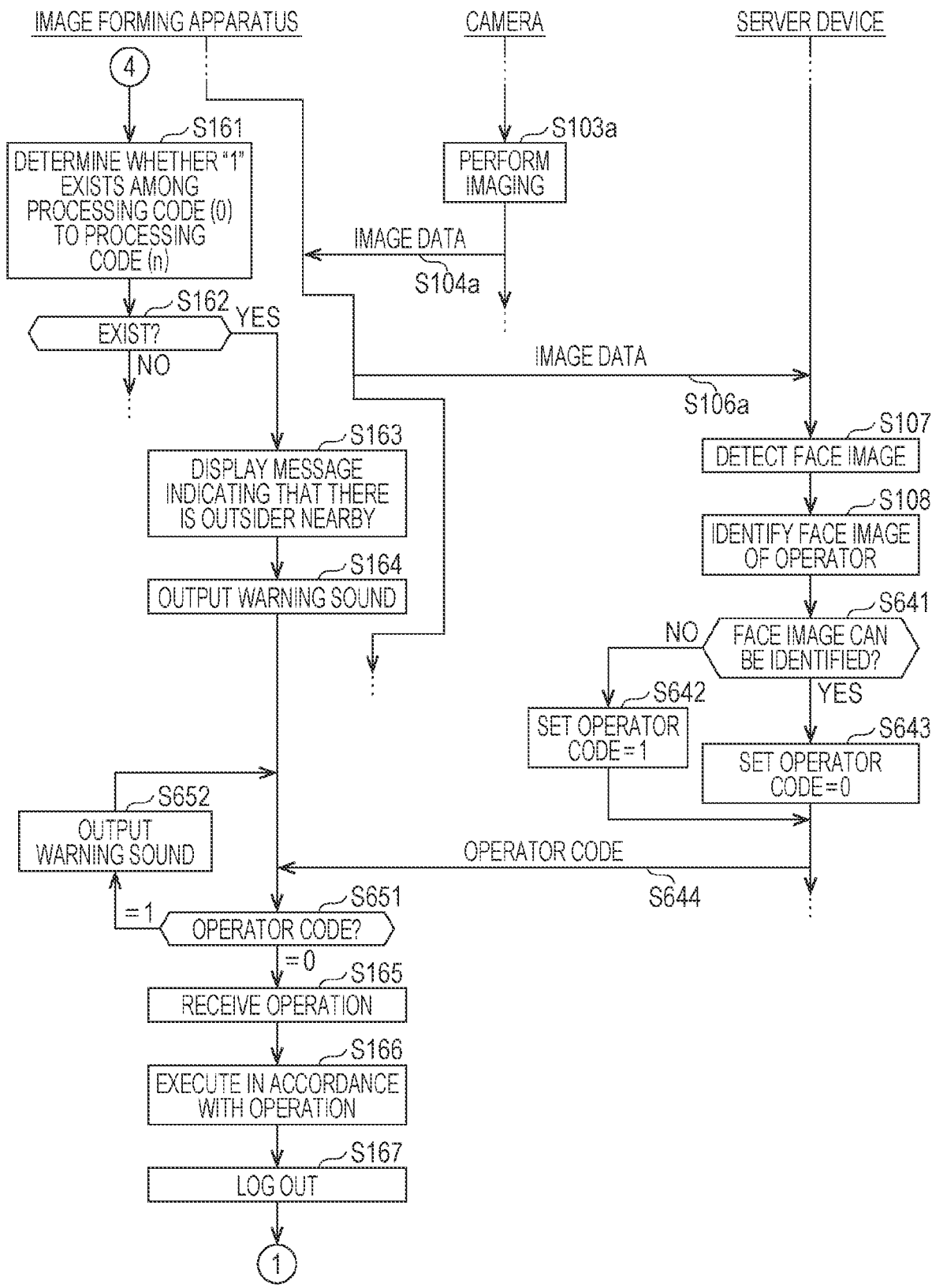
FIG. 39 is a sequence diagram illustrating operation in an eighth example.

The operation in the eighth example will be described with reference to a sequence diagram illustrated in FIG. 39.

The camera 6 generates image data by imaging as needed (step S103*a*), and transmits the generated image data to the image forming apparatus 5 (step S104*a*).

The input circuit 561 of the image forming apparatus 5 receives the image data from the camera 6 (step S104*a*).

When the image data is received by the input circuit 561, the network communication circuit 556 transmits the received image data to the server device 4 via the network 2 (step S106*a*).

The network communication circuit 456 receives the image data from the image forming apparatus 5 via the network 2 (step S106*a*).

The face recognition processing unit 443 detects face images representing face portions of all the users from the image data 600 written in the storage circuit 460 (step S107). In addition, the face recognition processing unit 443 attempts to identify the face image of the operator who operates the image forming apparatus 5 from the detected face image (step S108).

In a case where the face image of the operator who operates the image forming apparatus 5 can be identified ("YES" in step S641), the determination control unit 447 sets the operator code to "0" (step S643). On the other hand, in a case where the face image of the operator who operates the image forming apparatus 5 cannot be identified ("NO" in step S641), the determination control unit 447 sets the operator code to "1" (step S642).

The network communication circuit 456 transmits the operator code to the image forming apparatus 5 via the network 2 by control of the determination control unit 447 (step S644).

The determination unit 543 determines whether or not there is at least one processing code of "1" among the received processing code (0) to processing code (n) (step S161).

In a case where there is at least one processing code of "1" among the received processing code (0) to processing code (n) ("YES" in step S162), the message generation unit 544 generates a warning message in accordance with an instruction from the determination unit 543, and the operation panel 519 displays the warning message (step S163). Next, the warning sound generation unit 545 generates a warning sound, and the speaker 515 outputs the warning sound by voice (step S164).

Next, the determination unit 543 receives the operator code from the server device 4 via the network 2 and the network communication circuit 556 (step S644).

The determination unit 543 determines whether the received operator code is "0" or "1" (step S651).

In a case where it is determined that the received operator code is "1" ("=1" in step S651), the speaker outputs the beep sound generated by the sound source as the alert sound by control of the integrated control unit 542 (step S652). Next, the integrated control unit 542 shifts the control to step S651. That is, the beep sound is continuously output until the operator returns to the front of the image forming apparatus 5. In short, the beep sound is continuously output during a period in which the operator code is "1".

On the other hand, in a case where it is determined that the received operator code is "0" ("=0" in step S651), the beep sound is not output, and the operation panel 519 receives the operation by the operator (step S165). The main control unit 541 controls the network communication circuit 556, the scanner control circuit 557, the printer control circuit 559, and the like to cause them to operate in accordance with the operation by the operator, and corresponding processing is executed (step S166). Next, the login control unit 546 logs out (step S167), and then the main control unit 541 shifts the control to step S101 in FIG. 10 and continues the processing.

9.3 Summary

As described above, in a case where the determination control unit 447 determines that a person is not a related person, the network communication circuit 456 (notifier) notifies the image forming apparatus 5 to cause the image forming apparatus 5 to issue a warning when detecting that the operator has moved away from the image forming apparatus 5.

As described above, in a case where there is a person who is not a related person around the operator, when the operator has moved away from the image forming apparatus 5 during the processing in the image forming apparatus 5, the image forming apparatus 5 issues an alert to the operator. As a result, security can be maintained.

10 Ninth Example

A ninth example of the embodiment will be described.

In the ninth example, in a case where processing is executed on an important document in terms of security, the image forming apparatus 5 issues a warning to an operator if there is a person who is not a related person around the operator when, for example, security settings such as printing of a stamp, a watermark, and printing of a copy guard (Hereinafter, referred to as a confidential stamp or the like.) are received from the operator, and a print job or a copy job is executed.

10.1 Configuration of System

The ninth example has a configuration similar to that of the first example. Here, differences from the first example will be mainly described.

The operation panel 519 receives setting of the confidential stamp or the like from the operator, from the user.

The integrated control unit 542 performs control so that a print job or a copy job is executed on the basis of the setting.

The determination unit 543 determines whether or not there is at least one processing code of "1" among the processing code (0) to processing code (n) received from the server device 4.

In a case where there is at least one processing code of "1" among the received processing code (0) to processing code (n), that is, in a case where there is a person who is not a related person around the operator, the determination unit 543 determines whether or not the setting of the confidential stamp or the like has been received from the operator, from the user.

In a case where it is determined that the setting of the confidential stamp or the like has been received from the operator, the message generation unit 544 generates a warning message in accordance with an instruction from the determination unit 543. The message generation unit 544 outputs the generated warning message to the operation panel 519 via the input/output circuit 558. The operation panel 519 displays the warning message. Next, the warning sound generation unit 545 generates a warning sound in accordance with an instruction from the determination unit 543. The warning sound generation unit 545 outputs the generated warning sound to the speaker 515 via the output circuit 562. The speaker 515 outputs the warning sound by voice.

Note that the processing code "1" among the processing codes (0) to (n) received from the server device 4 also means instructing the image forming apparatus 5 to display the warning message and output the warning sound in a case where the image forming apparatus 5 receives the setting of the confidential stamp or the like from an operator. That is, output of the processing code of "1" among the processing code (0) to the processing code (n) by the server device 4 is synonymous with notification of warning output from the server device 4 to the image forming apparatus 5.

10.2 Operation of Ninth Example

The operation of the ninth example will be described with reference to a sequence diagram illustrated in FIGS. 40 and 41.

The login control unit 546 executes login by the user and receives the user identifier (step S101). The login control unit 546 performs control so that the user identifier is transmitted to the server device 4 via the network 2. The integrated control unit 442 receives the user identifier from the image forming apparatus 5 (step S102).

The integrated control unit 442 reads the user information corresponding to the received user identifier from the user table 410, and extracts the company name and the affiliation department name from the read user information (step S105).

The camera 6 generates image data by imaging (step S103), and outputs the generated image data to the image forming apparatus 5 (step S104). The integrated control unit 542 controls the network communication circuit 556 so that the received image data is transmitted to the server device 4

(step S106). The network communication circuit 456 receives the image data from the image forming apparatus 5 (step S106).

The face recognition processing unit 443 detects face images representing face portions of all the users from the received image data (step S107).

Next, the integrated control unit 442 shifts the control to step S108 illustrated in FIG. 10.

On the other hand, after the login by the user, the operation panel 519 receives the setting of the confidential stamp or the like from the operator, from the user (step S671).

Figure 41:
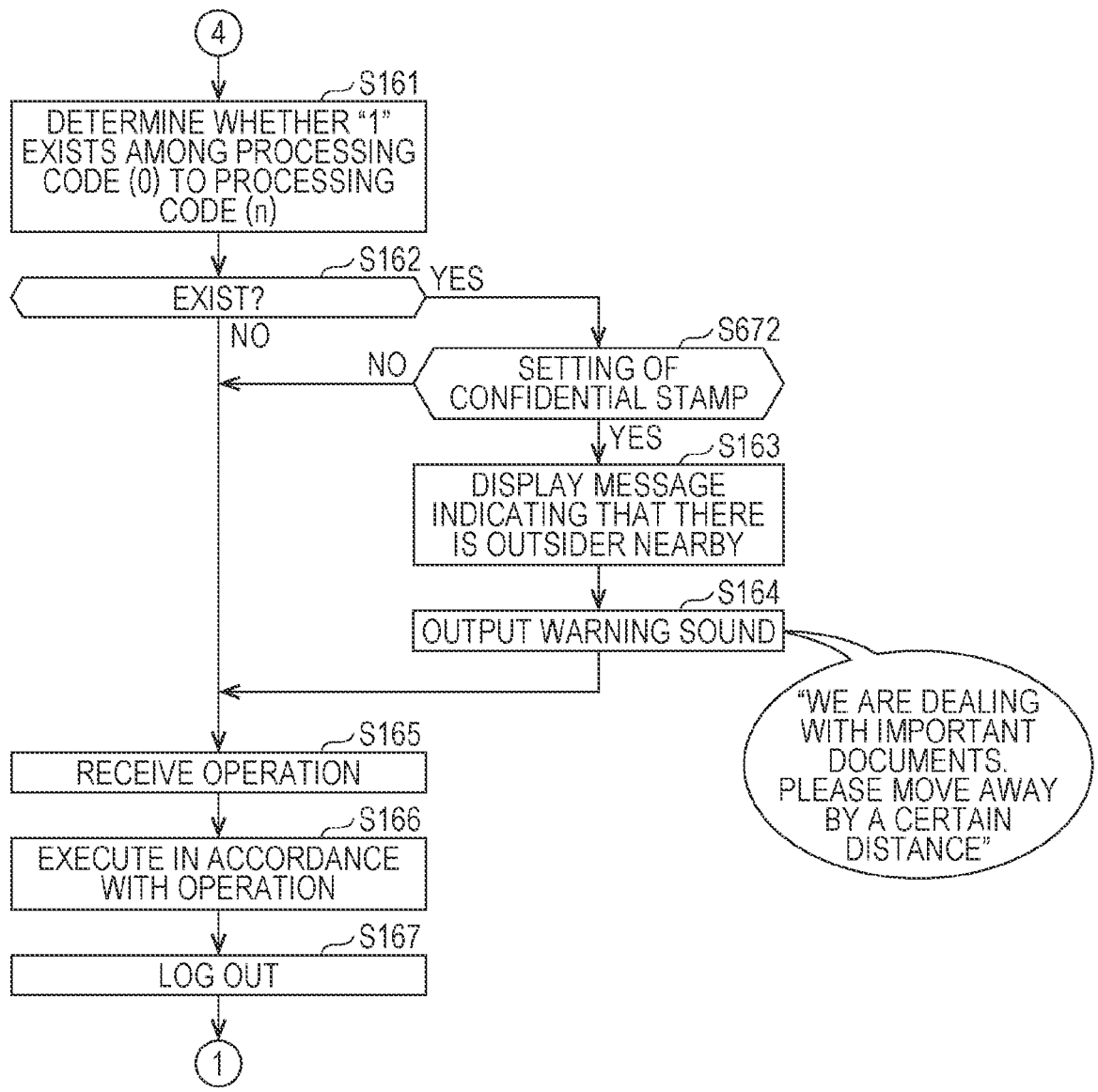
FIG. 41 is a sequence diagram illustrating the operation in the ninth example.

Next, after steps S131 to S144 illustrated in FIG. 11 are executed, as illustrated in FIG. 41, the determination unit 543 determines whether or not there is at least one processing code of "1" among the processing code (0) to processing code (n) received from the server device 4 (step S161).

In a case where there is at least one processing code of "1" among the received processing code (0) to processing code (n) ("YES" in step S162), the determination unit 543 determines whether or not the setting of the confidential stamp or the like has been received from the operator, from the user (step S672).

In a case where it is determined that the setting of the confidential stamp or the like has been received from the operator ("YES" in step S672), the message generation unit 544 generates a warning message in accordance with an instruction from the determination unit 543. The operation panel 519 displays the warning message (step S163). Next, the warning sound generation unit 545 generates a warning sound in accordance with an instruction from the determination unit 543. The speaker 515 outputs the warning sound by voice (step S164).

In a case where there is no processing code of "1" among the received processing code (0) to processing code (n) ("NO" in step S162), or in a case where it is determined that the setting of the confidential stamp or the like has not been received from the operator, from the user ("NO" in step S672), the warning message and the warning sound are not generated and are not output.

The operation panel 519 receives the operation by the operator (step S165).

The main control unit 541 controls the network communication circuit 556, the scanner control circuit 557, the printer control circuit 559, and the like to cause them to operate in accordance with the operation by the operator, and corresponding processing is executed (step S166).

Figure 40:
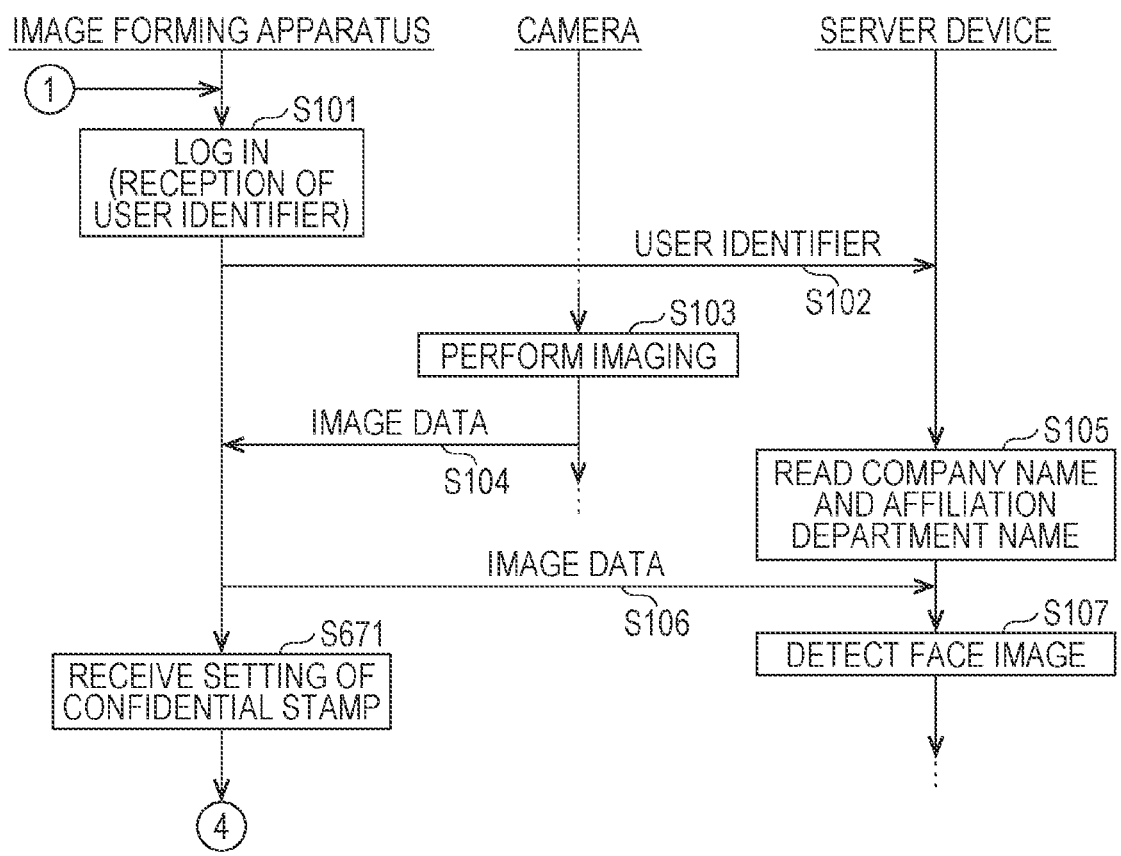
FIG. 40 is a sequence diagram illustrating operation in a ninth example.

Next, the login control unit 546 logs out (step S167), and then the main control unit 541 shifts the control to step S101 in FIG. 40 and continues the processing.

Thus, a series of pieces of processing is ended.

10.3 Summary

As described above, in a case where the determination control unit 447 determines that a person is not a related person, the network communication circuit 456 (notifier) notifies the image forming apparatus 5 to cause the image forming apparatus 5 to issue a warning when setting regarding security is made in the image forming apparatus 5.

As described above, in a case where the setting of the confidential stamp or the like is received from the operator and a print job or a copy job is executed, if there is a person who is not a related person around the operator, the image forming apparatus 5 issues a warning to the operator. As a result, security can be maintained.

10.4 Modification

A modification of the ninth example will be described.

The operation panel 519 receives, for example, any of settings of "circulation", "important", and "top secret" as a confidential stamp from the operator. The importance in terms of security increases in the order of "circulation", "important", and "top secret".

The determination unit 543 determines which one of "circulation", "important", and "top secret" is set.

The integrated control unit 542 controls the speaker 515 so that the output volume increases in the order of "circulation", "important", and "top secret".

That is, in a case where the determination unit 543 determines that "circulation" is set, the integrated control unit 542 sets the volume of the speaker 515 to the small volume.

In addition, in a case where the determination unit 543 determines that "important" is set, the integrated control unit 542 sets the volume of the speaker 515 to the medium volume.

Further, in a case where the determination unit 543 determines that "top secret" is set, the integrated control unit 542 sets the volume of the speaker 515 to the large volume.

The speaker 515 outputs the warning sound with the set volume.

Operation of Modification of Ninth Example

Figure 42:
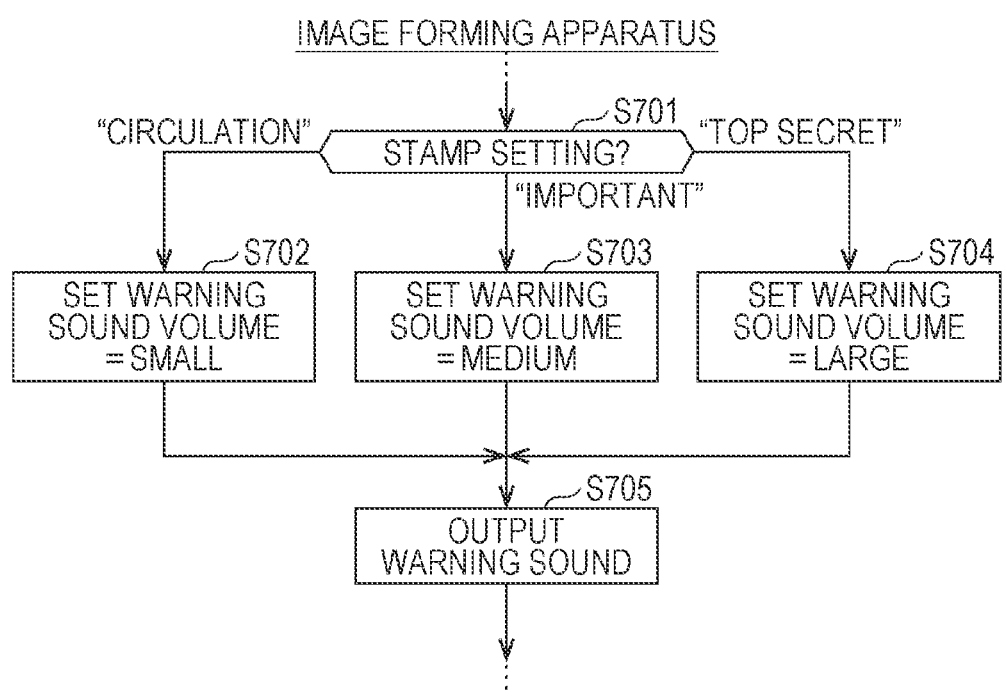
FIG. 42 is a flowchart illustrating operation in a modification of the ninth example.

Next, operation of the modification of the ninth example will be described with reference to a flowchart illustrated in FIG. 42.

The determination unit 543 determines which one of "circulation", "important", and "top secret" is set (step S701).

In a case where the determination unit 543 determines that "circulation" is set ("CIRCULATION" in step S701), the integrated control unit 542 sets the volume of the speaker 515 to the small volume (step S702).

In a case where the determination unit 543 determines that "important" is set ("IMPORTANT" in step S701), the integrated control unit 542 sets the volume of the speaker 515 to the medium volume (step S703).

Further, in a case where the determination unit 543 determines that "top secret" is set ("TOP SECRET" in step S701), the integrated control unit 542 sets the volume of the speaker 515 to the large volume (step S704).

The speaker 515 outputs the warning sound with the set volume (step S705).

Thus, a series of operations is ended.

(Summary)

As described above, the network communication circuit 456 performs notification so that a warning is issued depending on a stage of the setting regarding security.

As described above, by changing the intensity of the warning in accordance with the content of the security setting, the warning depending on the content of the security setting can be performed.

11 Tenth Example

A tenth example of the embodiment will be described.

In the tenth example, in a case where a character string such as "confidential" or "top secret", a document destination name, or another character string related to security (security information) is described in a document, the image forming apparatus 5 issues a warning to the operator if there is a person who is not a related person around the operator.

11.1 Configuration of System

The tenth example has a configuration similar to that of the first example. Here, differences from the first example will be mainly described.

In the image forming apparatus 5, for example, a copy job is executed.

As described above, in the document, for example, the character string such as "confidential" or "top secret", the document destination name, or the other character string related to the security is described.

The main control unit 441 of the image forming apparatus 5 further includes the OCR processing unit 450 (not illustrated). The OCR processing unit 450 performs OCR processing on an image acquired from the document surface to extract a character string.

The determination unit 543 determines whether or not there is at least one processing code of "1" among the processing code (0) to processing code (n) received from the server device 4.

In a case where there is at least one processing code of "1" among the received processing code (0) to processing code (n), that is, in a case where there is a person who is not a related person around the operator, the determination unit 543 determines whether or not the character string extracted by the OCR processing unit 450 is a character string related to security.

In a case where it is determined that the character string relates to security, the message generation unit 544 generates a warning message in accordance with an instruction from the determination unit 543. The message generation unit 544 outputs the generated warning message to the operation panel 519 via the input/output circuit 558. The operation panel 519 displays the warning message. Next, the warning sound generation unit 545 generates a warning sound in accordance with an instruction from the determination unit 543. The warning sound generation unit 545 outputs the generated warning sound to the speaker 515 via the output circuit 562. The speaker 515 outputs the warning sound by voice.

Note that a processing code of "1" among the processing codes (0) to (n) received from the server device 4 also means instructing the image forming apparatus 5 to display the warning message and output the warning sound in a case where the security information is detected from the document in the image forming apparatus 5.

That is, output of the processing code of "1" among the processing code (0) to the processing code (n) by the server device 4 is synonymous with notification of warning output from the server device 4 to the image forming apparatus 5.

11.2 Operation of Tenth Example

The operation of the tenth example will be described with reference to a sequence diagram illustrated in FIGS. 43 and 44.

The login control unit 546 executes login by the user and receives the user identifier (step S101). The login control unit 546 performs control so that the user identifier is transmitted to the server device 4 via the network 2. The integrated control unit 442 receives the user identifier from the image forming apparatus 5 (step S102).

The integrated control unit 442 reads the user information corresponding to the received user identifier from the user table 410, and extracts the company name and the affiliation department name from the read user information (step S105).

The camera 6 generates image data by imaging (step S103), and outputs the generated image data to the image forming apparatus 5 (step S104). The integrated control unit 542 controls the network communication circuit 556 so that the received image data is transmitted to the server device 4 (step S106). The network communication circuit 456 receives the image data from the image forming apparatus 5 (step S106).

The face recognition processing unit 443 detects face images representing face portions of all the users from the received image data (step S107).

Next, the integrated control unit 442 shifts the control to step S108 illustrated in FIG. 10.

On the other hand, after the login by the user, the operation panel 519 receives copy operation (step S681).

The integrated control unit 542 controls the scanner control circuit 557 so that scanning is executed (step S682).

The OCR processing unit 450 performs OCR processing on an image of the document surface to extract a character string (step S683).

Next, after steps S131 to S144 illustrated in FIG. 11 are executed, the determination unit 543 determines whether or not there is at least one processing code of "1" among the processing code (0) to processing code (n) received from the server device 4 (step S161).

In a case where there is at least one processing code of "1" among the received processing code (0) to processing code (n) ("YES" in step S162), the determination unit 543 determines whether a character string related to security, for example, "confidential" is extracted by the OCR processing unit 450 (step S685).

In a case where it is determined that the character string related to the security is extracted ("YES" in step S685), the message generation unit 544 generates a warning message in accordance with an instruction from the determination unit 543. The operation panel 519 displays the warning message (step S163). Next, the warning sound generation unit 545 generates a warning sound in accordance with an instruction from the determination unit 543. The speaker 515 outputs the warning sound by voice (step S164).

In a case where there is no processing code of "1" among the received processing code (0) to processing code (n), ("NO" in step S162), or in a case where it is determined that the character string related to the security has not been extracted ("NO" in step S685), the warning message and the warning sound are not generated and are not output.

The main control unit 541 controls the printer control circuit 559 so that operation is performed in accordance with the operation by the operator and printing is executed (step S166a).

Figure 43:
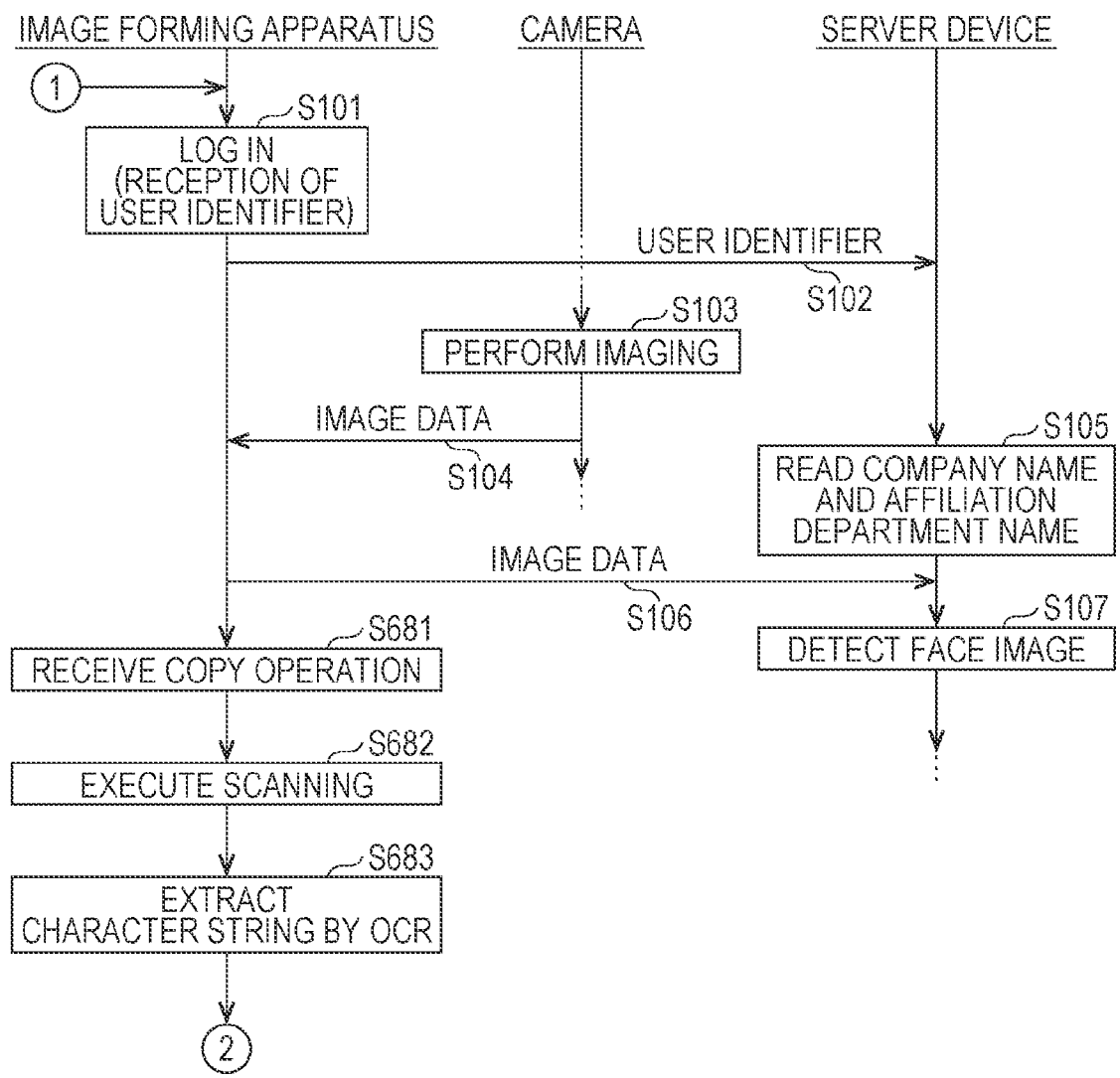
FIG. 43 is a sequence diagram illustrating operation in a tenth example.
Figure 44:
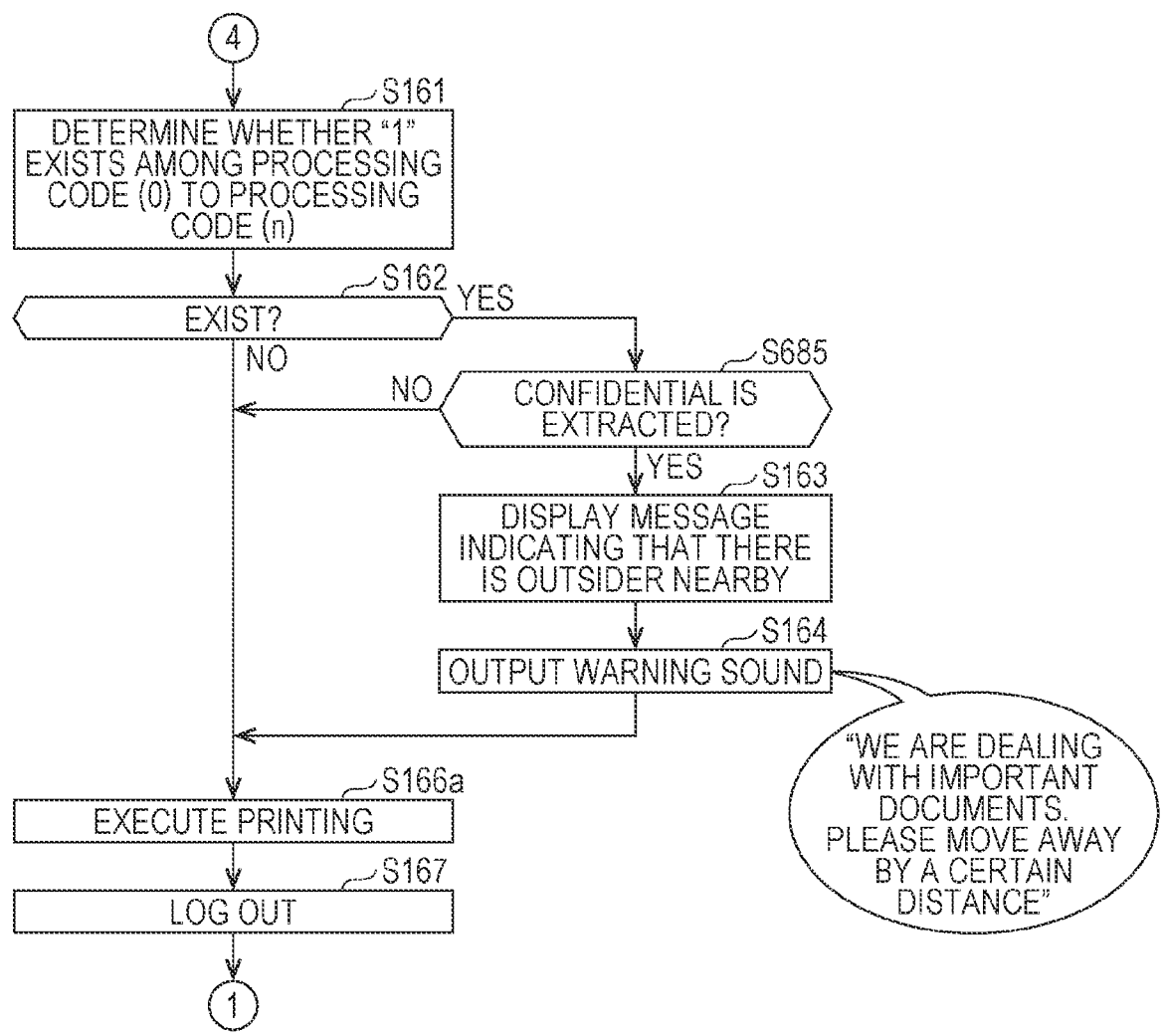
FIG. 44 is a sequence diagram illustrating the operation in the tenth example.

Next, the login control unit 546 logs out (step S167), and then the main control unit 541 shifts the control to step S101 in FIG. 43 and continues the processing.

Thus, a series of pieces of processing is ended.

11.3 Summary

As described above, in a case where the determination control unit 447 determines that a person is not a related person, the network communication circuit 456 (notifier) notifies the image forming apparatus 5 to cause the image forming apparatus 5 to issue a warning when the security information is detected by reading the document surface in the image forming apparatus 5.

Here, the image forming apparatus 5 may be an image reading apparatus that reads a document surface and generates image data.

As described above, in a case where a character string related to security, for example, a character string such as "confidential" or "top secret", a document destination name, or another character string is described in a document, when a copy job is executed, if there is a person who is not a related person around the operator, the image forming apparatus 5 issues a warning to the operator. As a result, security can be maintained.

Note that, not limited to a copy job, the present embodiment can be applied to a job in which a document is scanned and then obtained scanned image data is stored in the Box, a job in which the obtained scanned image data is attached to an e-mail and transmitted, and a job in which the obtained scanned image data is transmitted to another information processing device.

11.4 Modification

A modification of the tenth example will be described.

Regarding a character string related to security described in a document, for example, a character string such as "confidential" or "top secret" has the highest importance in terms of security. The document destination name has medium importance, and the other character string related to the security has low importance.

The integrated control unit 542 controls the speaker 515 so that the output volume increases as the importance in terms of security increases.

In a case where the extracted character string is a character string such as "confidential" or "top secret", the integrated control unit 542 sets the volume of the speaker 515 to the large volume.

In a case where the extracted character string is the document destination name, the integrated control unit 542 sets the volume of the speaker 515 to the medium volume.

In a case where the extracted character string is the other character string related to the security, the integrated control unit 542 sets the volume of the speaker 515 to the small volume.

The speaker 515 outputs the warning sound with the set volume.

Operation of Modification of Tenth Example

Figure 45:
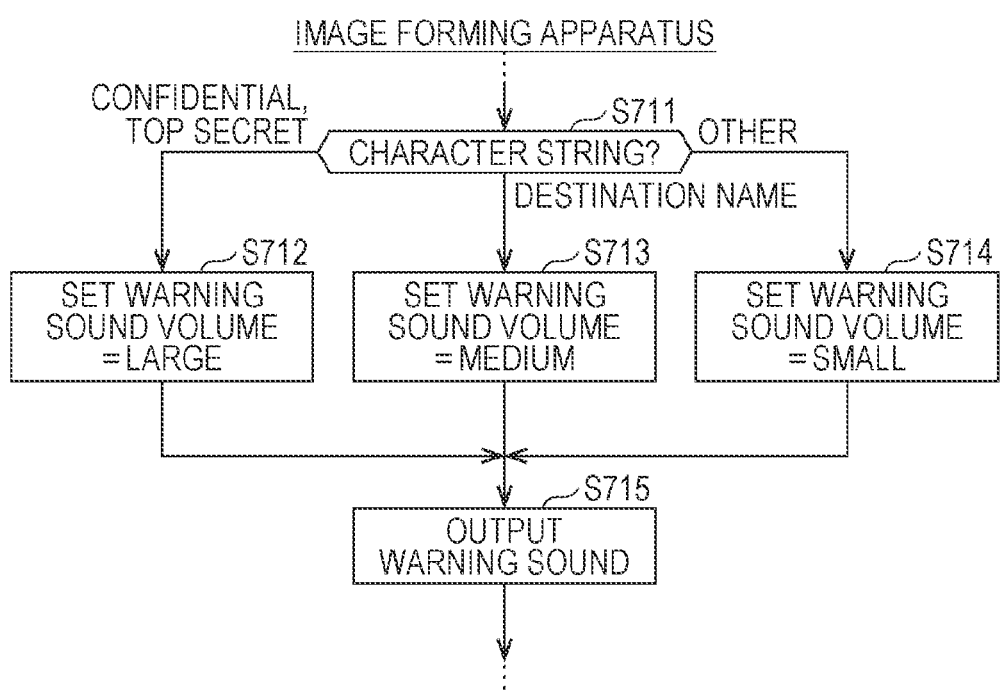
FIG. 45 is a sequence diagram illustrating operation in a modification of the tenth example.

Next, the operation of the modification of the tenth example will be described with reference to a flowchart illustrated in FIG. 45.

The determination unit 543 determines whether the extracted character string is a character string such as "confidential" or "top secret", a document destination name, or another character string related to security (step S711).

In a case where the determination unit 543 determines that the extracted character string is the character string such as "confidential" or "top secret" (CONFIDENTIAL, TOP SECRET in step S711), the integrated control unit 542 sets the volume of the speaker 515 to the large volume (step S712).

In a case where the determination unit 543 determines that the extracted character string is the document destination name ("DESTINATION NAME" in step S711), the integrated control unit 542 sets the volume of the speaker 515 to the medium volume (step S713).

Further, in a case where the determination unit 543 determines that the extracted character string is the other character string related to the security ("OTHER" in step S711), the integrated control unit 542 sets the volume of the speaker 515 to the small volume (step S714).

The speaker 515 outputs the warning sound with the set volume (step S715).

Thus, a series of operations is ended.

(SUMMARY)

As described above, the network communication circuit 456 (notifier) performs notification so that the warning is issued depending on a stage of the security information.

As described above, the warning can be issued depending on the content of the character string by changing the intensity of the warning in accordance with the content of the character string related to the security described in the document.

12 Other Modifications

The plurality of examples and the plurality of modifications have been described above. However, the present embodiment is not limited to these examples and modifications. The following may be adopted.

(1) In the above description, the image forming apparatus 5 is a tandem type color multifunction peripheral having functions of a scanner, a printer, and a copier. However, the present embodiment is not limited thereto. Instead of the image forming apparatus 5, a printing apparatus having a function of a printer may be adopted. In addition, instead of the image forming apparatus 5, an image reading apparatus having a scanner function may be adopted.

(2) In the above description, the camera 6 is provided on a wall surface, and the image forming apparatus 5 and the camera 6 are connected by a signal line. However, the present embodiment is not limited thereto.

The image forming apparatus may include the camera.

In addition, the camera installed with the optical axis of the lens facing the image forming apparatus may be connected to the network 2. The camera may transmit image data generated by imaging to the server device 4.

The security system 1 includes the image forming apparatus 5, the camera 6, and the server device 4. However, the present embodiment is not limited thereto.

The image forming apparatus and the server device may be integrally configured. In this case, the main control unit 541 of the image forming apparatus 5 may include the face recognition processing unit 443, the feature amount extracting unit 444, the position calculating unit 445, the line-of-sight viewpoint calculating unit 446, and the determination control unit 447 included in the main control unit 441 of the server device 4.

(3) The examples and modifications of the embodiment described above may be combined.

INDUSTRIAL APPLICABILITY

The monitoring device of the present disclosure does not issue a warning to the image processing apparatus being operated by the operator in a case where a person who peeps into the image processing apparatus is a related person of the operator, and thus the monitoring device of the present disclosure has an effect of reducing botheration for the operator, and is useful as a technology for monitoring peeping into the image processing apparatus being operated by the operator.

Although embodiments of the present invention have been described and illustrated in detail, the disclosed embodiments are made for purposes of illustration and example only and not limitation. The scope of the present invention should be interpreted by terms of the appended claims.

What is claimed is:

1. A monitoring device that monitors another person's peeping into a document to be read, a medium on which drawing output is performed, or content displayed by an image processing apparatus due to operation by an operator, the image processing apparatus comprising an image reading apparatus that reads a document to generate image data, or a printing apparatus that produces printed matter, and the monitoring device comprising:
    a first hardware processor; and
    a notifier that notifies the image processing apparatus of control information indicating whether to output warning information or to prevent output of warning information, under control of the first hardware processor,
    wherein the first hardware processor:
        acquires a first organization name that is a name of an organization to which the operator belongs;
        acquires person information identifying a person present within a predetermined range from the image processing apparatus;
        acquires a second organization name that is a name of an organization to which a person other than the operator and present within the predetermined range from the image processing apparatus belongs, from among persons identified by the person information;
        performs a determination as to whether or not the person other than the operator has a predetermined relationship with the operator, the determination being based on whether the second organization name matches the first organization name;
        in a case where (i) it is determined that the person other than the operator has the predetermined relationship with the operator and (ii) it is detected that the operator has forgotten to take the document or the printed matter from the image processing apparatus, controls the notifier to notify the image processing apparatus to cause the image processing apparatus to output a first warning having a first degree of emphasis; and
        in a case where (i) it is determined that the person other than the operator does not have the predetermined relationship with the operator and (ii) it is detected that the operator has forgotten to take the document or the printed matter from the image processing apparatus, controls the notifier to notify the image processing apparatus to cause the image processing apparatus to output a second warning having a second degree of emphasis higher than the first degree of emphasis.

2. The monitoring device according to claim 1, wherein the first hardware processor determines that the person other than the operator does not have the predetermined relationship with the operator in a case where the first organization name does not match the second organization name, and determines that the person other than the operator has the predetermined relationship with the operator in a case where the first organization name matches the second organization name.

3. The monitoring device according to claim 1, wherein:
an area of a predetermined range including the image processing apparatus is imaged,
the first hardware processor acquires a face image of a person as the person information from an image obtained by imaging the area of the predetermined range,
a storage stores an identifier that identifies a user who uses the image processing apparatus, a face image of the user, and an organization name that is a name of an organization to which the user belongs, in association with each other,
the first hardware processor acquires an operator identifier that identifies the operator, reads an organization name corresponding to the operator identifier as the first organization name from the storage, searches the storage for a face image that matches a face image of a person other than the operator from among a plurality of the face images acquired by the first hardware processor, and reads an organization name corresponding to the face image as the second organization name, and
the first hardware processor performs the determination using the first organization name and the second organization name read from the storage.

4. The monitoring device according to claim 3, wherein:
an imaging device that images the area of the predetermined range including the image processing apparatus is installed around the image processing apparatus, and
the first hardware processor receives the image from the imaging device.

5. The monitoring device according to claim 1, wherein:
an area of a predetermined range including the image processing apparatus is imaged,
in a case where a person present around the image processing apparatus wears an employee ID card indicating an organization name that is a name of an organization to which the person belongs with a display surface of the employee ID card facing outward, the first hardware processor acquires an employee ID card image representing the display surface of the employee ID card worn by the person as the person information from an image obtained by imaging the area of the predetermined range,
a storage stores an identifier that identifies a user who uses the image processing apparatus and an organization name that is a name of an organization to which the user belongs, in association with each other,
the first hardware processor acquires an operator identifier that identifies the operator and reads an organization name corresponding to the operator identifier as the first organization name from the storage,
the first hardware processor extracts an organization name as the second organization name from an employee ID card image of a person other than the operator from among a plurality of the employee ID card images acquired by the first hardware processor, and
the first hardware processor performs the determination using the first organization name read from the storage and the second organization name extracted from the employee ID card image.

6. The monitoring device according to claim 1, wherein:
in a case where the person present within the predetermined range from the image processing apparatus has an authentication device of a portable type that performs communication by short-distance wireless and that stores an identifier that identifies the person, the authentication device transmits the identifier by short-distance wireless, and the first hardware processor acquires the identifier as the person information, a storage stores an identifier that identifies a user who uses the image processing apparatus and an organization name that is a name of an organization to which the user belongs, in association with each other, the first hardware processor acquires an operator identifier that identifies the operator, reads an organization name corresponding to the operator identifier as the first organization name from the storage, and reads an organization name corresponding to an identifier of a person other than the operator from among a plurality of the identifiers acquired by the first hardware processor, as the second organization name, from the storage, and the first hardware processor performs the determination using the first organization name and the second organization name read from the storage.

7. The monitoring device according to claim 6, wherein:
the image processing apparatus includes a communication circuit that performs wireless communication with the authentication device by short-distance wireless, and
the first hardware processor acquires the identifier from the authentication device via the image processing apparatus.

8. The monitoring device according to claim 1, further comprising a storage that stores a number of times that a meeting has previously been held in a same closed space by the operator and a person other than the operator from among the persons identified by the person information,
wherein the first hardware processor reads the number of times from the storage, makes a comparison between the number of times read from the storage and a predetermined threshold value, and determines whether or not the person has the predetermined relationship with the operator based on a result of the comparison.

9. The monitoring device according to claim 8, wherein the first hardware processor determines that the person other than the operator has the predetermined relationship with the operator in a case where the number of times is greater than or equal to the predetermined threshold value, and determines that the person other than the operator does not have the predetermined relationship with the operator in a case where the number of times is less than the predetermined threshold value.

10. The monitoring device according to claim 1, further comprising a storage that stores a number of times that a same document has previously been viewed by the operator and a person other than the operator from among the persons identified by the person information,
wherein the first hardware processor reads the number of times from the storage, makes a comparison between the number of times read from the storage and a predetermined threshold value, and determines whether or not the person has the predetermined relationship with the operator based on a result of the comparison.

11. The monitoring device according to claim 1, wherein in a case where the first hardware processor is not able to perform the determination as to whether or not the person other than the operator from among the persons identified by the person information is a person having the predetermined relationship with the operator, the first hardware processor notifies the image processing apparatus to cause the image processing apparatus to request the operator to perform the determination.

12. The monitoring device according to claim 11, wherein:

an imaging device that images an area of a predetermined range including the image processing apparatus is installed around the image processing apparatus,
the first hardware processor acquires a person image representing a person other than the operator as the person information from an image obtained by imaging the area of the predetermined rage, and
in a case where the first hardware processor is not able to recognize a face image of the person from the acquired person image, the first hardware processor determines that it is not able to determine whether or not the person has the predetermined relationship with the operator.

13. The monitoring device according to claim 11, wherein:
an imaging device that images an area of a predetermined range including the image processing apparatus is installed around the image processing apparatus,
the first hardware processor acquires a face image representing a person other than the operator as the person information from an image obtained by imaging the area of the predetermined range,
a storage stores an identifier that identifies a user who uses the image processing apparatus, a face image of the user, and an organization name that is a name of an organization to which the user belongs, in association with each other,
the first hardware processor searches the storage for a face image that matches the face image acquired by the first hardware processor, and
in a case where the first hardware processor is not able to find a face image in the storage that matches the face image acquired by the first hardware processor, the first hardware processor determines that it is not able to determine whether or not the person has the predetermined relationship with the operator.

14. The monitoring device according to claim 1, wherein the hardware processor, in a case where it is determined that the person other than the operator does not have the predetermined relationship with the operator, controls the notifier to notify the image processing apparatus to cause the image processing apparatus to warn the person other than the operator to move away from the image processing apparatus by at least a certain distance.

15. The monitoring device according to claim 1, wherein the hardware processor, in a case where it is determined that the person other than the operator does not have the predetermined relationship with the operator, controls the notifier to notify the image processing apparatus to cause the image processing apparatus to warn the operator that there is a person not having the predetermined relationship with the operator.

16. The monitoring device according to claim 1, wherein the hardware processor, in a case where it is determined that the person other than the operator does not have the predetermined relationship with the operator, controls the notifier to notify the image processing apparatus to cause the image processing apparatus to invalidate an operation key thereof.

17. The monitoring device according to claim 1, wherein the hardware processor, in a case where it is determined that the person other than the operator does not have the predetermined relationship with the operator and it is detected that the operator has moved away from the image processing apparatus, controls the notifier to notify the image processing apparatus to cause the image processing apparatus to issue a third warning.

18. The monitoring device according to claim 1, wherein the hardware processor, in a case where it is determined that the person other than the operator does not have the predetermined relationship with the operator and a setting regarding security has been made in the image processing apparatus, controls the notifier to notify the image processing apparatus to cause the image processing apparatus to issue a third warning.

19. The monitoring device according to claim 18, wherein the third warning issued is based on a stage of the setting regarding the security.

20. The monitoring device according to claim 1, wherein:
the image processing apparatus comprises the image reading apparatus that reads a document surface of the document to generate the image data, and
the hardware processor, in a case where it is determined that the person other than the operator does not have the predetermined relationship with the operator and security information is detected in the image processing apparatus, controls the notifier to notify the image processing apparatus to cause the image processing apparatus to issue a third warning when the document surface is read.

21. The monitoring device according to claim 20, wherein the third warning is issued based on a stage of the security information.

22. A monitoring system comprising:
an image processing apparatus; and
a monitoring device that monitors another person's peeping into a document to be read, a medium on which drawing output is performed, or content displayed by the image processing apparatus due to operation of the image processing apparatus by an operator,
wherein the image processing apparatus comprises an image reading apparatus that reads a document to generate image data, or a printing apparatus that produces printed matter,
wherein the monitoring device includes:
a first hardware processor that:
acquires a first organization name that is a name of an organization to which the operator belongs;
acquires person information identifying a person present within a predetermined range from the image processing apparatus;
acquires a second organization name that is a name of an organization to which a person other than the operator and present within the predetermined range from the image processing apparatus belongs, from among persons identified by the person information;
determines whether or not the person other than the operator has a predetermined relationship with the operator, based on whether the second organization name matches the first organization name;
in a case where (i) it is determined that the person other than the operator has the predetermined relationship with the operator and (ii) it is detected that the operator has forgotten to take the document or the printed matter from the image processing apparatus, output first warning control information for controlling output of a first warning having a first degree of emphasis; and
in a case where (i) it is determined that the person other than the operator does not have the predetermined relationship with the operator and (ii) it is detected that the operator has forgotten to take the document or the printed matter from the image processing apparatus, output second warning control information for controlling output of a second warning having a second degree of emphasis higher than the first degree of emphasis; and
a notifier that notifies the image processing apparatus of control information indicating whether to output warning information, or to prevent output of the warning information, under control of the first hardware processor, the warning information including at least one of the first warning control information and the second warning control information,
wherein the image processing apparatus includes:
a receiver that receives the control information;
a second hardware processor that performs control to cause the warning information to be output in a case where the received control information indicates that the warning information is to be output, and to prevent output of the warning information in a case where the received control information indicates that the output of the warning information is to be prevented; and
an outputter that outputs the warning information only in a case where the received control information indicates that the warning information is to be output.

23. A monitoring method used in a monitoring device that monitors another person's peeping into a document to be read, a medium on which drawing output is performed, or content displayed by an image processing apparatus due to operation by an operator, the image processing apparatus comprising an image reading apparatus that reads a document to generate image data, or a printing apparatus that produces printed matter, the monitoring device comprising a notifier that notifies the image processing apparatus of control information indicating whether to output warning information or to prevent output of warning information, and the monitoring method comprising:
acquiring a first organization name that is a name of an organization to which the operator belongs;
acquiring person information identifying a person present within a predetermined range from the image processing apparatus;
acquiring a second organization name that is a name of an organization to which a person other than the operator and present within the predetermined range from the image processing apparatus belongs, from among persons identified by the person information;
determining whether or not the person other than the operator has a predetermined relationship with the operator, based on whether the second organization name matches the first organization name;
in a case where (i) it is determined that the person other than the operator has the predetermined relationship with the operator and (ii) it is detected that the operator has forgotten to take the document or the printed matter from the image processing apparatus, controlling the notifier to notify the image processing apparatus to cause the image processing apparatus to output a first warning having a first degree of emphasis; and
in a case where (i) it is determined that the person other than the operator does not have the predetermined relationship with the operator and (ii) it is detected that the operator has forgotten to take the document or the printed matter from the image processing apparatus, controlling the notifier to notify the image processing apparatus to cause the image processing apparatus to output a second warning having a second degree of emphasis higher than the first degree of emphasis.

24. A non-transitory computer-readable recording medium storing a computer program for a monitoring device that monitors another person's peeping into a document to be read, a medium on which drawing output is performed, or content displayed by an image processing apparatus due to operation by an operator, the image processing apparatus comprising an image reading apparatus that reads a document to generate image data, or a printing apparatus that produces printed matter, the monitoring device comprising a notifier that notifies the image processing apparatus of control information indicating whether to output warning information or to prevent output of warning information, and the computer program being executable by a computer of the monitoring device to control the monitoring device to execute processes comprising:

acquiring a first organization name that is a name of an organization to which the operator belongs;

acquiring person information identifying a person present within a predetermined range from the image processing apparatus;

acquiring a second organization name that is a name of an organization to which a person other than the operator and present within the predetermined range from the image processing apparatus belongs, from among persons identified by the person information;

determining whether or not the person other than the operator has a predetermined relationship with the operator, based on whether the second organization name matches the first organization name;

in a case where (i) it is determined that the person other than the operator has the predetermined relationship with the operator and (ii) it is detected that the operator has forgotten to take the document or the printed matter from the image processing apparatus, controlling the notifier to notify the image processing apparatus to cause the image processing apparatus to output a first warning having a first degree of emphasis; and in a case where (i) it is determined that the person other than the operator does not have the predetermined relationship with the operator and (ii) it is detected that the operator has forgotten to take the document or the printed matter from the image processing apparatus, controlling the notifier to notify the image processing apparatus to cause the image processing apparatus to output a second warning having a second degree of emphasis higher than the first degree of emphasis.

\* \* \* \* \*